(12) United States Patent
Parks

(10) Patent No.: US 12,409,480 B2
(45) Date of Patent: Sep. 9, 2025

(54) SYSTEMS AND METHODS FOR ORGANIC WASTE PROCESSING AND RECYCLING AND BYPRODUCTS THEREOF

(71) Applicant: Palm Silage, Inc., Fountain Valley, CA (US)

(72) Inventor: James Clifford Parks, Thermal, CA (US)

(73) Assignee: Palm Silage, Inc., Fountain Valley, CA (US)

( * ) Notice: Subject to any disclaimer, the term of this patent is extended or adjusted under 35 U.S.C. 154(b) by 821 days.

(21) Appl. No.: 16/577,861

(22) Filed: Sep. 20, 2019

(65) Prior Publication Data

US 2020/0156125 A1     May 21, 2020

Related U.S. Application Data

(63) Continuation of application No. PCT/US2018/024078, filed on Mar. 23, 2018, and a continuation-in-part of application No. 14/769,058, filed as application No. PCT/US2014/017207 on Feb. 19, 2014, now Pat. No. 11,071,313, which is a continuation-in-part of application No. 13/794,686, filed on Mar. 11, 2013, now Pat. No. 11,064,717.

(60) Provisional application No. 62/622,823, filed on Jan. 26, 2018, provisional application No. 62/476,639, filed on Mar. 24, 2017, provisional application No. 61/775,435, filed on Mar. 8, 2013, provisional application No. 61/767,165, filed on Feb. 20, 2013.

(51) Int. Cl.
| | |
|---|---|
| *B09B 3/21* | (2022.01) |
| *A23K 10/37* | (2016.01) |
| *A23K 20/158* | (2016.01) |
| *A23K 40/10* | (2016.01) |
| *A23K 40/25* | (2016.01) |

(52) U.S. Cl.
CPC ............... *B09B 3/21* (2022.01); *A23K 10/37* (2016.05); *A23K 20/158* (2016.05); *A23K 40/10* (2016.05); *A23K 40/25* (2016.05)

(58) Field of Classification Search
CPC .... B09B 3/21; B09B 3/40; B09B 3/00; A23K 10/37; A23K 20/158; A23K 40/10; A23K 40/25; A23K 40/20; Y02P 60/87
USPC ......................................................... 426/635
See application file for complete search history.

(56) References Cited

U.S. PATENT DOCUMENTS

| | | | |
|---|---|---|---|
| 536,781 A * | 4/1895 | Draver ....................... B07B 1/42 |
| | | | 209/322 |
| 3,600,188 A | 8/1971 | Wilding et al. | |
| 4,363,448 A | 12/1982 | Machler et al. | |
| 4,428,969 A | 1/1984 | Müller et al. | |
| 4,460,292 A | 7/1984 | Durham | |
| 4,578,275 A | 3/1986 | Spanier | |
| 4,680,190 A | 7/1987 | Spiel | |
| 5,120,565 A | 6/1992 | Lanter et al. | |
| 5,236,717 A | 8/1993 | Vinci | |
| 5,250,307 A | 10/1993 | Cummings | |
| 5,540,932 A | 7/1996 | Lanter et al. | |
| 5,683,739 A | 11/1997 | Lanter et al. | |
| 5,855,943 A * | 1/1999 | Lush ....................... A23K 40/20 |
| | | | 426/516 |
| 7,296,537 B2 | 11/2007 | Burghardi | |
| 10,711,420 B2 | 7/2020 | Parks | |
| 11,064,717 B2 | 7/2021 | Parks | |
| 11,071,313 B2 | 7/2021 | Parks | |
| 11,297,853 B2 | 4/2022 | Jimenez-Marquez et al. | |

(Continued)

FOREIGN PATENT DOCUMENTS

| | | |
|---|---|---|
| CA | 2319978 A1 | 3/2002 |
| CN | 201667968 A * | 12/2010 |

(Continued)

OTHER PUBLICATIONS

NPL Vaughan C et al. (in Seed processing and handling , 1968 pp. 1-153). (Year: 1968).*

(Continued)

*Primary Examiner* — Erik Kashnikow
*Assistant Examiner* — Bhaskar Mukhopadhyay
(74) *Attorney, Agent, or Firm* — Knobbe, Martens, Olson & Bear, LLP

(57) ABSTRACT

Manufacturing methods for repurposing organic green waste into bio-friendly byproducts using particular manufacturing configurations of multiple grinders, trommels, baffles, screens, and mixers for recycling various waste material components into desirable byproducts. Byproducts of organic waste material can be obtained through methods of their processing, recycling, and/or disposal. A method of obtaining a bio-friendly byproduct can include introducing a first waste material, which includes palm frond particles into a first grinder configured to expel particles having a length and/or diameter no greater than three inches (about 76 mm). The first waste material has a moisture content below 20% by weight. The first grinder can be configured to grind the first waste material into first particles having a length less than three inches (about 76 mm). A second grinder can be used to grind the first particles into second particles having a length less than 1 inch (about 25 mm). A third grinder can be used to grind the second waste material into grinds and/or crumbles having a length and/or diameter less than one inch (about 25 mm). The processing methods and procedures are advantageous to recycle waste material components into desirable byproducts.

21 Claims, 18 Drawing Sheets

(56) References Cited

U.S. PATENT DOCUMENTS

| | | | |
|---|---|---|---|
| 11,346,068 | B2 | 5/2022 | Parks |
| 2006/0160907 | A1 | 7/2006 | Stamp |
| 2007/0277739 | A1 | 12/2007 | Wang et al. |
| 2008/0089998 | A1 | 4/2008 | Chou |
| 2008/0146520 | A1 | 6/2008 | Block et al. |
| 2008/0171297 | A1 | 7/2008 | Reynolds |
| 2009/0062516 | A1 | 3/2009 | Belanger et al. |
| 2010/0167351 | A1 | 7/2010 | Eyal et al. |
| 2010/0233320 | A1 | 9/2010 | Sunvold et al. |
| 2011/0297885 | A1 | 12/2011 | Boerrigter et al. |
| 2012/0040029 | A1 | 2/2012 | Sambanthamurthi et al. |
| 2012/0315339 | A1 | 12/2012 | Duval et al. |
| 2013/0012610 | A1 | 1/2013 | Belanger et al. |
| 2014/0234524 | A1 | 8/2014 | Parks |
| 2016/0007630 | A1 | 1/2016 | Parks |
| 2019/0048307 | A1 | 2/2019 | Morash et al. |
| 2021/0164182 | A1 | 6/2021 | Parks |
| 2022/0174987 | A1 | 6/2022 | Parks |
| 2022/0183321 | A1 | 6/2022 | Parks |

FOREIGN PATENT DOCUMENTS

| | | |
|---|---|---|
| EP | 2342973 | 7/2011 |
| EP | 2 546 352 | 1/2013 |
| GB | 797 763 | 7/1958 |
| GB | 2 185 673 | 7/1987 |
| GB | 2 200 027 | 7/1988 |
| GB | 2 257 012 | 1/1993 |
| JP | 62-158457 | 7/1987 |
| JP | 62-239957 | 10/1987 |
| JP | 2002-51707 | 2/2002 |
| WO | WO 1996/17525 | 6/1996 |
| WO | WO 1997/33488 | 9/1997 |
| WO | WO 1999/42422 | 8/1999 |
| WO | WO 2004/039751 | 5/2004 |
| WO | WO 2004/080197 | 9/2004 |
| WO | WO 2007/100251 | 9/2007 |
| WO | WO 2009/110782 | 9/2009 |
| WO | WO 2010/056940 | 5/2010 |
| WO | WO 2010/117255 | 10/2010 |
| WO | WO 2012/050431 | 4/2012 |
| WO | WO 2013/096698 | 6/2013 |
| WO | WO 2014/130578 | 8/2014 |
| WO | WO 2015/014497 | 2/2015 |
| WO | WO 2018/175921 | 9/2018 |

OTHER PUBLICATIONS

NPL Google Search Report (Retrieved on Oct. 27, 2022). (Year: 2022).*

NPL Palm press fiber ( Retrieved on Oct. 27, 2022). (Year: 2022).*

NPL Palm Fronds are leaves (Retrieved on May 26, 2023). (Year: 2023).*

Abdelbasset, El Hadrami et al., Emir. J. Food Agric. 2012. 24 (5): 371-385.

Al-Dobaib, S N et al., Effect of feeding discarded dates on milk yield and composition of Aradi goats, Small Ruminant Research, Elsevier, Amsterdam, NL, vol. 81, No. 2-3, Feb. 1, 2009.

Armcon Engineering downloaded from https://www.youtube.com/watch?v= J8omAdfMNs, 3 pages dated Feb. 9, 2007.

Barreveld, W.H., Date Palm Products, FAO Agricultural Services Bulletin No. 101, Food and Agricultur Organization of the United nations Rome 1993, in 16 pages.

Belal, Ibrahim E.H., et al., Evalutaion of date-feed ingredients mixes, Animal Feed Science and technology, 81 (1999) pp. 291-298.

Bengaly, K., et al., Utilization of Steam-processed Oil Palm (*Elaeis guineensis*) Frond byRuminants in Malaysia: Investigations for nitrogen supplementation. African Journal of Agricultural Research, vol. 5 (16), pp. 2131-2136, 2010 in 6 pages.

Biofuel Co-Products as Livestock Feed, Opportunities and Challenges, Food and Agriculture Organization of the United Nations, Rome, 2012, Chapters 1-5 in 116 pages.

Biofuel Co-Products as Livestock Feed, Opportunities and Challenges, Food and Agriculture Organization of the United Nations, Rome, 2012, Chapters 6-11 in 123 pages.

Biofuel Co-Products as Livestock Feed, Opportunities and Challenges, Food and Agriculture Organization of the United Nations, Rome, 2012, Chapters 12-17 in 81 pages.

Biofuel Co-Products as Livestock Feed, Opportunities and Challenges, Food and Agriculture Organization of the United Nations, Rome, 2012, Chapters 18-24 in 133 pages.

Biofuel Co-Products as Livestock Feed, Opportunities and Challenges, Food and Agriculture Organization of the United Nations, Rome, 2012, Chapters 25-28 in 87 pages.

Bob's Red Mill: Date Powder, downloaded from www.lifestylemarkets.com, dated May 3, 2006, 2 pages.

Canampak Dates Industry (Pvt) Ltd., International Suppliers of Dates, All AboutDates [online] (full content), Copyright 2009, [printed Jul. 9, 2014]. Retrieved from the Internet: <URL: http://www.canampakdates.com/about-dates.htm>.

Chandrasekaran et al. Saudi J. Biol. Sci. Apr. 2013, 20(2), pp. 105-120.

Converting Waste Oil Palm Trees Into a Resource, United Nations Environment Programme, 2012 in 202 pages.

Dahlan, I., et al., Nutrient Intake and Digestibility of Fresh, Ensiled and Pelleted Oil Palm (*Elaeis guineensis*) Frond by Goats. Department of Animal Science, Faculty of Agriculture, Universiti Putra Malaysia, pp. 1407-1413, 2000 in 7 pages.

Dahlan, I., Oil Palm Frond, a Feed for Herbivores. Asian-Aus. J. anim. Sci. 13 Supplement, pp. 300-303, 2000 in 4 pages.

Devendra, C., et al.,—Invited Review—Feed Resources for Animals in Asia: Issues, Strategies for Use, Intensification and Integration for Increased Productivity. The Asian-Australasian Association of Animal Production Societies, vol. 24, No. 3, pp. 303-321, Mar. 2011 in 19 pages.

Devendra, C., Intensification of Integrated Oil Palm-ruminant Systems. Outlook on Agriculture, vol. 38, No. 1, pp. 71-81, 2009 in 11 pages.

Duran, A.O., 1998, The African palm: A strategic resource for integrated systems of tropical production. First FAO Electronic conference on tropical Feeds and Feeding Systems. FAO Animal Production and Health Paper, FAO, Rome, 13 pages.

Genin D., et al.. Valorisation of date-palm by-products (DPBP) for livestock feeding in Southern Tunisia. I-Potentialities and traditional utilisation. In : Ben Saem H. (ed.), Nefzaoui A. (ed), Morand-Fehr P. (ed). Nutrition and feeding strategies of sheep and goats under harsh climates. Zaragoza : CIHEAM, 2004. p. 221-226.

Global Environment Centre Foundation Annual Report 2012, Issued Mar. 2014 in 28 pages.

Goto, T., et al., Simple analytical method for aflatoxin contamination in dried oil palm frond (OPF) and OPF base feed. Mycotoxins, vol. 52 (2), pp. 123-128, 2002 in 6 pages.

Hamza, Akila, et al., Use of different silages as new feed resources for ruminants. Archiva Zootechnica 12:2, pp. 79-88, 2009 in 10 pages.

Hassan, O. Abu, et al., Oil-Palm Fronds as a Roughage Feed Source for Ruminants inMalaysia. Malaysia Agriculture Research and Development Institute (MARDI) and National Grassland Research Institute, pp. 1-8, 1996 in 8 pages.

Hassim, H.A., et al, Dietary inclusion of oil palm fronds does not change n-6 nor n-3 content of lamb tissue, Small Ruminant Research, Elsevier, Amsterdam, NL, vol. 112, No. 1, Oct. 3, 2012, pp. 69-72, XP028547783, ISSN: 09-21-4488, DOI: 10.1016/J.SmallRumres. 2012-09-007 abstract Paragraph 2.1 Animals and diets.

Hassim, H.A., et al, Effect of different inclusion levels of oil palm fronds on in vitro rumen fermentation pattern, fatty acid metabolism and apparent biohydrogenation of linoleic and linolenic acid. Animal Feed Science and Technology, vol. 162, pp. 155-158, 2010 in 4 pages.

Heuze V., Sauvant D., Tran G., 2012. Oil Palm Fronds and Oil Palm Crop Residues. Feedipedia.org. A programme by INRA, CIRAD,

(56) References Cited

OTHER PUBLICATIONS

AFZ and FAO. http://www.feedipedia.org/node/6916. Last updated on Jul. 10, 2012, 11:26. Accessed May 14, 2013 in 3 pages.
Husin, M., et al., Availability and Potential Utilisation of Oil Palm Trunks and Fronds up to the Year 2000. PORIM Occasional Paper, No. 20, 17 pages plus book cover and table of contents, 1986 in 21 pages.
International Search Report and Written Opinion for International Application No. PCT/US2014/017207, mailed on Jun. 11, 2004 in 13 pages.
Ishida, M., et al., Utilization of Oil Palm Frond as Cattle Feed. JARQ, vol. 31, pp. 41-47, 1997 in 7 pages.
Islam, M., et al., Productivity and Nutritive Values of Different Fractions of Oil Palm (*Elaeis guineensis*) Frond. Department of Animal Science, Universiti Putra Malaysia, pp. 1113-1120, 2000 in 8 pages.
Jalaludin, S., Integrated Animal Production in the Oil Palm Plantation. Universiti Pertanian Malaysia, pp. 1-4, 1996 in 4 pages.
Kawamoto, H., et al., Palatability, Digestibility and Voluntary Intake of Processed Oil Palm Fronds in Cattle. JARQ, vol. 35 (3), pp. 195-200, 2001 in 6 pages.
Khamseekhiew, B., et al., Ruminal and Intestinal Digestibility of Some Tropical Legume Forages. Department of animal Science, Universiti Putra Malaysia, pp. 321-325, 2001 in 5 pages.
Lim, K.O., et al., Plant Based Energy Potential and Biomass Utilization in Malaysia. International Energy Journal, vol. 1, No. 2, pp. 77-88, 2000 in 12 pages.
Mahgoub et al., Effects of feeding ensiled data palm fronds and a by-roduct concentrate on performance and meat quality of Omani sheep, Amimal Feed Science and Technology, Amsterdam, NL, vol. 135, No. 3-4, May 5, 2007.
Mahgoub, et al. Dates: Production, Processing, Food and Medicinal Values; A.Manackavasagan, M. Mohamed Essa, and E. Sukumar CRC Press 2012, Chapter 23, pp. 323-338; Print ISBN: 978-1-4398-4945-3 eBook ISBN: 978-1-4398-4947-7.
Mahgoub, Osman, et al., Effects of feeding ensiled data palm fronds and a by-product concentrate on performance and meat quality of Omani sheep, Animal Feed Science and Technology, 135 (2007) 210-221.
Medjekal, S., Arhab, R., and Bousseboua, H., Nutritive value assessment of some desert by-products by gas production and rumen fermentation in vitro, Livestock Research for Rural Development 23 (3) 2011, Published Mar. 6, 2011, http://www.lrrd.org/lrrd23/3/medj23046.htm, printed Mar. 17, 2015.
Nutrient Requirements of Beef Cattle-Oklahoma State University, downloaded from pods.dasnr.okstate.edu/docushare/dsweb/Get/Document . . . /E-974web.pdf Dec. 30, 2006, 25 pages.
Office Action received in co-pending Canadian Application No. 2902053, dated Jun. 6, 2016 in 3 pages.
Office Action received in co-pending Japanese Application No. 2015-558928, mailed Feb. 29, 2016 in 8 pages including English translation.
Office Action received in co-pending Japanese Application No. 2015-558928, mailed Aug. 8, 2016 in 4 pages including English translation.
Office Action received in co-pending Korean Application No. 10-2015-7026053, dated Mar. 31, 2016 in 5 pages including English translation.
Office Action received in co-pending Korean Application No. 10-2015-7026053, dated Oct. 7, 2016 in 9 pages.
Rasby, et al. Understanding and Using a Feed Analysis, downloaded from Report http//www.ianrpubs.unl.edu/pages/publicationD.jsp?publicationId-1055, dated Sep. 2008, 11 pages.
Supplementary Partial European Search Report in co-pending European Application No. EP 14 75 4449, dated Sep. 19, 2016 in 7 pages.
Supplementary European Search Report for PCT/US2014017207 dated Jan. 17, 2017 in 10 pages.
Zahari, M. Wan, et al., Utilization of Oil Palm Frond—Based Diets for Beef and Dairy Production in Malaysia. Journal of Animal Science, pp. 625-634, 2003 in 11 pages.
Patent Landscape Report: Palm Oil Production and Waste Treatment Technologies, WIPO Publication No. 947/4E, 2016, in 124 pages.

\* cited by examiner

SYSTEMS AND METHODS FOR ORGANIC WASTE PROCESSING AND RECYCLING AND BYPRODUCTS THEREOF

CROSS-REFERENCE TO RELATED APPLICATIONS

This application claims the benefit of priority under 35 U.S.C. § 111(a) to International Application No. PCT/US2018/024078, filed on Mar. 23, 2018, entitled "SYSTEMS AND METHODS FOR ORGANIC WASTE PROCESSING AND RECYCLING AND BYPRODUCTS THEREOF," and claims the benefit of priority under 35 U.S.C. § 119(e) to U.S. Provisional Application No. 62/476,639, filed on Mar. 24, 2017, entitled "SYSTEMS AND METHODS FOR ORGANIC WASTE PROCESSING AND RECYCLING AND BYPRODUCTS THEREOF," and to U.S. Provisional Application No. 62/622,823, filed on Jan. 26, 2018, entitled "SYSTEMS AND METHODS FOR PROCESSING PALM FRONDS AND DATES AND PRODUCTS THEREOF," all of which are hereby incorporated by reference herein in their entirety for all purposes.

BACKGROUND

Field of the Invention

The present disclosure relates generally to the field of recycling and waste processing, including organic waste processing and byproducts thereof.

Description of the Related Art

Various systems, methods, and products relate to recycling and/or organic waste processing, including byproducts that can be obtained using methods related to processing, recycling and/or disposal of organic waste and/or green waste. Some problems exist with regard to processing, recycling, and/or disposing of organic material and/or green waste. The present application overcomes historical challenges and improves processing, recycling, disposal, and production of useful byproducts in the context of waste processing.

SUMMARY

Waste products have been filling landfills across the world for decades. In recent years, cities and countries have struggled to deal with the increased waste. Attempts at waste management have involved various programs, including recycling programs. How the waste material is treated often depends on the content and/or makeup of the waste material. For example, inorganic waste material, such as plastics, can often be transformed into other products or reused for other purposes. Similarly, some organic waste material can be turned into compost or fertilizer. Yet some organic waste material does not biodegrade very quickly and may require additional processing. For example, certain types of organic waste material may be too fibrous and therefore may take years to decompose or degrade on its own. Due to this, in many instances when these waste materials are taken to a landfill a stopgap solution may be to simply cut the waste material into smaller fragments before disposal. However, these stopgap solutions are often insufficient. An example of these types of organic waste material includes palm fronds.

Current approaches of sending certain types of organic matter into landfills are problematic, in part because landfills themselves cause many problems. For example, landfills produce toxic liquids that can get into groundwater and other waterways. This is particularly true for nonbiodegradable waste materials. Moreover, landfills are where many products go to decompose, yet not all of even these waste materials are exposed to oxygen and therefore are not able to decompose aerobically. Therefore, landfills produce high volumes of greenhouse gases that are emitted into the atmosphere.

The build-up of waste materials that are slow to decompose or do not decompose at all can be expensive for cities and countries. The waste material can build up on itself and avoid natural creation of useful byproducts. For example, in Phoenix Ariz., it is estimated that 34,000 tons of palm fronds are collected each year. This accounts for up to 3.4% of the city's waste and may cost the city half a million dollars or more to place in a landfill. Moreover, the fibrous nature of the palm fronds creates a unique challenge for processing them. The palm fronds can clog green waste processing facility machinery and may take up large amounts of city resources, including time and money.

To combat these and other challenges associated with the recycling and/or disposal (e.g., repurposing) of organic waste material, this application describes a variety of systems, methods and products, including byproducts of organic waste material that can be obtained through improved methods of their processing, recycling, and/or disposal. This application also describes various methods for recycling and/or disposing of these organic materials, including methods for obtaining byproducts associated with the processing of these organic materials.

In some cases it can be advantageous to dispose of these organic waste materials by converting them into useful products. For example, organic materials can be turned into fuels, fertilizers, structural components, and/or animal feeds, etc. Yet with certain organic materials, the production of these byproducts has proven challenging. In particular, it can be challenging to adequately process organic and other waste products, such as palm fronds. Because of their toughness, disposing of palm fronds or forming them into a usable product has presented various difficulties. Various embodiments described herein relate to methods of preparing and processing palm fronds for convenient disposal, recycling, repurposing, transport, storage, mixing with additional components, and/or consumption. This can make it much more efficient and productive to generate an animal feed based on palm fronds, rather than discarding them as is frequently done.

In some embodiments, systems and methods for processing organic waste into a bio-friendly byproduct can include introducing a first waste material comprising palm frond particles into a first grinder configured to expel particles having a diameter no greater than three inches, the first waste material having a moisture content below 20% by weight. The first grinder can be configured to grind the first waste material into first particles having a length less than three inches. The first particles of the first waste material can be introduced into a second grinder configured to expel particles having a length and/or diameter no greater than one inch. The second grinder is used to grind the first particles into second particles having a length less than 1 inch. A second waste material comprises palm dates that can be introduced into a third grinder configured to expel particles having a length and/or diameter no greater than one inch, the second waste material having a moisture content below 15% by weight. A third grinder is used to grind the second waste material into grinds and/or crumbles having a length and/or diameter less than one inch. The first waste material and the second waste material can be introduced into a mixer at a ratio of between 5:3 and 4:1. In some embodiments, the ratio can be 1:1. In some embodiments the ratio can be 2:1. Other ratios and various mixtures are contemplated as described in more detail herein. A mixer can be used to mix the first waste material and the second waste material into a mixture. In some embodiments, nutritional additives can be added. Ratios and types of nutritional additives are described further herein. Additional grinders may also be used before and/or after mixing. Byproducts can be extruded, bagged and/or otherwise packaged for transport and/or delivery. In some aspects, methods include arranging for a first waste material comprising palm fronds to dry until the first waste material reaches a moisture content below 20% by weight. In some aspects, arranging for the first waste material comprises palm fronds to dry comprises using a tumble dryer. In some aspects a second waste material comprising palm dates is arranged to dry until the second waste material reaches a moisture content below 15% by weight. The second waste material comprising palm dates can dry using a tumble dryer. Some aspects include the step of mixing a binding agent comprising oil configured for consumption into the mixture. In some embodiments, the mixture comprises between 25% and 65% binding agent by weight. The binding agent comprises canola oil in some embodiments. In some aspects, the method includes the step of mixing a cereal additive into the mixture, wherein the mixture comprises between 3% and 16% cereal additive by weight. The cereal additive may have a substantial fiber content. For example, the cereal additive may include a fiber content of at least 1% by weight. In some designs, the cereal additive used (e.g., certain low-grade wheats) may have a fiber content greater than about 5% by weight. Certain cereal additives (e.g., whole wheat) may have fiber content between about 5% and 15%. One or more of such cereal additives may be used to supply a target amount of edible fiber to the resulting extrusion.

Some aspects include the step of using an extruding machine, extruding the mixture into pellets having a diameter less than 0.8 inches. Other sizes are also contemplated. In some embodiments, the first waste material has a moisture content of between 5% and 15% by weight. In some embodiments, a first waste material is arranged to dry until the first waste material reaches a moisture content of between 5% and 15% by weight. In some systems and methods, the mixture is introduced into a fourth grinder. Some applications include mixing a roughening additive into the mixture. A roughening additive can be selected from the group consisting of wheat, buckwheat, milo, alfalfa, soy, corn, hay, oats, rice, barley, rye, millet, sorghum, quinoa, or grass. A calcium additive can be added into the mixture in some embodiments. The calcium additive can be selected from the group consisting of oyster shell, a salt comprising calcium or a calcium derivative, calcium carbonate, limestone, calcium monophosphate, calcium diphosphate, and egg shells.

One byproduct that can be produced from waste material is animal feed. World demand for animals and animal products is tremendous and continually growing. The U.S. cattle and dairy industries alone are billion dollar industries. They involve millions of head of cattle that consume billions of dollars of feed annually. Simultaneously, as described above, disposing of palm fronds and waste products that include palm fronds and other palm products has created its own source of challenges. Yet, the disposal of palm-based waste products as a means for feeding animals can provide two concurrent benefits. Animal feeds can come from a variety of sources, but they typically involve a significant component that is from crops grown specifically purposed for animal feed. Many such feed components are susceptible to drought and may struggle in arid conditions. For example, alfalfa, which is regularly found in cattle feed, struggles during dry and hot seasons. The tremendous demand for cattle feed can strain resources.

Various waste byproducts that can be converted into, for example, animal feeds described herein can be based on palm fronds. Palm trees are found throughout the world in arid locations and palm fronds are frequently viewed as a source of waste or trash. Palm fronds are commonly burned or chopped up to be dispersed. However, palm fronds have a variety of nutrients.

Generally, palm fronds have an estimated Total Digestible Nutrient (TDN) content that can be greater than or equal to approximately 40% and/or less than or equal to approximately 60%. For example, palm fronds from Mexican Fan Palms (*Washingtonia Robustas*) have an estimated TDN content of approximately 51.8% on a dry matter basis. Similarly, Deglet Noor palm fronds can have a TDN content of approximately 52.1% on a dry matter basis. Oil palm fronds have been estimated to have a metabolizable energy (ME) content of approximately 5.65 MJ/kg. Palm fronds harvested during the spring, such as during and between March and May, can have higher energy and TDN contents than they do during other times during the year. Rather than being discarded, such palm fronds can be used in animal feed, helping generate an animal feed that is based on recycled products. Palm-based animal feeds can be used to feed a variety of animals, including horses or ruminants such as cattle, sheep, goats, pigs, or camels.

Many varieties of palms grow palm fruit, such as dates, which are also very nutritious. Generally, dates can have a TDN content that is greater than or equal to approximately 65% and/or less than or equal to approximately 90%. For example, dates from a Deglet Noor Palm tree can have a TDN content of approximately 87.9% on a dry basis. Dates from Canary Palms can have a TDN content of approximately 86.7% on a dry basis. In various embodiments described herein, dates and palm fronds can be combined in different forms and quantities in order to create a nutritious, effective, and sustainable animal feed from what was previously considered largely waste. Additionally, the main products of this feed can be grown in hot and dry conditions. In fact, these sources can thrive in conditions that might destroy products currently used in cattle feed.

According to some aspects, a palm frond and date based animal feed comprises about a 50:50 by weight mixture of palm fronds and dates, wherein the palm frond and date based animal feed comprises larger palm frond-date particles and smaller palm frond-date particles, wherein the larger palm frond-date particles and smaller palm frond-date particles are prepared by the process of: obtaining raw palm fronds with a moisture content of between about 1-15%; obtaining raw dates with a moisture content of less than about 10%; combining four parts by volume raw palm fronds with one part by volume raw dates and grinding the palm and dates together using about a ¼ inch to a 2 inch grinder; sorting the palm frond-date mixture in a trommel equipped with openings from about a ¼ inch to about a ½ inch in diameter; collecting the larger palm-date hay particles; collecting the smaller palm-date fine particles which pass through the screen of the trommel; mixing the palm frond-date hay particles and the palm frond-date fine particles in a ratio of between about 2:1 and 1.5:1 by volume to obtain palm frond and date based animal feed.

In some other aspects obtaining raw palm fronds with a moisture content of less than about 10% and/or less than about 15% are also contemplated. In some aspects, the raw dates contain the skin, the flesh, and/or pits of the fruit. In some aspects, the palm frond and date based animal feed has a total digestible nutrient (TDN) of greater than 50%, 55%, 60%, 65%, 70% or 75% of the dry matter basis. In some aspects, the palm frond and date based animal feed has a relative feed value (RFV) of greater than 170, 185, 200, 215, 230, 245 or 260. In some aspects, the larger palm frond-date particles are approximately equal to or less than 2 inches in length. In some aspects, the smaller palm frond-date particles comprise palm frond dust.

According to some aspects, a method of producing sweet palm hay is provided, the method comprising: obtaining raw palm fronds; drying the raw palm fronds to a moisture content of between approximately 1% and approximately 15%; obtaining raw dates; drying the raw dates to a moisture content of approximately 10% or less; combining in a 4:1 by volume ratio, dry palm fronds with dry dates into a palm frond-date mixture; introducing the palm frond-date mixture into a grinder having openings between about 0.2 to about 2 inches; using the grinder, grinding the palm frond-date mixture into first particles; sorting the first particles into a trommel equipped with a screen having openings between about 0.1 inch and 0.5 inch in diameter; collecting larger palm-date hay; collecting smaller palm frond-date grindings; and introducing the palm frond-date hay and the palm frond-date fines into a mixer at a ratio of between 1:1 and 2.5:1 by volume; using the mixer, mixing the palm frond-date hay and the frond-date fines into a mixture of sweet palm hay.

In some other aspects drying raw palm fronds to a moisture content of less than about 10% and/or less than about 15% is also contemplated. In some aspects, introducing the palm frond-date mixture into a grinder having openings between about 0.2 to about 0.5 inches. In some aspects, the trommel sorts the first particles at a rate of between about one ton an hour and twelve tons an hour. In some aspects, the raw dates contain the skin, the flesh, and/or pits of the fruit. In some aspects, the sweet palm hay has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. In some aspects, the raw palm fronds comprise palm fronds selected from the group consisting of *Washingtonia Robusta* palms, *Washingtonia Filifera* palms, and *Phoenix Canariensis* palms. In some designs, the palm fronds are selected from the group consisting of oil palms, fan palms (e.g., *Borassus palm*), date palms, and coconut palms. In some aspects, the raw dates comprise dates from a Deglet Noor palm or a Canary Palm. Some aspects further comprise the step of introducing the packaging the sweet palm hay into a bag. Some aspects further comprise the step of storing the sweet palm hay.

According to some aspects, a palm frond and date based animal feed comprises a mixture of palm frond component and a date component, wherein the palm frond component has a moisture content of between approximately 1% and approximately 15%; wherein the palm frond component comprises (i) palm fronds of approximately less than or equal to 2 inches in length and (ii) palm frond powder; wherein the date component has a moisture content of approximately 10% or less; and wherein the palm frond and date based animal feed comprising between 40-60% by weight palm frond component and 40-60% by weight date component.

In some aspects, the raw dates contain the skin, the flesh, and/or pits of the fruit. In some aspects, the sweet palm hay has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. In some aspects, the raw palm fronds comprises palm fronds selected from the group consisting of *Washingtonia Robusta* palms, *Washingtonia Filifera* palms, and *Phoenix Canariensis* palms. In some aspects, the raw dates comprises dates from a Deglet Noor palm or a Canary Palm.

According to some aspects an about 50:50 ratio by weight of a ground palm frond and ground date mixture is advantageous as a base feed for animals. For example, in one aspect, a double grind process for obtaining an approximately 50:50 ratio by weight of a ground palm frond and ground date mixture is advantageous as a base feed for a dairy cow. Additional nutritional components can be added to the palm frond and date base, including, for example, protein additives. In some aspects roughage can be added. In some aspects, a fruit/vegetable component can be added. In some aspects a sugar component can be added. In some aspects a roughening component can be added. In some aspects the feed mixture can be bagged. According to some aspects the double grind process and preferred ratios are advantageous to achieve a sweet palm hay that has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. Additional aspects and alternative combinations are described further herein for various animal feeds, the teachings of which may be relied upon individually or collectively in other advantageous combinations.

In some embodiments, additional additives can be combined with palm fruit and palm fronds in order to adjust nutritional content. For example, nutritional additives, such as urea, can be included to increase the available levels of nutritional content, such as protein, within the animal feed. In some embodiments, nutritional additives, such as wheat, corn, or other components described herein can be included to increase the available levels of nutritional content, such as protein, within the animal feed. Various ratios of palm fronds, palm fruit, and nutritional additives are described herein.

In some embodiments, feeds with palm fronds, palm fruits, and additives such as urea, wheat, sorghum, milo, and/or other suitable additives including varieties of grains, can serve as an independent animal feed. The various benefits of palm and palm fruit, however, make them desirable for use together or independently in different combinations with different types of animal feeds. Thus, in some embodiments, feeds with palm fronds, palm fruits, and additives such as urea, wheat, and/or other suitable additives, can serve as a base feed to be combined with additional components depending on the desired characteristics of a final feed. In some embodiments, palm fronds themselves can serve as a base feed to be mixed with additional components. In some embodiments, palm fruit and/or seeds can be combined with general base feeds, such as alfalfa, soy, corn, hay, or grass, which can also be mixed with a portion of palm fronds.

According to various embodiments described herein, an animal feed can include a processed palm frond component, a palm fruit component, and a nutritional additive. The palm fruit component and the nutritional additive can have a ratio by weight between 5:1 and 7:1. In some embodiments, the palm fruit can be dates. In some embodiments, the nutritional additive can be urea. In some embodiments, the nutritional additive can be wheat. In some embodiments, palm fruit component and the nutritional additive have a ratio by weight of approximately 6:1. In some embodiments, the processed palm frond component can have a moisture content between 10 and 14%. In some embodiments, the palm frond component, the palm fruit component, and the nutritional additive can have a ratio by weight of approximately 2000 parts palm frond to approximately 25 parts palm fruit to approximately 4 parts nutritional additive.

According to various embodiments described herein, a method of making an animal feed can include collecting palm fronds, shredding, chopping, or grinding the palm fronds, and combining a palm fruit component and a nutritional additive to the palm fronds, wherein the palm fruit component and the nutritional additive have a have a ratio by weight between 5:1 and 7:1. In some embodiments, the palm fruit can be date. In some embodiments the nutritional additive can be urea. In some embodiments, the nutritional additive can be wheat. In some embodiments, collecting palm fronds can include collecting palm fronds with a moisture content between about 10% and about 14%. In some embodiments, making an animal feed can include drying the palm fronds to a moisture content between about 10% and about 14%. In some embodiments, shredding, chopping, or grinding the palm fronds includes shredding the palm fronds. In some embodiments, the palm fronds can be chopped after they are shredded. In some embodiments, the palm fronds can be ground after they are chopped.

According to various embodiments described herein, a method of making an animal feed can include collecting palm fronds and drying the palm fronds in wind rows. The palm fronds can be shredded, chopped, and/or ground when dried to a desired moisture content. The palm fronds can be combined with a palm fruit component, such as dates, to the palm fronds. The dates can be combined, for example, in a ratio of 8 units by volume of palm fronds for every unit by volume of dates. In some embodiments, the dates can be combined in a ratio of 8 pounds of date for every 50 pounds of palm fronds. In some embodiments, the palm frond and date mixture can be chopped and/or ground. This mixture can be fed through a mill to collect mill run, such as wheat or other grain or material. In some embodiments, the resulting mixture can have approximately 30% mill run by weight. In some embodiments it can have more or less. The mixture of palm frond, date, and mill run can then be run through a feed compressing machine, such as a cubing machine or extruder (e.g., pelletizer).

In some embodiments, the palm fruit component and the nutritional additive can have a ratio by weight of approximately 6:1. In some embodiments, the palm fruit and nutritional additive components can be combined with the palm fronds according to a ratio by weight of approximately 2000 parts palm frond to approximately 25 parts palm fruit to approximately 4 parts nutritional additive.

In some embodiments, an animal feed can include a processed palm frond component, a palm fruit component, and a nutritional additive wherein the animal feed has a nutritional content at one or more of the following levels: approximately 15% crude protein, approximately 3% crude fat, approximately 25% crude fiber, approximately 12% ash, and approximately 0.5% minerals.

In some embodiments, the animal feed can have a nutritional content that includes a crude protein content that is greater than or equal to approximately 5% and/or less than or equal to approximately 30%, a crude fat content that is greater than or equal to approximately 2% and/or less than or equal to approximately 8%, a crude fiber content that is greater than or equal to approximately 15% and/or less than or equal to approximately 45%, an ash content that is greater than or equal to approximately 4% and/or less than or equal to approximately 17%, and a mineral content that is greater than or equal to approximately 0.1% and/or less than or equal to approximately 1%.

In some embodiments, the animal feed can have a nutritional content that includes a crude protein content that is greater than or equal to approximately 12% and/or less than or equal to approximately 15%, a crude fat content that is greater than or equal to approximately 2% and/or less than or equal to approximately 5%, a crude fiber content that is greater than or equal to approximately 20% and/or less than or equal to approximately 30%, an ash content that is greater than or equal to 8% and/or less than or equal to 12%, and a mineral content that is greater than or equal to 0.3% and/or less than or equal to 0.7%.

In some embodiments, an animal feed can include a palm frond component that includes chopped palm fronds having a moisture content between 10% and 25%; a palm fruit component including one or more of dates, palm berries, and palm seeds; and a nutritional additive. In some embodiments, the palm fruit component and the nutritional additive have a ratio by weight between 5:1 and 7:1. In some embodiments, the animal feed has a crude protein content between 5% and 30% and a fiber content between 15% and 45%.

In some embodiments, a method of making an animal feed from palm fronds can include collecting palm fronds, placing the palm fronds in rows, allowing the palm fronds to dry to a moisture content of between 10% and 25%, chopping the palm fronds, grinding the palm fronds, and combining a palm fruit component and a nutritional additive to the palm fronds. In some embodiments, the ratio of palm fronds to palm fruit can be between approximately 70:1 and approximately 90:1. In some embodiments, the combined palm fronds, palm fruit, and nutritional additive can be cubed.

In some embodiments, an animal feed can include a processed palm frond component, a palm fruit component, and a nutritional additive, wherein the nutritional additive is between 20 and 40 percent of a total weight of the animal feed. In some embodiments, the palm fruit can be date. In some embodiments, the nutritional additive can be wheat. In some embodiments, the processed palm frond components can have a moisture content between 10% and 14%. In some embodiments, the feed can be cube and/or pellet shaped. In some embodiments, the nutritional additive can be mill run from a mill. In some embodiments, the mill run comprises wheat.

In some embodiments, a method of cleaning a mill with an animal feed can include providing a base feed comprising a palm frond component and a fruit component, passing the base feed through an inlet to a mill that contains mill run different from the base feed, and collecting a mixture of the base feed and mill run from an outlet to the mill. In some embodiments, the mixture can include at least about 5 percent mill run by weight. In some embodiments, the mixture can include at least 20 percent or about 20 percent mill run by weight. In some embodiments, the mixture can include between 20 percent (or about 20 percent) and 40 percent (or about 40 percent) mill run by weight. In some embodiments, the ratio of the palm frond component to the fruit component in the base feed is about 8 to 1 by volume. In some embodiments, the ratio is about 8 to 10 by weight. In some embodiments, the mill run can include wheat. In some embodiments, the fruit component can be palm fruit, such as dates. In some embodiments, the mixture of the base feed and mill run can be fed through a feed compressing machine. In some embodiments, the feed compressing machine can be a cubing machine or a pelletizer.

DETAILED DESCRIPTION

Figure 1:
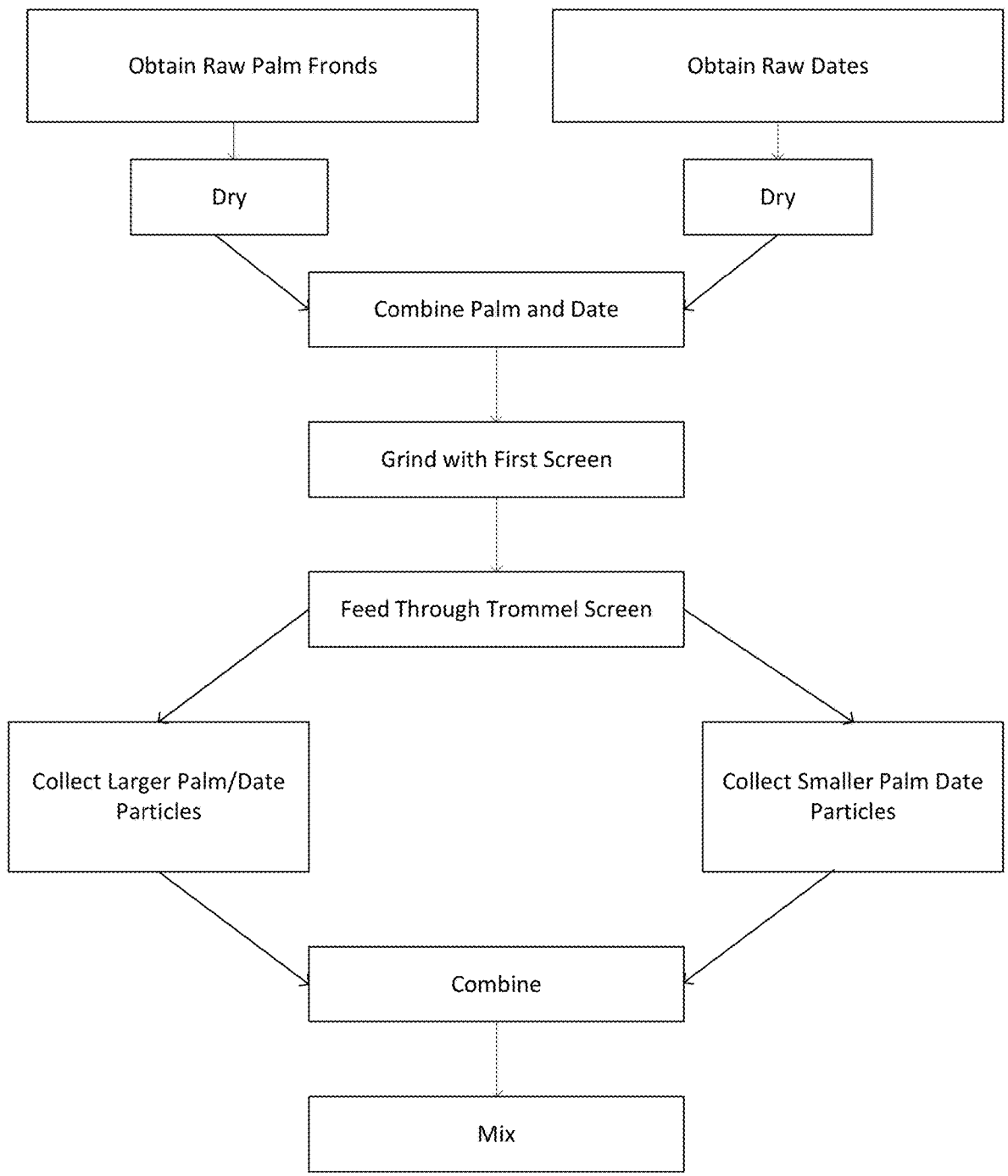
FIG. 1 is a block diagram of one embodiment of a method of producing a by-product of organic waste.

This application describes a variety of systems, methods and products, including byproducts of organic waste material that can be obtained through improved methods of their processing, recycling, and/or disposal. This application also describes various methods for recycling and/or disposing of these organic materials, including methods for obtaining byproducts associated with the processing of these organic materials. In some cases it can be advantageous to dispose of these organic waste materials by converting them into useful products. For example, organic materials can be turned into fuels, fertilizers, structural components, and/or animal feeds, etc. Yet with certain organic materials, the production of these byproducts has proven challenging. In particular, it can be challenging to adequately process organic and other waste products, such as palm fronds.

In some embodiments, systems and methods for processing organic waste into a bio-friendly byproduct can include introducing a first waste material comprising palm frond particles into a first grinder configured to expel particles having a length and/or diameter no greater than three inches, the first waste material having a moisture content below 20% by weight. The first grinder can be configured to grind the first waste material into first particles having a length less than three inches. The first particles of the first waste material can be introduced into a second grinder configured to expel particles having a length and/or diameter no greater than one inch. The second grinder is used to grind the first particles into second particles having a length less than 1 inch. A second waste material comprises palm dates that can be introduced into a third grinder configured to expel particles having a length and/or diameter no greater than one inch, the second waste material having a moisture content below 15% by weight. A third grinder is used to grind the second waste material into grinds and/or crumbles having a length and/or diameter less than one inch. The first waste material and the second waste material can be introduced into a mixer at a ratio of between 5:3 and 4:1. In some embodiments, the ratio can be 1:1. In some embodiments the ratio can be 2:1. Other ratios and various mixtures are contemplated as described in more detail herein. A mixer can be used to mix the first waste material and the second waste material into a mixture. In some embodiments, nutritional additives can be added. Ratios and types of nutritional additives are described further herein. Additional grinders may also be used before and/or after mixing. Byproducts can be extruded, bagged and/or otherwise packaged for transport and/or delivery.

One category of useful byproducts is animal feeds. In certain embodiments, waste material comprises palm fronds. Byproducts formed with a base of palm fronds and combined with flesh of fruit, such as palm fruit (e.g., dates), can be a sustainable and affordable feed product that can be developed in hot climates or anywhere the disposal of palm waste takes place. Palm fronds with less than a threshold moisture content are shredded, chopped and/or ground, and mixed with palm fruit. Additives such as urea can increase the nutritional content. Waste byproducts that include palm fronds, palm fruit, and/or additives can serve as a base feed for other components. Palm fronds can also serve as a base feed for other components. Animal feeds with a variety of bases can have palm fruit added. Animal feeds with a variety of bases, including palm fronds, can include a variety of other components added.

Processed palm fronds and palm fruit, such as dates, can be combined according to a variety of different ratios. For example, in some embodiments palm fronds and palm fruit can be combined according to a ratio by weight of approximately 80 pounds of processed palm fronds for each pound of palm fruit. In some embodiments, the ratio by weight of processed palm fronds to palm fruit can be greater than or equal to approximately 70 and/or less than or equal to approximately 90. In some embodiments, smaller ratios may be desired. For example, in some embodiments palm fronds and palm fruit can be combined according to a ratio by weight of approximately 8 pounds of processed palms fronds for each pound of palm fruit. In some embodiments, the ratio can be approximately 5 to 1, or even lower, such as approximately 2.5 to 1, 1 to 1, or less than 1 to 1. In some embodiments, palm fronds and palm fruit can be combined according to a ratio by weight of approximately 8 pounds of processed palm fronds for each 10 pounds of palm fruit. In some embodiments, this ratio can be approximately 5 pounds of processed palm fronds for each 10 pounds of palm fruit. In some embodiments, the ratio can be approximately 1 pound of processed palm fronds for each 10 pounds of palm fruit.

It may be desirable to express the ratio of a waste material (e.g., palm frond) to a binding agent (e.g., palm dates, grapes, raisins, apples, honey, etc.) as percentages of the total amount of waste material and binding agent. In some embodiments, the total amount of waste material and binding agent is about 90% waste material and about 10% binding agent by weight. In some embodiments, the proportion of waste material is between about 30% and 95% while the proportion of binding agent is between about 5% and 70% by weight. In some embodiments the proportion of waste material is between about 55% and 93% while the proportion of binding agent is between about 7% and 45% by weight. In some embodiments, the proportion of waste material is between about 75% and 91% of the proportion of binding agent is between about 9% and 25% by weight. These proportions may only describe the relationship between the waste material and binding agent. For example, if the proportion of waste material is 90% of the combination and proportion of binding agent is 10% by weight, the addition of other ingredients to the final byproduct (e.g., trophic additives, nutritional supplements, fill materials, fiber components, protein components, vegetable components, processing additives, scratch) may reduce the total proportion of waste material to be less than 90% and the total proportion of the binding agent to be less than 10%. However, it can be helpful to describe the proportions between the waste material and binding agent since this proportion may be influenced by the type of grinder available, the size of the screens used, the availability of waste materials and/or binding agent, the desired consistency, the desired palatability/taste of the waste byproduct, and/or any nutritional requirements of the waste byproduct.

In some embodiments, larger ratios may be desired. For example, in some embodiments palm fronds and palm fruit can be combined according to a ratio by weight of approximately 10 pounds of processed palms fronds for each pound of palm fruit. In some embodiments, the ratio can be approximately 12 to 1. In some embodiments, the ratio can be approximately 15 to 1, 20 to 1, or even larger, such as approximately 25 to 1 or greater in some embodiments.

In some embodiments, these ratios can be by volume instead of by weight. For example, a ratio by volume of 8 to 1 would indicate that a mixture of processed palm fronds and palm fruit was formed by mixing 8 scoops of processed palm fronds with 1 scoop of palm fruit. Preferably, in embodiments where processing machines are used, such as described further below, the ratio is such that the mixture is not too sticky to gum up or block the processing machine. In other embodiments, stickiness of the mixture is desirable and advantageous to produce a desired feed consistency and composition.

In some embodiments, nutritional additives can be added to the mixture to modify the desired nutritional content. For example, in some embodiments, urea can be combined with palm fronds and dates. This can increase the available protein content. Finding the correct mixture can help maximize the protein content. If too much urea is added, it may actually diminish the total protein content of the mixture. In some embodiments, a preferred ratio by weight of dates to urea within a palm frond base can be 6:1. In some embodiments the ratio by weight of dates to urea within a palm frond base can be greater than or equal to approximately 5:1 and/or less than or equal to approximately 7:1. In some embodiments, the ratio by weight of dates to urea within a palm frond base can be greater than or equal to approximately 11:2 and/or less than or equal to approximately 13:2. In some embodiments, the identified ratios of dates to urea can be by volume instead of weight.

In some embodiments, an animal feed can include approximately 98.6% palm frond by weight, approximately 1.2% date by weight, and approximately 0.2% urea by weight. In some embodiments, an animal feed can include weight-based ratios of palm frond to date to urea of 2000 to 25 to 4. The ratios of different components can vary according to different embodiments. In some embodiments, an animal feed can include weight-based ratios of palm frond to date to urea of 2000 to 24 to 4. In some embodiments, the weight-based ratio of palm frond to the combined weight of dates and urea can be between 65:1 and 75:1.

In some embodiments, other additives can be added to a mixture of palm fronds and palm fruit or to a mixture of palm fronds, palm fruit, and urea in order to modify the desired nutritional content. These additives can include, but are not limited to, almond shells, walnut husks, peanut shells, pits, and/or other rough, edible products; cotton seed, corn, wheat, brewer's grain, distiller's grain, potato, lettuce, tomato, peaches, apples, strawberries, soy, turnips, and/or fruit rind or peel, etc.; and/or beet pulp, sugar beets, sugar cane, citrus fruits, oranges, grapefruit, lemons, grapes, and/or raisins, etc.

For example, in some embodiments, wheat can be combined with palm fronds and dates or other fruit or sugar components. This can increase the protein content. Wheat can be in the form of mill run in some embodiments. In some embodiments, a preferred ratio by weight of wheat to dates within a palm frond base can be 3:1. In some embodiments the ratio by weight of wheat to dates within a palm frond base can be greater than or equal to approximately 1:1 and/or less than or equal to approximately 5:1. In some embodiments the ratio by weight of wheat to dates within a palm frond base can be greater than or equal to approximately 2:1 and/or less than or equal to approximately 4:1. In some embodiments the ratio by weight of wheat to dates within a palm frond base can be greater than or equal to approximately 5:1 or less than or equal to approximately 1:1. In some embodiments the ratio by weight of wheat to dates within a palm frond base can be greater than or equal to approximately 10:1. In some embodiments the ratio by weight of wheat to dates within a palm frond base can be greater than or equal to approximately 15:1. In some embodiments, the identified ratios of wheat to dates can be by volume instead of weight. In other embodiments, suitable mixtures can be achieved using another fruit and/or vegetable component and/or another protein component.

In some embodiments, an animal feed can include approximately 60% palm frond by weight, approximately 10% date or other fruit or sugar component by weight, and approximately 30% wheat or other grain component by weight. In some embodiments, an animal feed can include weight-based ratios of palm frond to date to wheat of 6 to 1 to 3. The ratios of different components can vary according to different embodiments. In some embodiments, an animal feed can include weight-based ratios of palm frond to date to wheat of 5 to 1 to 4. In some embodiments, an animal feed can include weight-based ratios of palm frond to date to wheat of 7 to 1 to 2. In some embodiments, an animal feed can include weight-based ratios of palm frond to date to wheat of 8 to 1 to 4. In some embodiments, an animal feed can include weight-based ratios of palm frond to date to wheat of 8 to 1 to 5. In some embodiments, an animal feed can include weight-based ratios of palm frond to date to wheat of 8 to 1 to 3. In some embodiments, an animal feed can include weight-based ratios of palm frond to date to wheat of 20 to 1 to 9. In some embodiments, the proportion of date can be greater, and an animal feed can include weight-based ratios of palm frond to date to wheat such as 0.75 to 1 to 0.75.

In some embodiments, the weight-based ratio of palm frond to the combined weight of dates and wheat can be between 1:1 and 2:1. In some embodiments, the weight-based ratio of palm frond to the combined weight of dates and wheat can be greater than 2:1. In some embodiments, the weight-based ratio of palm frond to the combined weight of dates and wheat can be less than 1:1. In other embodiments, suitable mixtures can be achieved using other fruit and/or vegetable components and/or other protein components.

In some embodiments, an animal feed can include lower proportions of a palm frond component. For example, in some embodiments an animal feed can include approximately 33% palm frond by weight, approximately 33% date or other fruit or sugar component by weight, and approximately 33% wheat or other grain component by weight. Thus, in some embodiments an animal feed can include weight-based ratios of palm frond to date to wheat of 1 to 1 to 1. In some embodiments, an animal feed can include weight-based ratios of palm frond to date to wheat of 0.8 to 1 to 0.8. In some embodiments, an animal feed can include weight-based ratios of palm frond to date to wheat of 0.1 to 1 to 0.5. In some embodiments, an animal feed can include weight-based ratios of palm frond to date to wheat of 2.5 to 1 to 1.

In some embodiments, the weight-based ratio of the combined weight of dates and wheat to the weight of palm frond can be between approximately 1:1 and approximately 15:1. In some embodiments, the weight-based ratio of the combined weight of dates and wheat to palm frond can be between approximately 1:1 and approximately 10:1. In some embodiments, the weight-based ratio of the combined weight of dates and wheat to palm frond can be between approximately 1:1 and approximately 5:1. In some embodiments, the weight-based ratio of the combined weight of dates and wheat to palm frond can be between approximately 1:1 and approximately 3:1.

Sweet Palm Feed

Figure 2:
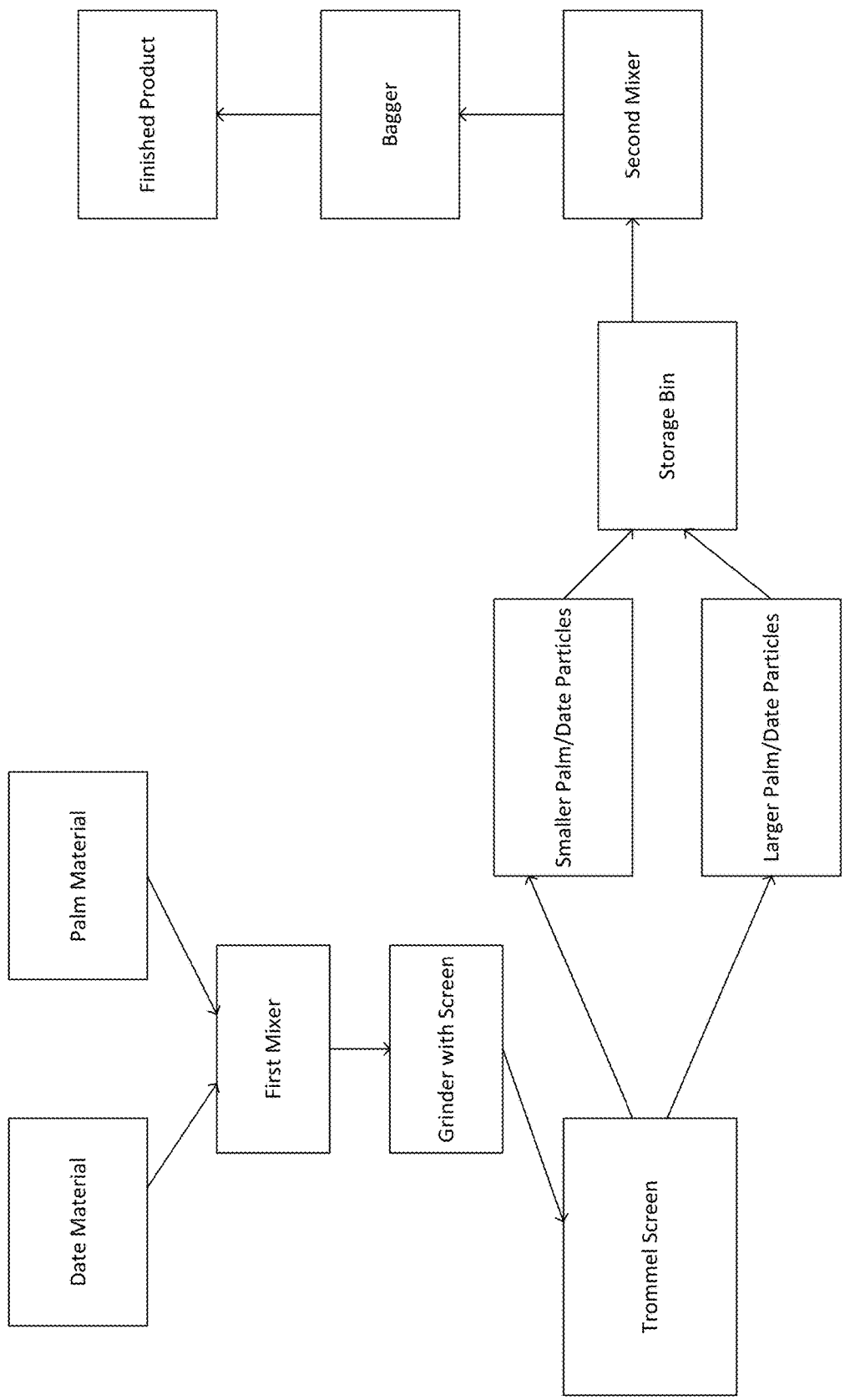
FIG. 2 is a block diagram of one embodiment of a method of processing a palm component and a date component.
Figure 3:
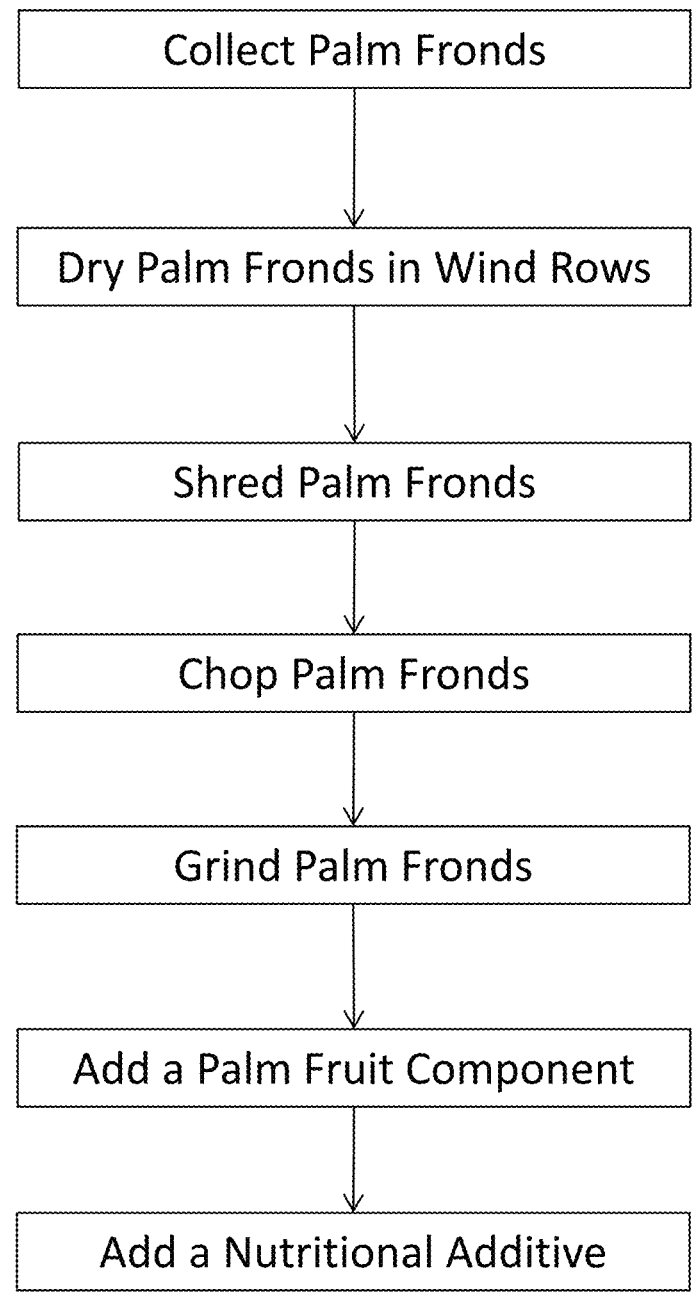
FIG. 3 is a block diagram of one embodiment of a method of preparing an animal feed.
Figure 4:
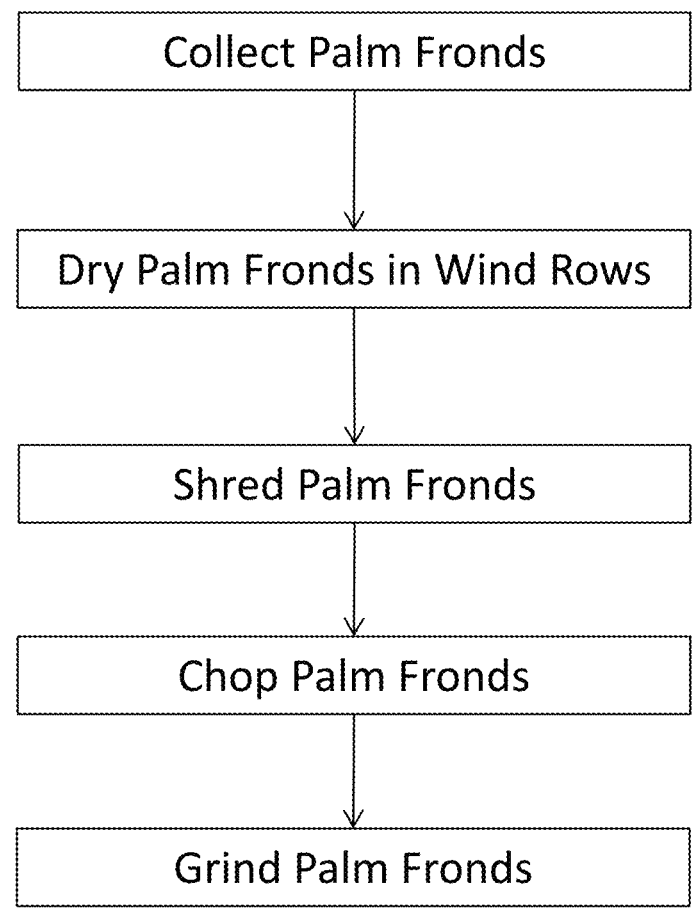
FIG. 4 is a block diagram of one embodiment of a method of processing a palm component.

With reference to FIGS. 1 and 2, and according to some aspects, a palm frond and date based animal feed sweet palm hay comprises about a 50:50 by weight mixture of palm fronds and dates, wherein the palm frond and date based animal feed comprises larger palm frond-date particles and smaller palm frond-date particles, wherein the larger palm frond-date particles and smaller palm frond-date particles are prepared by the process of: obtaining raw palm fronds with a moisture content of between about 1-15%; obtaining raw dates with a moisture content of less than about 10%; combining four parts by volume raw palm fronds with one part by volume raw dates and grinding the palm and dates together using about a ¼ inch to a 2 inch grinder; sorting the palm frond-date mixture in a trommel equipped with openings from about a ¼ inch to about a ½ inch in diameter; collecting the larger palm-date hay particles; collecting the smaller palm-date fine particles which pass through the screen of the trommel; mixing the palm frond-date hay particles and the palm frond-date fine particles in a ratio of between about 2:1 and 1.5:1 by volume to obtain palm frond and date based animal feed.

In some other aspects obtaining raw palm fronds with a moisture content of less than about 10% and/or less than about 15% are also contemplated. In some aspects, the raw dates contain the skin, the flesh, and/or pits of the fruit. In some aspects, the palm frond and date based animal feed has a total digestible nutrient (TDN) of greater than 50%, 55%, 60%, 65%, 70% or 75% of the dry matter basis. In some aspects, the palm frond and date based animal feed has a relative feed value (RFV) of greater than 170, 185, 200, 215, 230, 245 or 260. In some aspects, the larger palm frond-date particles are approximately equal to or less than 2 inches in length. In some aspects, the smaller palm frond-date particles comprise palm frond dust.

According to some aspects, a method of producing sweet palm hay is provided, the method comprising: obtaining raw palm fronds; drying the raw palm fronds to a moisture content of between approximately 1% and approximately 15%; obtaining raw dates; drying the raw dates to a moisture content of approximately 10% or less; combining in a 4:1 by volume ratio, dry palm fronds with dry dates into a palm frond-date mixture; introducing the palm frond-date mixture into a grinder having openings between about 0.2 to about 2 inches; using the grinder, grinding the palm frond-date mixture into first particles; sorting the first particles into a trommel equipped with a screen having openings between about 0.1 inch and 0.5 inch in diameter; collecting larger palm-date hay; collecting smaller palm frond-date grindings; and introducing the palm frond-date hay and the palm frond-date fines into a mixer at a ratio of between 1:1 and 2.5:1 by volume; using the mixer, mixing the palm frond-date hay and the frond-date fines into a mixture of sweet palm hay.

In some other aspects drying raw palm fronds to a moisture content of less than about 10% and/or less than about 15% is also contemplated. In some aspects, introducing the palm frond-date mixture into a grinder having openings between about 0.2 to about 0.5 inches. In some aspects, the trommel sorts the first particles at a rate of between about one ton an hour and twelve tons an hour. In some aspects, the raw dates contain the skin, the flesh, and/or pits of the fruit. In some aspects, the sweet palm hay has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. In some aspects, the raw palm fronds comprises palm fronds selected from the group consisting of *Washingtonia Robusta* palms, *Washingtonia Filifera* palms, and *Phoenix Canariensis* palms. In some aspects, the raw dates comprises dates from a Deglet Noor palm or a Canary Palm. Some aspects further comprise the step of introducing the packaging the sweet palm hay into a bag. Some aspects further comprise the step of storing the sweet palm hay.

According to some aspects, a palm frond and date based animal feed comprises a mixture of palm frond component and a date component, wherein the palm frond component has a moisture content of between approximately 1% and approximately 15%; wherein the palm frond component comprises (i) palm fronds of approximately less than or equal to 2 inches in length and (ii) palm frond powder; wherein the date component has a moisture content of approximately 10% or less; and wherein the palm frond and date based animal feed comprising between 40-60% by weight palm frond component and 40-60% by weight date component.

In some aspects, the raw dates contain the skin, the flesh, and/or pits of the fruit. In some aspects, the sweet palm hay has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. In some aspects, the raw palm fronds comprises palm fronds selected from the group consisting of *Washingtonia Robusta* palms, *Washingtonia Filifera* palms, and *Phoenix Canariensis* palms. In some aspects, the raw dates comprises dates from a Deglet Noor palm or a Canary Palm.

According to some aspects an about 50:50 ratio by weight of a ground palm frond and ground date mixture is advantageous as a base feed for animals. For example, in one aspect, a double grind process for obtaining an approximately 50:50 ratio by weight of a ground palm formed and ground date mixture is advantageous as a base feed for a dairy cow. Additional nutritional components can be added to the palm frond and date base, including, for example, protein additives. In some aspects roughage can be added. In some aspects, a fruit/vegetable component can be added. In some aspects a sugar component can be added. In some aspects a roughening component can be added. In some aspects the feed mixture can be bagged. According to some aspects the double grind process and preferred ratios are advantageous to achieve a sweet palm hay that has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. Additional aspects and alternative combinations are described further herein for various animal feeds, the teachings of which may be relied upon individually or collectively in other advantageous combinations.

In some embodiments, nutritional additives can be added to the mixture to modify the desired nutritional content. For example, in some embodiments, urea can be combined with palm fronds and dates. This can increase the available protein content. Finding the correct mixture can help maximize the protein content. If too much urea is added, it may actually diminish the total protein content of the mixture. In some embodiments, a preferred ratio by weight of dates to urea within a palm frond base can be 6:1. In some embodiments the ratio by weight of dates to urea within a palm frond base can be greater than or equal to approximately 5:1 and/or less than or equal to approximately 7:1. In some embodiments, the ratio by weight of dates to urea within a palm frond base can be greater than or equal to approximately 11:2 and/or less than or equal to approximately 13:2. In some embodiments, the identified ratios of dates to urea can be by volume instead of weight.

In some embodiments, an animal feed can include approximately 98.6% palm frond by weight, approximately 1.2% date by weight, and approximately 0.2% urea by weight. In some embodiments, an animal feed can include weight-based ratios of palm frond to date to urea of 2000 to 25 to 4. The ratios of different components can vary according to different embodiments. In some embodiments, an animal feed can include weight-based ratios of palm frond to date to urea of 2000 to 24 to 4. In some embodiments, the weight-based ratio of palm frond to the combined weight of dates and urea can be between 65:1 and 75:1.

In some embodiments, other additives can be added to a mixture of palm fronds and palm fruit or to a mixture of palm fronds, palm fruit, and urea in order to modify the desired nutritional content. These additives can include, but are not limited to, almond shells, walnut husks, peanut shells, pits, and/or other rough, edible products; cotton seed, corn, wheat, brewer's grain, distiller's grain, potato, lettuce, tomato, peaches, apples, strawberries, soy, turnips, and/or fruit rind or peel, etc.; and/or beet pulp, sugar beets, sugar cane, citrus fruits, oranges, grapefruit, lemons, grapes, and/or raisins, etc.

For example, in some embodiments, wheat can be combined with palm fronds and dates or other fruit or sugar components. This can increase the protein content. Wheat can be in the form of mill run in some embodiments. In some embodiments, a preferred ratio by weight of wheat to dates within a palm frond base can be 3:1. In some embodiments the ratio by weight of wheat to dates within a palm frond base can be greater than or equal to approximately 1:1 and/or less than or equal to approximately 5:1. In some embodiments the ratio by weight of wheat to dates within a palm frond base can be greater than or equal to approximately 2:1 and/or less than or equal to approximately 4:1. In some embodiments the ratio by weight of wheat to dates within a palm frond base can be greater than or equal to approximately 5:1 or less than or equal to approximately 1:1. In some embodiments the ratio by weight of wheat to dates within a palm frond base can be greater than or equal to approximately 10:1. In some embodiments the ratio by weight of wheat to dates within a palm frond base can be greater than or equal to approximately 15:1. In some embodiments, the identified ratios of wheat to dates can be by volume instead of weight. In other embodiments, suitable mixtures can be achieved using another fruit and/or vegetable component and/or another protein component.

In some embodiments, an animal feed can include approximately 60% palm frond by weight, approximately 10% date or other fruit or sugar component by weight, and approximately 30% wheat or other grain component by weight. In some embodiments, an animal feed can include weight-based ratios of palm frond to date to wheat of 6 to 1 to 3. The ratios of different components can vary according to different embodiments. In some embodiments, an animal feed can include weight-based ratios of palm frond to date to wheat of 5 to 1 to 4. In some embodiments, an animal feed can include weight-based ratios of palm frond to date to wheat of 7 to 1 to 2. In some embodiments, an animal feed can include weight-based ratios of palm frond to date to wheat of 8 to 1 to 4. In some embodiments, an animal feed can include weight-based ratios of palm frond to date to wheat of 8 to 1 to 5. In some embodiments, an animal feed can include weight-based ratios of palm frond to date to wheat of 8 to 1 to 3. In some embodiments, an animal feed can include weight-based ratios of palm frond to date to wheat of 20 to 1 to 9. In some embodiments, the proportion of date can be greater, and an animal feed can include weight-based ratios of palm frond to date to wheat such as 0.75 to 1 to 0.75.

In some embodiments, the weight-based ratio of palm frond to the combined weight of dates and wheat can be between 1:1 and 2:1. In some embodiments, the weight-based ratio of palm frond to the combined weight of dates and wheat can be greater than 2:1. In some embodiments, the weight-based ratio of palm frond to the combined weight of dates and wheat can be less than 1:1. In other embodiments, suitable mixtures can be achieved using other fruit and/or vegetable components and/or other protein components.

In some embodiments, an animal feed can include lower proportions of a palm frond component. For example, in some embodiments an animal feed can include approximately 33% palm frond by weight, approximately 33% date or other fruit or sugar component by weight, and approximately 33% wheat or other grain component by weight. Thus, in some embodiments an animal feed can include weight-based ratios of palm frond to date to wheat of 1 to 1 to 1. In some embodiments, an animal feed can include weight-based ratios of palm frond to date to wheat of 0.8 to 1 to 0.8. In some embodiments, an animal feed can include weight-based ratios of palm frond to date to wheat of 0.1 to 1 to 0.5. In some embodiments, an animal feed can include weight-based ratios of palm frond to date to wheat of 2.5 to 1 to 1.

In some embodiments, the weight-based ratio of the combined weight of dates and wheat to the weight of palm frond can be between approximately 1:1 and approximately 15:1. In some embodiments, the weight-based ratio of the combined weight of dates and wheat to palm frond can be between approximately 1:1 and approximately 10:1. In some embodiments, the weight-based ratio of the combined weight of dates and wheat to palm frond can be between approximately 1:1 and approximately 5:1. In some embodiments, the weight-based ratio of the combined weight of dates and wheat to palm frond can be between approximately 1:1 and approximately 3:1.

Dates and/or other palm fruit can be added to the palm fronds according to a variety of methods. In some embodiments, the dates can be diced, chopped, or crumbled and mixed in as such. In some embodiments the dates can be chopped into fine crystals, having a consistency roughly equivalent to sugar. In some embodiments, the dates can be liquefied and poured or sprayed onto the palm fronds. In some embodiments, a liquid, such as water, can be added to the dates to make them easier to pour, spray, and/or mix with the palm fronds. In some embodiments additional additives, such as the urea and/or wheat, can be mixed with the dates before being mixed with the palm fronds. In some embodiments, additional additives can be added to the palm fronds before or after the dates. In some embodiments, date (or other additive) and palm frond can be chopped and/or ground after the dates (or other additive) and palm fronds have been mixed together.

The mixtures described herein can produce a product that rivals or surpasses the nutritional content of current feeds. For example, in some embodiments a mixture can have a TDN content of approximately 55%. It can have an a crude protein content of approximately 15%, a crude fat content of approximately 2.7%, a crude fiber content of approximately 25%, and an ash content of approximately 12%. In some embodiments, additional minerals can be included, either through the urea or other additive, and the final result can have approximately 0.5% of minerals.

In some embodiments a mixture can have varying levels of a crude protein content. For example, in some embodiments a mixture can have a crude protein content that is greater than or equal to approximately 1% and/or less than or equal to approximately 10%. In some embodiments a mixture can have a crude protein content that is greater than or equal to approximately 2% and/or less than or equal to approximately 6%. In some aspects, one or more nutritional additives can be added such that the mixture can have a crude protein content that is greater than or equal to approximately 5% and/or less than or equal to approximately 30%. In some embodiments, a mixture can have a crude protein content that is greater than or equal to approximately 8% and/or less than or equal to approximately 15%. In some embodiments, a mixture can have a crude protein content that is greater than or equal to approximately 12% and/or less than or equal to approximately 15%. In some embodiments, a desired protein content can depend on the type of animal expected to eat the feed. For example, in some embodiments feed prepared for dairy cattle can have a crude protein content that is greater than or equal to approximately 10% and/or less than or equal to approximately 20%. In some embodiments, feed prepared for beef cattle can have a crude protein content that is greater than or equal to approximately 20% and/or less than or equal to approximately 30%.

Other nutritional content of mixtures described herein can similarly vary. For example, in some embodiments a mixture can have a TDN that is greater than or equal to approximately 45% and/or less than or equal to approximately 65%. In some embodiments a mixture can have a TDN that is greater than or equal to approximately 50% and/or less than or equal to approximately 60%. In some embodiments a mixture can have a TDN that is greater than or equal to approximately 60% and/or less than or equal to approximately 70%. In some embodiments a mixture can have a TDN that is greater than or equal to approximately 70% and/or less than or equal to approximately 80%. The unexpectedly high value of the TDN of the sweet palm hay is easy to digest, results in fast weight gain and imparts glossy coats. Another unexpected result is that animals fed a diet of sweet palm hay produce a limited-odor and/or odorless manure because the sweet palm hay is thoroughly digested in the gut of the animal. The limited-odor and/or odorless manure produced by animals fed upon sweet palm hay limits and/or does not attract flies or other insects or pests.

In some embodiments a mixture can have a crude fat content that can be greater than or equal to approximately 2% and/or less than or equal to approximately 8%. In some embodiments a mixture can have a crude fat content that can be greater than or equal to approximately 2% and/or less than or equal to approximately 5%.

Similarly, in some embodiments a mixture can have a fiber content that can be greater than or equal to approximately 15% and/or less than or equal to approximately 45%. In some embodiments, a mixture can have a fiber content that can be greater than or equal to approximately 20% and/or less than or equal to approximately 30%.

The ash content in some embodiments can be greater than or equal to 4% and/or less than or equal to 17%. In some embodiments, the ash content can be greater than or equal to approximately 8% and/or less than or equal to approximately 12%. In some embodiments laws may limit the ash content that can be in the feed, and the ash content can be capped at a legal limit, for example at 12%. The amount of minerals and/or additives can in some embodiments be greater than or equal to approximately 0.2% and/or less than or equal to approximately 1%.

The use of any type of palm frond is contemplated. For example, Washington Robustas (Mexican Fan Palms), *Washingtonia Filiferas* (California Fan Palms), *Phoenix Canariensis* (Canary Island Date Palms), *Phoenix Dactylifera* (Date Palms), or any other date or oil palm can be used. Similarly, any type of date can be used. For example, a Deglet Noor palm, or a Canary Palm can be used. The dates may include the skin, the flesh, and/or pits of the fruit. Preferably, the dates are allowed to dry until they have a moisture content less than or equal to approximately 10%. In some embodiments, a moisture content of the dates is greater than or equal to approximately 5% and/or less than or equal to approximately 12%. In some embodiments, a moisture content greater than or equal to approximately 3% and/or less than or equal to approximately 15% can be used. In some embodiments, a moisture content greater than or equal to approximately 4% and/or less than or equal to approximately 8% can be used. In some embodiments the moisture content can exceed 10%. In some embodiments, the dates are dried to a moisture content of less than about 11%. In some embodiments, other fruits or materials besides dates can be used. For example, palm seeds or other types of palm fruit, such as oil palm berries, can be used instead of or in addition to dates. These alternative fruit or fruit mixtures can be combined with palm fronds and/or other additives such as urea and/or wheat according to the various ratios described herein.

Palm fronds can be tough, and general processing used for other types of feed bases, such as alfalfa, to prepare for use in feeds may be insufficient or too expensive for palm fronds. For example, placing raw palm fronds into a tub grinder may not produce palm fronds that are sufficiently chopped to be used in feeds. Additionally, raw palm fronds are generally too wet to be thrown directly into a tub grinder or other grinding or chopping machine. A variety of processes can be used to put the palm fronds into a form suitable for feed before combining them with dates or other products. FIG. 1 illustrates one method that can be used to process the raw palm fronds in combination with raw dates. Other methods can be used and variations of the described method can be used as well. In some embodiments, once palm fronds have been collected, they can be laid out in wind rows. This can allow the wind and/or ambient air to dry the palm fronds. Steps can be taken to ensure growth of mold within the palm fronds is prevented or limited. For example, the wind rows can be sized such that the palm fronds are not packed too tightly or thickly, allowing fronds in the middle to dry. Additionally or alternatively, the fronds can be periodically turned over or mixed to prevent the growth of mold and to make sure that the fronds dry evenly. Preferably the palm fronds are arranged for drying in a manner that limits the amount of heat generated by the stacked palm fronds during the drying process.

Preferably, the fronds are allowed to dry until they have a moisture content greater than or equal to approximately 1% and/or less than or equal to approximately 15% In some embodiments, palm fronds with a moisture content greater than or equal to approximately 10% and/or less than or equal to approximately 20% can be used. In some embodiments, a moisture content greater than or equal to approximately 5% and/or less than or equal to approximately 15% can be used. In some embodiments, a moisture content greater than or equal to approximately 1% and/or less than or equal to approximately 10% can be used. In some embodiments, a moisture content greater than or equal to approximately 1% and/or less than or equal to approximately 25% can be used. In some embodiments the moisture content can exceed 25%.

Once the palm fronds have reached a desired moisture content, for example between about 1% and 15%, they can be mixed with the raw dates and processed according to a variety of methods. In some embodiments, the palm fronds and date mixture can be fed through a grinder. As an example, a grinder sold under the brand name Vermeer can be used to grind the palm fronds and date mixture. In some embodiments, the grinder is equipped with a screen having openings greater than or equal to approximately 0.1 inch and/or less than or equal to approximately 2 inches. In some embodiments, the screen has openings of less than approximately 1 inch. In some embodiments, the openings are of less than approximately 0.8 inch. In some embodiments, the openings are of less than approximately 0.6 inch. In some embodiments, the grinder is equipped with a screen having openings greater than or equal to approximately 0.2 inch and/or less than or equal to approximately 0.7 inch. In some embodiments, the screen has openings of less than approximately 0.5 inch. In some embodiments, the openings are of less than approximately 0.4 inch. In some embodiments, the openings are of less than approximately 0.3 inch.

Once the palm fronds and date mixture have been ground and screened, a trommel screen can be used to sort the palm fronds and date mixture into two piles: finer pieces and longer pieces. As an example, a trommel sold under the brand name Vermeer can be used. One embodiment of this method of processing palm fronds and dates with a grinder is illustrated in FIG. 1.

The processed palm fronds and date sweet palm hay can form a base product that can be combined according to the various mixtures described herein, forming an animal feed. In some embodiments, various mixtures, such as mixtures described herein, can be formed within a grinder. Thus, for example, in some embodiments palm fruit and/or other additives can be added with the palm fronds into the grinder.

Once a desired formulation has been achieved, the products can be prepared for use according to a variety of manners. In some embodiments, the feed can be left loose as initially mixed. In some embodiments, the feed can be baled or packaged. In some embodiments, baling or packaging can be done after feed has been processed. One advantage of mixing dates into the palm fronds is that the palm frond powder can help provide a binding function, making it easier to grind the sticky dates. It is understood that "hay" is a broad term and are used in its ordinary sense in this application, including, for example, to refer broadly to a dried and cut herbage which is used for fodder. Similarly, "cube" is a broad term and is used in its ordinary sense in this application, including, for example, to refer broadly to a compressed feed mixture. References to a cubed shape can refer to a generally square or rectangular shape or to having a generally square or rectangular shaped cross section, but other shapes and cross sections are possible and contemplated, such as, for example, pellets and/or generally cylindrical shapes and/or shapes with a circular or rounded cross section. Cubed feed may have one or more sides or dimensions that are longer than one or more of the other sides or dimensions. In some embodiments, different cubes within a batch of cubed feed may have different dimensions from other cubes within the batch. Additionally, the cubes do not necessarily have defined shapes, sides, edges or corners.

In some embodiments cubes or other forms of compressed feed can be formed with a feed compressing machine, such as a cubing machine or an extruder (e.g., pelletizer). In some embodiments, the machine can include a grinder that can mix and/or grind the components. In such embodiments, the grinder of the feed compressing machine can be used in addition to or instead of a grinder during the process described with respect to FIG. 2. In some embodiments, the palm fronds added to the feed compressing machine can have been ground into a powder. The machine can convey the resulting feed toward an area that can heat and compress the feed through a die or dies that shapes the feed into a cubed shape. In some embodiments a liquid, such as water, can be added to the mixture as it is compressed through a die. Different dies can produce compressed feed of different sizes and/or shapes. After the feed passes through the die or dies the feed can be conveyed to an area for packaging and/or shipping. In some embodiments, the palm component can be processed into a powder that can be combined with the palm fruit component and one or more nutritional additives and then compressed or formed into cubes and/or other shapes. In some embodiments a powdered palm component can be collected and stored for use as a base or component for other feed mixtures. In some embodiments a palm component in a shredded, chopped, or ground form can be collected and stored for use as a base or component for other feed mixtures.

In some embodiments, a mixture can be passed through a filter, such as a screen or strainer, after it goes through a grinder, whether a first grinder and/or a grinder associated with a feed compressing machine. This can help remove large pieces and hard pieces that might not grind up, such as pits of dates. In some embodiments, a mixture can pass through multiple filters. For example, a grinder may include a filter, and it may be desirable to pass the ground material through a second filter before it goes into the grinder or after it comes out of the grinder.

Cubing the feed can present a variety of advantages. For example, cubed feed can be generally easier and more efficient to ship and/or store. As a further example, because cubes can be compressed when formed, they can have a greater density than loose feed allowing for more feed by mass to fit within the same volume. In some embodiments, cubes can be shipped and/or stored in large containers, such as sacks, boxes, or other containers. In some embodiments, containers can be sized to hold 1000 lbs of cubed feed. In some embodiments they can hold more or less. In some embodiments, cubes can be stored and/or shipped loosely.

Cubing the feed can also extend the shelf life of the feed. For example, in some embodiments loose feed might be good for about a year. Cubed feed can be good for significantly longer. In some embodiments, packaging loose feed or cubed feed can also extend the shelf life of the feed.

In some embodiments, a base feed can be passed through a mill to collect scrap material left in the mill that can be added to the feed. For example, in some embodiments a base feed including a mixture of palm fronds and palm fruit, such as dates, can be fed through a mill that had previously been used to process or transport a first, different feed product. The scraps of the first feed product that remain within the mill (referred to as the "mill run") can be picked up by the base feed and mixed in with it as an additive. For example, a palm frond and palm fruit mixture can be passed through a mill that had previously had wheat or other grains pass through, such as sorghum, milo, corn, etc. The mill run can act as an additive to the palm frond and palm fruit mixture and can add a protein component to the mixture. In some embodiments, this can provide a desired nutritional content for the resulting feed and can also serve to clean the mill run from the various components of the mill, such as tanks, flues, and/or chutes. This can help minimize and/or eliminate cleaning costs that would otherwise be incurred. In some embodiments, the addition of a palm fruit to a base feed passed through the mill can help collect mill run by helping the base feed to adhere to the mill run. Additionally, as the base feed passes through the mill, the mill can help adequately mix the mill run with the base feed.

Figure 5A:
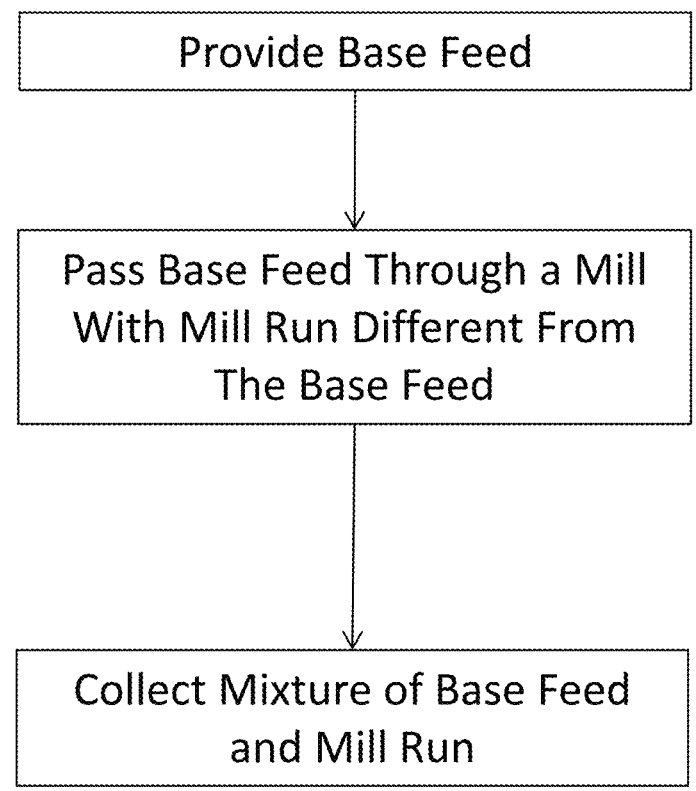
FIG. 5A is a block diagram of one embodiment of a method of cleaning a mill.

FIG. 5A illustrates one embodiment of this method. A base feed can be provided and then passed through a mill. Preferably, the mill had previously been used for a different mixture or material, such as wheat or other grain or additive. In some embodiments, the base feed can include a palm frond component and a fruit component. The fruit component can include palm fruit and/or other component that helps the base feed adhere to the mill run. Thus, for example, in some embodiments the fruit component can include peaches, apples, strawberries, turnips, fruit rind or peel, beet pulp, sugar beets, sugar cane, citrus fruits, oranges, grapefruit, lemons, grapes, and/or raisins, etc. The mixture, which can contain a combination of the base feed and the mill run from the different mixture or material, can then be collected.

Figure 5B:
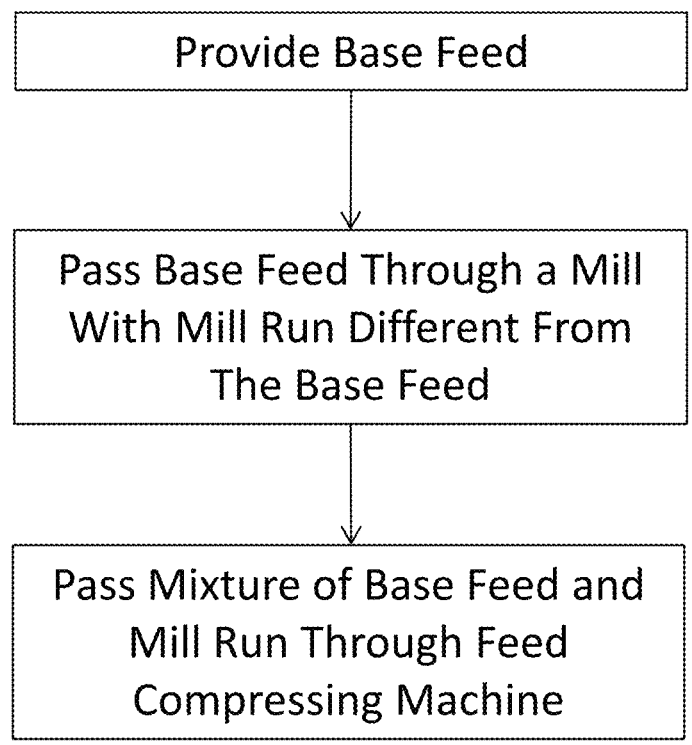
FIG. 5B is a block diagram of one embodiment of a method of preparing a compressed feed mixture such as a cubed and/or pelletized animal feed mixture.

In some embodiments, as illustrated in FIG. 5B, the mixture of the base feed and mill run can be passed through a feed compressing machine, such as a cubing machine or a pelletizer. In some embodiments, the mill can be connected to the feed compressing machine such that the mixture of the base feed and mill run can pass directly into the feed compressing machine from the mill. In such embodiments, the mill can also help provide a desired rate of mixed feed into the feed compressing machine. In some embodiments, the mixture of the base feed and mill run can be collected first from the mill and then inserted into a feed compressing machine.

In some embodiments, a base feed can include any of the feeds described herein, such as various mixtures of processed palm fronds and palm fruit. In some embodiments, a base feed passed through a mill to collect mill run can have at least 5 percent or about 5 percent mill run by weight. In some embodiments, a base feed passed through a mill to collect mill run can have at least 10 percent or about 10 percent mill run by weight. In some embodiments, a base feed passed through a mill to collect mill run can have at least 20 percent or about 20 percent mill run by weight.

In some embodiments, a base feed passed through a mill to collect mill run can have between about 20 and about 40 percent mill run by weight. In some embodiments, a base feed passed through a mill to collect mill run can have between about 10 and about 30 percent mill run by weight. In some embodiments, a base feed passed through a mill to collect mill run can have between about 25 and about 35 percent mill run by weight. In some embodiments, a base feed passed through a mill to collect mill run can have between about 5 and about 20 percent mill run by weight. In some embodiments, a base feed passed through a mill to collect mill run can have greater than 40 percent mill run by weight, such as between approximately 40 percent and approximately 50 percent mill run by weight.

With reference to FIGS. 1 and 2, and according to some aspects, a palm frond and date based animal feed sweet palm hay comprises about a 50:50 by weight mixture of palm fronds and dates, wherein the palm frond and date based animal feed comprises larger palm frond-date particles and smaller palm frond-date particles, wherein the larger palm frond-date particles and smaller palm frond-date particles are prepared by the process of: obtaining raw palm fronds with a moisture content of between about 1-15%; obtaining raw dates with a moisture content of less than about 10%; combining four parts by volume raw palm fronds with one part by volume raw dates and grinding the palm and dates together using about a ¼ inch to a 2 inch grinder; sorting the palm frond-date mixture in a trommel equipped with openings from about a ¼ inch to about a ½ inch in diameter; collecting the larger palm-date hay particles; collecting the smaller palm-date fine particles which pass through the screen of the trommel; mixing the palm frond-date hay particles and the palm frond-date fine particles in a ratio of between about 2:1 and 1.5:1 by volume to obtain palm frond and date based animal feed.

In some other aspects obtaining raw palm fronds with a moisture content of less than about 10% and/or less than about 15% are also contemplated. In some aspects, the raw dates contain the skin, the flesh, and/or pits of the fruit. In some aspects, the palm frond and date based animal feed has a total digestible nutrient (TDN) of greater than 50%, 55%, 60%, 65%, 70% or 75% of the dry matter basis. In some aspects, the palm frond and date based animal feed has a relative feed value (RFV) of greater than 170, 185, 200, 215, 230, 245 or 260. In some aspects, the larger palm frond-date particles are approximately equal to or less than 2 inches in length. In some aspects, the smaller palm frond-date particles comprise palm frond dust.

According to some aspects, a method of producing sweet palm hay is provided, the method comprising: obtaining raw palm fronds; drying the raw palm fronds to a moisture content of between approximately 1% and approximately 15%; obtaining raw dates; drying the raw dates to a moisture content of approximately 10% or less; combining in a 4:1 by volume ratio, dry palm fronds with dry dates into a palm frond-date mixture; introducing the palm frond-date mixture into a grinder having openings between about 0.2 to about 2 inches; using the grinder, grinding the palm frond-date mixture into first particles; sorting the first particles into a trommel equipped with a screen having openings between about 0.1 inch and 0.5 inch in diameter; collecting larger palm-date hay; collecting smaller palm frond-date grindings; and introducing the palm frond-date hay and the palm frond-date fines into a mixer at a ratio of between 1:1 and 2.5:1 by volume; using the mixer, mixing the palm frond-date hay and the frond-date fines into a mixture of sweet palm hay.

In some other aspects drying raw palm fronds to a moisture content of less than about 10% and/or less than about 15% is also contemplated. In some aspects, introducing the palm frond-date mixture into a grinder having openings between about 0.2 to about 0.5 inches. In some aspects, the trommel sorts the first particles at a rate of between about one ton an hour and twelve tons an hour. In some aspects, the raw dates contain the skin, the flesh, and/or pits of the fruit. In some aspects, the sweet palm hay has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. In some aspects, the raw palm fronds comprises palm fronds selected from the group consisting of *Washingtonia Robusta* palms, *Washingtonia Filifera* palms, and *Phoenix Canariensis* palms. In some aspects, the raw dates comprises dates from a Deglet Noor palm or a Canary Palm. Some aspects further comprise the step of introducing the packaging the sweet palm hay into a bag. Some aspects further comprise the step of storing the sweet palm hay.

According to some aspects, a palm frond and date based animal feed comprises a mixture of palm frond component and a date component, wherein the palm frond component has a moisture content of between approximately 1% and approximately 15%; wherein the palm frond component comprises (i) palm fronds of approximately less than or equal to 2 inches in length and (ii) palm frond powder; wherein the date component has a moisture content of approximately 10% or less; and wherein the palm frond and date based animal feed comprising between 40-60% by weight palm frond component and 40-60% by weight date component.

In some aspects, the raw dates contain the skin, the flesh, and/or pits of the fruit. In some aspects, the sweet palm hay has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. In some aspects, the raw palm fronds comprises palm fronds selected from the group consisting of *Washingtonia Robusta* palms, *Washingtonia Filifera* palms, and *Phoenix Canariensis* palms. In some aspects, the raw dates comprises dates from a Deglet Noor palm or a Canary Palm.

According to some aspects an about 50:50 ratio by weight of a ground palm frond and ground date mixture is advantageous as a base feed for animals. For example, in one aspect, a double grind process for obtaining an approximately 50:50 ratio by weight of a ground palm fornd and ground date mixture is advantageous as a base feed for a dairy cow. Additional nutritional components can be added to the palm frond and date base, including, for example, protein additives. In some aspects roughage can be added. In some aspects, a fruit/vegetable component can be added. In some aspects a sugar component can be added. In some aspects a roughening component can be added. In some aspects the feed mixture can be bagged. According to some aspects the double grind process and preferred ratios are advantageous to achieve a sweet palm hay that has a total digestible nutrient (TDN) of greater than 50%, 55%, 60%, 65%, 70% or 75% of the dry matter basis. In some aspects, the sweet palm hay has a relative feed value (RFV) of greater than 170, 185, 200, 215, 230, 245 or 260. Additional aspects and alternative combinations are described further herein for various animal feeds, the teachings of which may be relied upon individually or collectively in other advantageous combinations.

Other systems, methods and products, including byproducts of organic waste material that can be obtained through improved methods of their processing, recycling, and/or disposal. In some embodiments, systems and methods for processing organic waste into a bio-friendly byproduct can include introducing a first waste material comprising palm frond particles into a first grinder configured to expel particles having a length and/or diameter no greater than three inches, the first waste material having a moisture content below 20% by weight. The first grinder can be configured to grind the first waste material into first particles having a length less than three inches. The first particles of the first waste material can be introduced into a second grinder configured to expel particles having a length and/or diameter no greater than one inch. The second grinder is used to grind the first particles into second particles having a length less than 1 inch. A second waste material comprises palm dates that can be introduced into a third grinder configured to expel particles having a length and/or diameter no greater than one inch, the second waste material having a moisture content below 15% by weight. A third grinder is used to grind the second waste material into grinds and/or crumbles having a length and/or diameter less than one inch. The first waste material and the second waste material can be introduced into a mixer at a ratio of between 5:3 and 4:1. Other ratios and various mixtures are contemplated as described in more detail herein. A mixer can be used to mix the first waste material and the second waste material into a mixture. In some embodiments, nutritional additives can be added. Ratios and types of nutritional additives are described further herein. Additional grinders may also be used before and/or after mixing. Byproducts can be extruded, bagged and/or otherwise packaged for transport and/or delivery. A bio-friendly byproduct of organic waste processing systems and methods can include a nontoxic extrusion. The nontoxic extrusion can comprise a first waste material comprising processed palm frond particles having a length of less than one inch and a moisture content below 20%. The extrusion may comprise at least 36% of the first waste material by weight. The nontoxic extrusion can comprise a second waste material comprising palm dates having a moisture content below 20% by weight. The extrusion can comprise at least 15% of the second waste material by weight.

Palm Frond Base Feeds

In some embodiments various components or mixtures of components described herein can be combined with other types of feed sources to adjust desired nutritional contents of the feeds. For example, the processed palm fronds can be used as a base to which a variety of additives can be added for use in animal feed. These additives suitable for use in animal feed can include, for example, dog food, chicken livers, or other sources of protein or other nutrients. Additives can also include plant based products such as citrus products, sugar beet pulp, wheat, brewer's grain, almond husks, peanut shells, grass clipping, fruit rinds and peels, potatoes, or general vegetable scraps. Additives can also include molasses, tortilla scraps, dough and bread products, or any other processed product with nutritional value. These additives can be added to a palm frond base in any desired combination or quantity.

Figure 6:
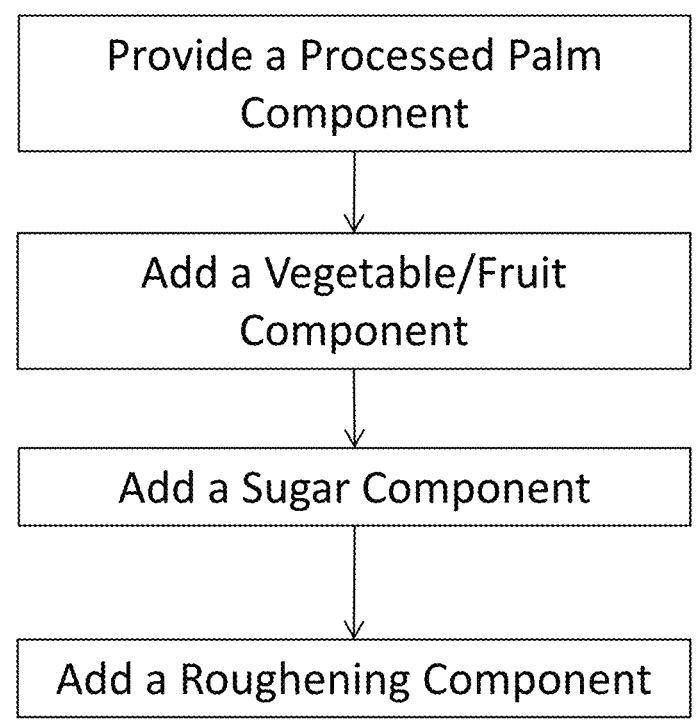
FIG. 6 is a block diagram of one embodiment of a method of preparing an animal feed.

As illustrated in FIG. 6, in some embodiments, a palm frond base can be combined with different proportions of a roughening component, a vegetable and/or fruit component, and/or a sugar component. A roughening component can include, for example, almond shells, walnut husks, peanut shells, pits, or other rough, edible products. A vegetable and/or fruit component can include, for example, cotton seed, corn, wheat, brewer's grain, distiller's grain, potato, lettuce, tomato, peaches, apples, strawberries, soy, turnips, fruit rind or peel, etc. A sugar component can include, for example, beet pulp, sugar beets, sugar cane, citrus fruits, oranges, grapefruit, lemons, grapes, raisins, etc. In some embodiments, particular additives, such as dates, have a high nutritional content and a high sugar content and can be added as a vegetable/fruit component and/or a sugar component. In some embodiments, other vitamins and minerals can also be added.

In some embodiments, the proportions used for an animal feed can depend on the type of animal that is expected to eat it. Although various embodiments described below provide examples specific to dairy and beef cows, it is understood that the various ratios described can be used in feed for a variety of animals, including horses or ruminants such as cattle, sheep, goats, pigs, or camels. Additionally, the various ratios described are understood to in some embodiments describe ratios of pre-mixed volumes and in other embodiments describe ratios by weight. In some embodiments, an animal feed for a dairy cow can have a palm frond component that is greater than or equal to approximately 50% and/or less than or equal to approximately 90%. The feed can have a roughening component that is greater than or equal to approximately 2% and/or less than or equal to approximately 10%. The feed can have a vegetable/fruit component that is greater than or equal to approximately 10% and/or less than or equal to approximately 20%. The feed can have a sugar component that is greater than or equal to approximately 5% and/or less than or equal to approximately 15%.

In some embodiments, an animal feed for a dairy cow can have a palm frond component that is greater than or equal to approximately 60% and/or less than or equal to approximately 80%. The feed can have a roughening component that is greater than or equal to approximately 3% and/or less than or equal to approximately 7%. The feed can have a vegetable/fruit component that is greater than or equal to approximately 13% and/or less than or equal to approximately 17%. The feed can have a sugar component that is greater than or equal to approximately 8% and/or less than or equal to approximately 12%.

In some embodiments, an animal feed for a dairy cow can have a palm frond component that is approximately 70%. The feed can have a roughening component that is 5%. The feed can have a vegetable/fruit component that is approximately 15%. The feed can have a sugar component that is approximately 10%.

In some embodiments, an animal feed for a beef cow can have a palm frond component that is greater than or equal to approximately 40% and/or less than or equal to approximately 60%. The feed can have a vegetable/fruit component that is greater than or equal to approximately 15% and/or less than or equal to approximately 35%. The feed can have a sugar component that is greater than or equal to approximately 15% and/or less than or equal to approximately 35%. In some embodiments, the feed can also have varying amounts of a roughening component.

In some embodiments, an animal feed for a beef cow can have a palm frond component that is greater than or equal to approximately 45% and/or less than or equal to approximately 55%. The feed can have a vegetable/fruit component that is greater than or equal to approximately 20% and/or less than or equal to approximately 30%. The feed can have a sugar component that is greater than or equal to approximately 20% and/or less than or equal to approximately 30%. In some embodiments, the feed can also have varying amounts of a roughening component.

In some embodiments, an animal feed for a beef cow can have a palm frond component that is approximately 50%. The feed can have a vegetable/fruit component that is approximately 25%. The feed can have a sugar component that is approximately 25%. In some embodiments, the feed can also have varying amounts of a roughening component.

Palm Frond and Palm Fruit Base Feeds

Figure 7:
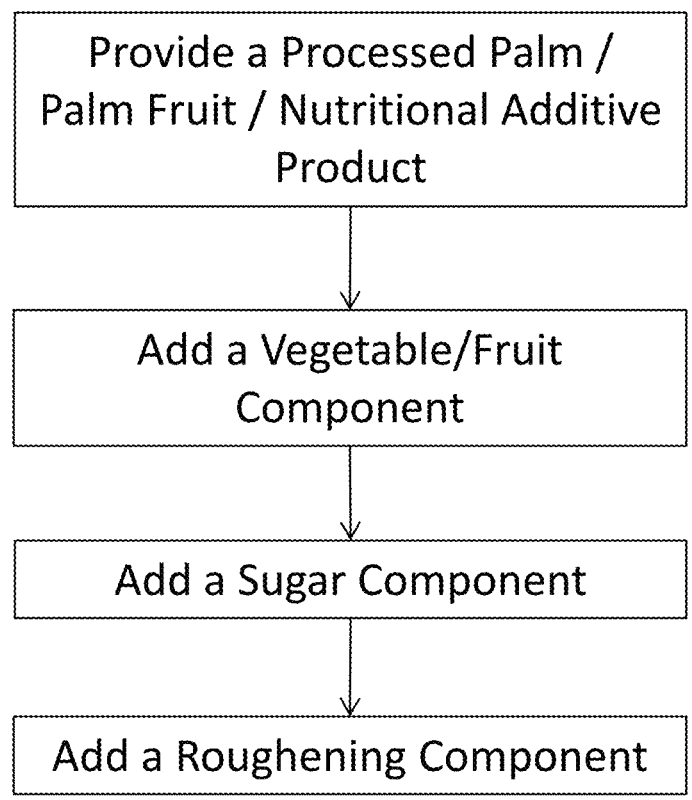
FIG. 7 is a block diagram of one embodiment of a method of preparing an animal feed.

As illustrated in FIG. 7, in some embodiments, animal feeds described herein that include a combination of a palm frond component and a palm fruit component (including embodiments with nutritional additives, such as, for example, urea) can form a base for animal feed that can replace other bases, such as alfalfa. The combined palm frond/fruit base can be in any form described above, including as loose feed, feed prepared into cubes, feed prepared into other shapes, etc. As above, the particular ratios can vary depending on the type of animal, though the various ratios described can be used for a variety of different animals. Also, as above, the various ratios described below are understood to in some embodiments describe ratios of pre-mixed volumes and in other embodiments describe ratios by weight.

In some embodiments, an animal feed for a dairy cow can have a palm frond/fruit base that is greater than or equal to approximately 70% and/or less than or equal to approximately 90%. The feed can have a vegetable/fruit component that is greater than or equal to approximately 5% and/or less than or equal to approximately 15%. The feed can have a sugar component that is greater than or equal to approximately 5% and/or less than or equal to approximately 15%. In some embodiments, the feed can also have varying amounts of a roughening component.

In some embodiments, an animal feed for a dairy cow can have a palm frond/fruit base that is greater than or equal to approximately 75% and/or less than or equal to approximately 85%. The feed can have a vegetable/fruit component that is greater than or equal to approximately 7% and/or less than or equal to approximately 13%. The feed can have a sugar component that is greater than or equal to approximately 7% and/or less than or equal to approximately 13%. In some embodiments, the feed can also have varying amounts of a roughening component.

In some embodiments, an animal feed for a dairy cow can have a palm frond/fruit base that approximately 80%. The feed can have a vegetable/fruit component that is approximately 10%. The feed can have a sugar component that is approximately 10%. In some embodiments, the feed can also have varying amounts of a roughening component.

In some embodiments, an animal feed for a beef cow can have a palm frond/fruit base that is greater than or equal to approximately 40% and/or less than or equal to approximately 70%. The feed can have a vegetable/fruit component that is greater than or equal to approximately 20% and/or less than or equal to approximately 40%. The feed can have a sugar component that is greater than or equal to approximately 5% and/or less than or equal to approximately 15%. In some embodiments, the feed can also have varying amounts of a roughening component.

In some embodiments, an animal feed for a beef cow can have a palm frond/fruit base that is greater than or equal to approximately 45% and/or less than or equal to approximately 60%. The feed can have a vegetable/fruit component that is greater than or equal to approximately 25% and/or less than or equal to approximately 35%. The feed can have a sugar component that is greater than or equal to approximately 7% and/or less than or equal to approximately 13%. In some embodiments, the feed can also have varying amounts of a roughening component.

In some embodiments, an animal feed for a beef cow can have a palm frond/fruit base that approximately 50%. The feed can have a vegetable/fruit component that is approximately 30%. The feed can have a sugar component that is approximately 10%. In some embodiments, the feed can also have varying amounts of a roughening component.

General Base Feeds

Figure 8:
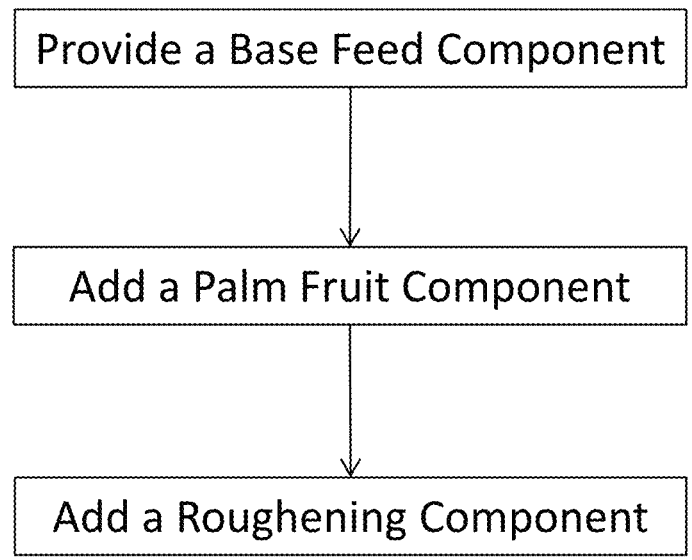
FIG. 8 is a block diagram of one embodiment of a method of preparing an animal feed.

In some embodiments, palm fruit and/or seeds can be added to different types of feed or feed bases, including, for example, alfalfa, soy, corn, wheat, hay, grass, and other silage. Palm fruit combined according to any of the ratios described herein, or in other suitable ratios, with a nutritional additive, such as urea and/or wheat, can also be added to other types of feeds or components of feeds, such as, for example, alfalfa, soy, corn, hay, grass, and other silage. Because of the particular nutritional qualities of palm fruit, in some embodiments palm fruit can serve as both a vegetable/fruit component and a sugar component as part of the various ratios discussed above. For example, a palm fruit contains a high energy content and can be substituted for corn, for example, in some feed applications. Additionally, some palm fruits, such as dates, include pits, which can provide a roughening component in some embodiments. FIG. 8 illustrates an example of a feed with a palm fruit component that serves as both a vegetable/fruit component and a sugar component.

Figure 9:
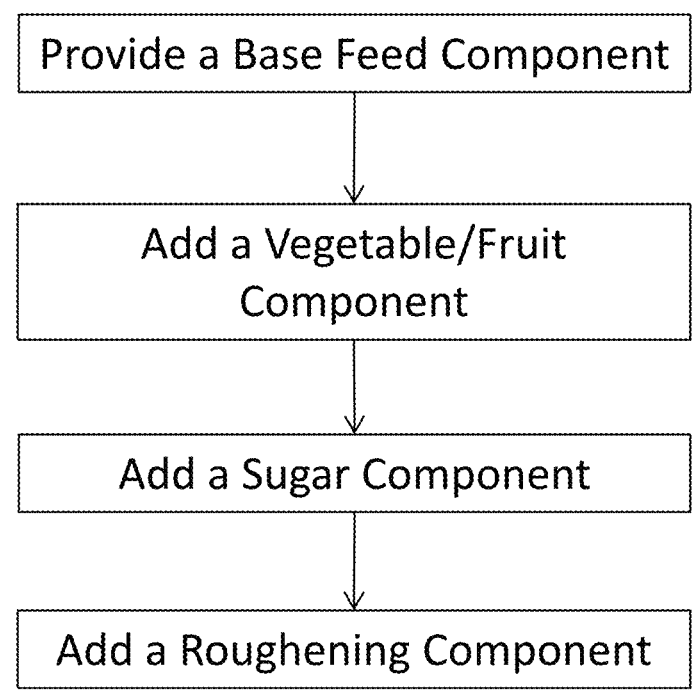
FIG. 9 is a block diagram of one embodiment of a method of preparing an animal feed.

In some embodiments, an animal feed can have a base feed component including one or more types of base feeds, such as palm frond, alfalfa, soy, corn, wheat, hay, grass, and/or other silage components, forming the base feed component. FIG. 9 illustrates an example of a base feed component mixed with a vegetable/fruit component, a sugar component, and a roughening component. In some embodiments, an animal feed can have a base feed component that is greater than or equal to approximately 50% and/or less than or equal to approximately 90%. The feed can have a roughening component that is greater than or equal to approximately 2% and/or less than or equal to approximately 10%. The feed can have a vegetable/fruit component that is greater than or equal to approximately 10% and/or less than or equal to approximately 20%. The feed can have a sugar component that is greater than or equal to approximately 5% and/or less than or equal to approximately 15%.

These ratios, the various ratios described below, are understood to in some embodiments describe ratios of pre-mixed volumes and in other embodiments describe ratios by weight.

In some embodiments, an animal feed can have a base feed component that is greater than or equal to approximately 60% and/or less than or equal to approximately 80%. The feed can have a roughening component that is greater than or equal to approximately 3% and/or less than or equal to approximately 7%. The feed can have a vegetable/fruit component that is greater than or equal to approximately 13% and/or less than or equal to approximately 17%. The feed can have a sugar component that is greater than or equal to approximately 8% and/or less than or equal to approximately 12%.

In some embodiments, an animal feed can have a base feed component that is approximately 70%. The feed can have a roughening component that is 5%. The feed can have a vegetable/fruit component that is approximately 15%. The feed can have a sugar component that is approximately 10%.

In some embodiments, an animal feed can have a base feed component that is greater than or equal to approximately 40% and/or less than or equal to approximately 60%. The feed can have a vegetable/fruit component that is greater than or equal to approximately 15% and/or less than or equal to approximately 35%. The feed can have a sugar component that is greater than or equal to approximately 15% and/or less than or equal to approximately 35%. In some embodiments, the feed can also have varying amounts of a roughening component.

In some embodiments, an animal feed can have a base feed component that is greater than or equal to approximately 45% and/or less than or equal to approximately 55%. The feed can have a vegetable/fruit component that is greater than or equal to approximately 20% and/or less than or equal to approximately 30%. The feed can have a sugar component that is greater than or equal to approximately 20% and/or less than or equal to approximately 30%. In some embodiments, the feed can also have varying amounts of a roughening component.

In some embodiments, an animal feed can have a base feed component that is approximately 50%. The feed can have a vegetable/fruit component that is approximately 25%. The feed can have a sugar component that is approximately 25%. In some embodiments, the feed can also have varying amounts of a roughening component.

In some embodiments, an animal feed can have a base feed component that is greater than or equal to approximately 50% and/or less than or equal to approximately 90%. The feed can have a roughening component that is greater than or equal to approximately 2% and/or less than or equal to approximately 10%. The feed can have a palm fruit component, such as dates, that is greater than or equal to approximately 2% and/or less than or equal to approximately 50%.

In some embodiments, an animal feed can have a base feed component that is greater than or equal to approximately 60% and/or less than or equal to approximately 80%. The feed can have a roughening component that is greater than or equal to approximately 3% and/or less than or equal to approximately 7%. The feed can have a palm fruit component, such as dates, that is greater than or equal to approximately 5% and/or less than or equal to approximately 40%.

In some embodiments, an animal feed can have a base feed component that is approximately 70%. The feed can have a roughening component that is 5%. The feed can have a palm fruit component, such as dates, that is 25%.

In some embodiments, an animal feed can have a base feed component that is greater than or equal to approximately 40% and/or less than or equal to approximately 60%. The feed can have a palm fruit component, such as dates, that is greater than or equal to approximately 10% and/or less than or equal to approximately 45%. In some embodiments, the feed can also have varying amounts of a roughening component.

In some embodiments, an animal feed can have a base feed component that is greater than or equal to approximately 45% and/or less than or equal to approximately 55%. The feed can have a palm fruit component, such as dates, that is greater than or equal to approximately 15% and/or less than or equal to approximately 35%. In some embodiments, the feed can also have varying amounts of a roughening component.

In some embodiments, an animal feed can have a base feed component that is approximately 50%. The feed can have a palm fruit component, such as dates, that is approximately 30%. In some embodiments, the feed can also have varying amounts of a roughening component.

General Byproducts

Systems and methods for processing, recycling, repurposing, and/or disposing of organic waste material can take on a number of forms. In some embodiments, the systems and methods can include introducing a combination of waste material and flesh of fruits into a grinder. This combination can be ground into chunks having a first diameter. In some embodiments these chunks can be introduced into a grinder to be ground into chunks having a second diameter. In some embodiments the waste material has a moisture content below the first maximum moisture content. In some embodiments the flesh of fruits has a moisture content below a second maximum moisture content. Ensuring that the waste material has a moisture content below the first maximum moisture content can support the efficient grinding of the waste material. For example, if the moisture content of the waste material is too high, attempting to grind the waste material may slow down the grinding process, damage the grinder, and/or create undesired consistency. The moisture content of the waste material can also support a desired consistency and/or nutritional content of the byproduct. Similarly, maintaining a moisture content of the flesh of fruits below the second maximum moisture content can provide the proper consistency of the ground chunk byproduct. In some embodiments, the flesh of fruits serves as a binding agent that provides the desired consistency of byproduct.

In some embodiments the flesh of fruits comprises one or more sweet fruits and/or vegetables, such as, for example, dates, peaches, apples, strawberries, citrus fruits, oranges, grapefruits, lemons, grapes, raisins, etc. In some embodiments the waste material comprises palm fronds.

The ratio of waste material to the flesh of fruits can be helpful in creating a desired consistency and/or maintaining the speed of production. The ratio may also be influenced, for example, by the availability of the waste material and or flesh of fruits, the geographic region, the cost of supplies, the availability of transportation or other resources, the desired nutritional content, etc.

In some embodiments, the combination of the waste material in the flesh of the fruits is introduced into the grinder at a ratio of between about 6:1 and 14:1 by volume. In some embodiments this ratio can be between about 5:3 and 4:1 by volume. In certain embodiments, this ratio is between about 15:1 and 20:1 by volume.

The ratios of waste material to the flesh of fruits can also be measured by weight. For example, in some embodiments, combination of the waste material and flesh of fruits is introduced into the grinder at a ratio between about 5:1 and 10:1 by weight. In some embodiments this ratio can be between about 3:2 and 3:1 by volume. In certain embodiments, this ratio is between about 12:1 and 18:1 by volume.

In some embodiments, the method of disposing of green waste further comprises arranging for the waste material to dry until the waste material reaches a moisture content below the first maximum moisture content. Arranging for the waste material to dry to a certain level of moisture content can take a number of different forms. For example, in some embodiments arranging for the waste material to dry includes allowing the waste material to dry for a period of time. The period of time can range from five hours to five weeks. In some embodiments, the period of time is between about one day and 15 days. Arranging for the waste material to dry can include allowing the waste material to dry in a windy area, in a dry climate, and/or in an oven. In such embodiments, the period of time to dry the waste material may be reduced. In some embodiments, arranging for the waste material to dry includes allowing and/or directing a third party to dry the waste material. In some embodiments, arranging for the waste material to dry occurs before the waste material is combined with the flesh of fruits. In other embodiments, the step occurs after the waste material is combined with the flesh of fruits but before being introduced into the grinder. In yet other embodiments, the step occurs after being ground a first time.

The method of processing and/or disposing of green waste can also comprise arranging for flesh of the fruits to dry until the flesh of the fruit reaches a moisture content below the second maximum moisture content. Arranging for the flesh of fruits to try can also take a number of different forms. In some embodiments, arranging for the flesh of fruits to dry includes allowing the flesh of fruits to dry for a period of time. The period of time can range from 2 hours to 5 weeks or longer. In some embodiments, the period of time is between about 2 days and 18 days. In some embodiments, the period of time to dry the flesh of fruits can be reduced by, for example, using a heater, oven, and/or fan.

Various types of preprocessing may take place before the waste material and/or flesh of fruits is introduced into the grinder. Preprocessing can include chopping, shredding, grinding, and/or any other processing or significant alteration of the waste material and/or flesh of fruits. Preprocessing can refer to processing that occurs while the waste material contains a moisture content below the first maximum moisture content and/or while the flesh of fruits contains a moisture content below the second maximum moisture content. In some embodiments preprocessing comprises chopping the waste material to a length shorter than a maximum length. In some embodiments the maximum length is about 8 inches. In some embodiments, the maximum length is between about 3 inches and 7 inches. In some embodiments, the maximum length is between 6 inches and 12 inches.

In some embodiments the ground chunk comprises a greater proportion of waste material then flesh of fruits by weight. Some considerations for what proportion of waste material is used within the ground chunk are already described above, such as the desired consistency. As a further example, in certain circumstances it is advantageous to create a byproduct that has a certain nutritional content for humans and/or other animals. In some embodiments, the ground chunk comprises between about 60% and 80% waste material by weight. In certain embodiments, the ground chunk comprises between about 45% and 75% waste material by weight. In some embodiments, the ground chunk comprises more than 80% waste material by weight.

Some embodiments of the method include further processing or post-processing. Such post-processing may result in turning the ground chunk into a resulting byproduct. In some embodiments, post-processing comprises mixing in one or more additives. Such additives may include, for example, roughening additives, calcium additives, "scratch", protein additives, fat additives, nutritional additives, mineral additives, vitamin additives, emulsifiers, sweetening additives, grain and/or cereal additives, binding agents, flavor additives, and/or preservatives may be added during post-processing. In some embodiments, these additives may be introduced into the grinder before and/or with the waste material and/or the flesh of fruits.

Post-processing may include shaping the resulting byproduct. In some embodiments, post-processing includes forming the resulting byproduct into the pellet. Pellet can refer to a variety of shapes and sizes, including those mentioned above. For example, pellets can comprise cubes, clumps, balls, chunks, and/or bits. In some embodiments, post-processing comprises forming the resulting byproduct into wafers, crumbles, sludge, briquettes, and/or blocks. The type of post-processing that is used may be determined by the desired use of the resulting byproduct. For example, in some embodiments the resulting byproduct is used as an animal feed, including feed for livestock, poultry, cattle, etc. Certain embodiments allow for the resulting byproduct to serve as a biofuel, structural support, fertilizer, mulch, cleaning agent, lubricant, and/or roughage.

A variety of systems, methods, and products, including byproducts from processing, recycling, and/or disposal of waste materials can be obtained through a number of methods and/or systems disclosed herein. For example, some methods, products, and systems can be found in U.S. Patent Publication No. 2014/0234524, filed Mar. 11, 2013, U.S. Patent Publication No. 2016/0007630, filed Aug. 9, 2015, and International Patent Application No. PCT/US2017/024011, filed on Mar. 24, 2017, the entire contents of each of which are incorporated by reference herein and made a part of this specification.

In some embodiments, a byproduct comprises a ground chunk having a diameter less than a maximum diameter. In some embodiments, the maximum diameter is between about 1 inch and 5 inches. In other embodiments the maximum diameter is between about 0.2 inches and 1 inch. In some embodiments, the maximum diameter is less than 0.2 inches. In some embodiments, the maximum diameter is between about 2 inches and 8 inches. As used herein, in some embodiments, the term diameter can be used with reference to a length dimension, a width dimension, and/or a thickness dimension as would be understood by one of skill in the art in view of the entire disclosure relied upon herein. The ground chunk can be comprised of waste material and of flesh of fruits. In some embodiments the waste material comprises palm fronds. The types of fruits used can include sweet fruits, for example, palm dates, peaches, apples, strawberries, citrus fruits, oranges, grapefruits, lemons, grapes, raisins, etc. The flesh of the fruits can provide a binding function with the waste material. In certain embodiments the waste material has a moisture content below the first maximum moisture content. In some embodiments the flesh of the fruits has a moisture content below a second maximum moisture content. In some embodiments the first maximum moisture content is between about 5% and 15% by weight. In some embodiments the first maximum moisture content is between about 10% and 20% by weight. In certain embodiments, it is advantageous to maintain a low moisture content of the waste material to increase the ease of and/or reduce the energy used for chopping, shredding, grinding, and or otherwise processing the waste material.

In some embodiments the second maximum moisture content is between about 5% 15% by weight. In certain embodiments the second maximum moisture content is between about 10% and 20% by weight. In some embodiments the second maximum moisture content is between about 18% and 34%. The second maximum moisture content may depend at least in part on a variety of factors, including, for example, the available power output of the machine, the ratio of waste material to the flesh of fruits, the desired consistency of the ground chunk, the desired nutritional content of the ground chunk, the shape and/or size of the screen openings through which the ground chunks are moved during, for example, the grinding process, and/or the volume of waste material and/or flesh of fruits to be processed. The term "processing" may include chopping, shredding, grinding, adding or removing ingredients, and/or any other significant alteration of the waste material, flesh of fruits, and/or ground chunk.

The ground chunk can further comprise various additives. The additive(s) used may depend at least in part on the availability, desired nutritional content, taste characteristics, and/or cost of the additive. In some embodiments, an additive is added after the ground chunk has been ground at least once. In some embodiments, the additive is added together into a grinder with the waste material and flesh of fruits before being ground.

For example a roughening additive can be added to the ground chunk. The roughening additive can comprise one or more grains. For example the roughening additive may comprise wheat, buckwheat, milo, alfalfa, soy, corn, hay, oats, rice, barley, rye, millet, sorghum, *quinoa*, grass, etc.

Some embodiments include other additives, such as a calcium additive. The calcium additive comprises calcium but may include other nutritional and or functional properties as well. The calcium additive may comprise one or more ingredients, such as, for example, oyster shell, a salt comprising calcium or a calcium derivative, calcium carbonate, limestone, calcium monophosphate, calcium diphosphate, and/or egg shells.

Other additives are included in some embodiments. For example, one or more nutritional additives are added to the byproducts in certain embodiments to create a resulting byproduct. Some examples of nutritional embodiments include almond shells, walnut husks, peanut shells, fruit pits, cotton seed, corn, brewer's grain, distiller's grain, potatoes, lettuce, tomatoes, soy, turnips, fruit rind, and beet pulp. In some embodiments, sugar beets, sugar cane, peaches, apples, strawberries, citrus fruits, oranges, grapefruit, lemons, grapes, and/or raisins are added.

Waste Processing Systems, Methods, and Components

Figure 10C:
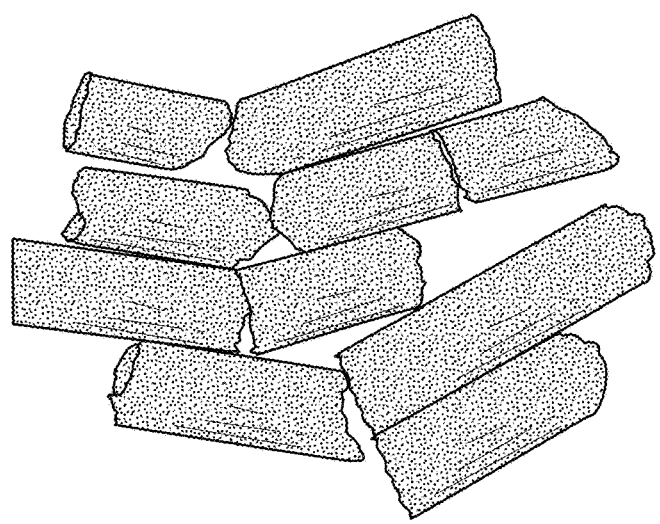
FIG. 10C shows an animal feed for larger animals.
Figure 10B:
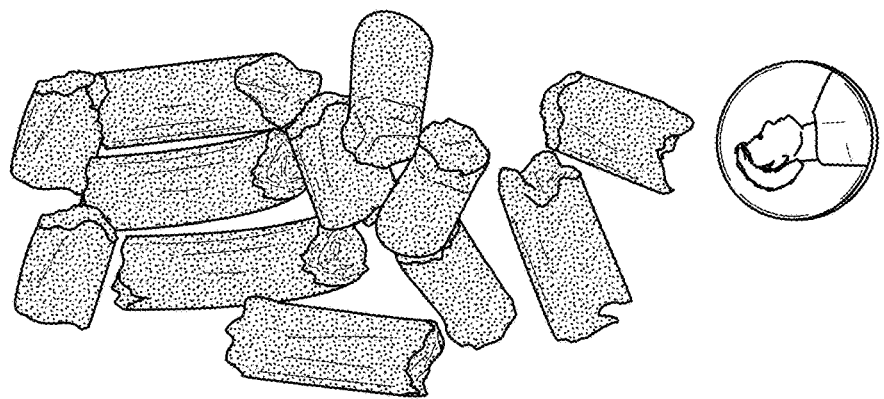
FIG. 10B shows an animal feed for medium-sized animals.
Figure 10A:
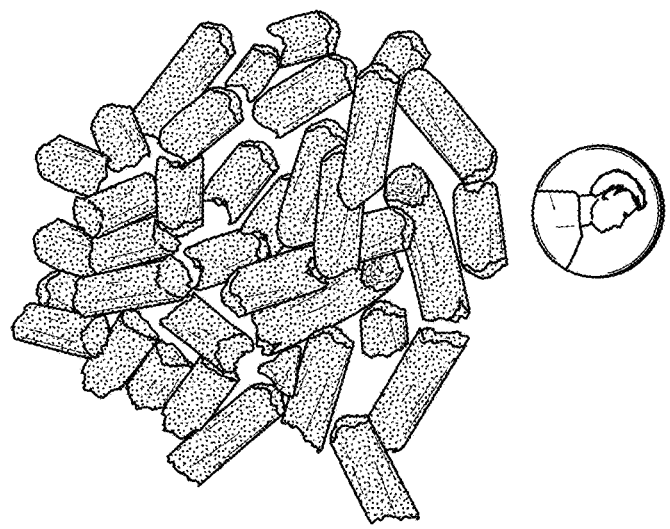
FIG. 10A shows an animal feed for smaller animals.

FIGS. 10A to 10C illustrate different sizes of waste byproducts that can be created. The byproducts shown in FIGS. 10A through 10C show animal feeds for different sizes of animals. FIG. 10A shows an animal feed for smaller animals. Smaller animals may include, for example, chickens, guinea pigs, cats, dogs, ducks, geese, pigeons, turkeys, and rabbits. In some embodiments, smaller feeds may also be available to feed animals such as fish and small poultry.

FIG. 10B shows a medium-sized byproduct next to a United States penny to show the scale of the size (e.g., diameter, length) of the byproduct. FIG. 10B illustrates a feed generally more customized for medium-sized animals. Medium-size animals may include, for example, goats, sheep, hogs, cattle, chickens, and other animals capable of eating the feed. As shown in FIG. 10C, larger feeds are available that are intended for larger animals, such as, for example, horses, cattle, camels, mules, donkeys, elephants, buffalo, deer, elk, and moose. Many animals may fit into multiple categories and may be able to eat feeds having a range of diameters and/or lengths.

Figure 11:
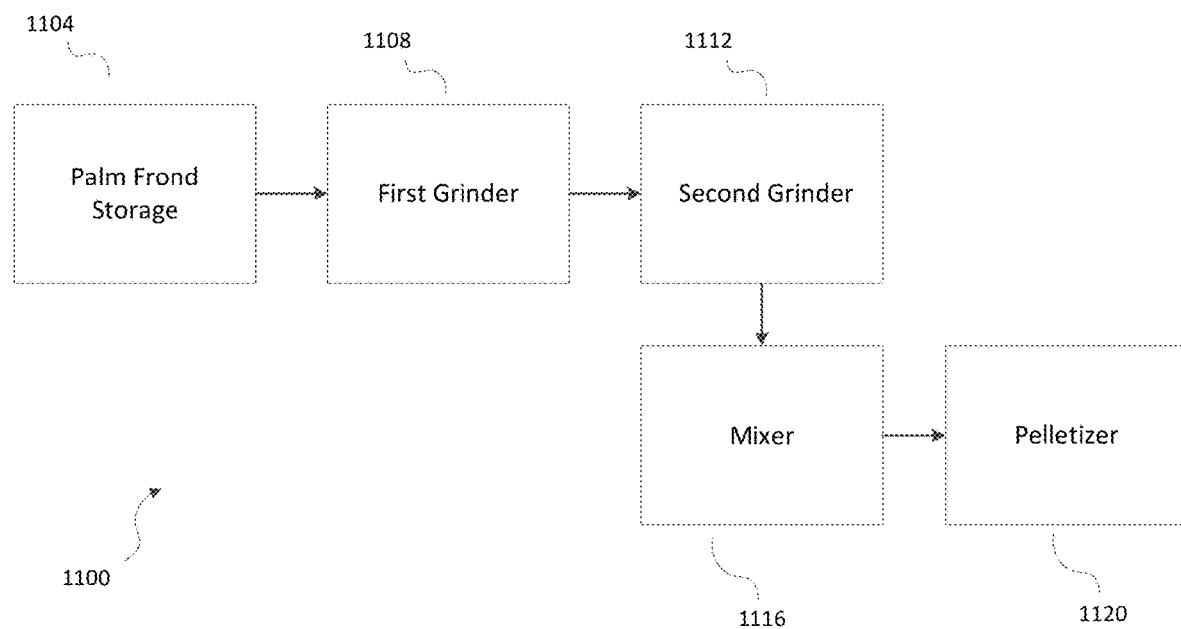
FIG. 11 illustrates a system of pelletizing the byproducts of organic waste.

FIG. 11 illustrates a system 1100 of pelletizing byproducts of organic waste (e.g., palm fronds). Palm fronds are collected together and stored in a palm frond storage 1104. Waste management facilities or other facilities may collect palm fronds by receiving them from government officials and/or private citizens. The fronds may include the rachis, spines, and/or one or more leaflets. The storage may include bins, piles on the ground, a trash compacter, and/or placement of palm rows or some other formation (e.g., wind rows). Preferably during the collection, the palm fronds are allowed to dry to below a maximum moisture threshold, though this is not necessary. Where drying is desired, the palm fronds may be sun-dried, wind dried, spin dried, tumble dried, heat dried, and/or simply allowed to air dry over time. In some cases, the palm fronds are allowed to dry for at least a day, preferably at least a week. The maximum moisture threshold may be less than 25% by weight, preferably less than 18% by weight, more preferably less than 15% by weight. However, depending on the arrangement of the waste disposal system, a higher moisture content may be possible.

After the palm fronds have been collected and optionally dried, palm fronds are placed in a first grinder 1108 to be ground to a first length and/or diameter. The first grinder 1108 is outfitted with a first screen having holes with a first diameter. These holes will help ensure that only palm fronds having a first maximum length and/or diameter pass through the grinder 1108. Because palm fronds can be difficult to grind using traditional methods, grinding the palm fronds the first time at a larger first length and/or diameter before grinding them a second time at a smaller length and/or diameter has proven to be effective. The diameter of the holes in the first screen 1108 may be between about 1 to 3 inches, preferably around 2 inches. In some embodiments the first grinder is manufactured by Vermeer. Optionally the first screen may be outfitted with a baffle to help minimize the number of particles (e.g., fibers) of palm frond with a length and/or diameter greater than the first maximum length and/or diameter that pass through the first screen 1108. The baffles are discussed in more detail below.

Once the palm fronds have been ground a first time, they may a second grinder 1112. The second grinder 1112 may be different from the first grinder 1108. Alternatively, the second grinder 1112 is the same as the first grinder 1112 except that the first screen has been replaced with a second screen. The second screen, regardless if it is on the first grinder or on the second grinder, has holes having a second length and/or diameter. The holes in the second screen will help ensure that only palm frond particles having a second maximum length and/or diameter will pass through the second grinder 1112. The second screen may be outfitted with a baffle, as with the first screen, to help ensure that no particles having a length and/or diameter greater than the second maximum length and/or diameter pass through the second grinder 1112. The second maximum length and/or diameter may be between about ⅛ inch and about 1½ inches and is preferably between about ¼ inch and about ¾ inch. While smaller particle sizes help in later parts of the system (e.g., with mixing, pelletizing), it also creates challenges in throughput and/or efficiency of the grinder 1112. In particular, too small of a second maximum length and/or diameter can create clogging and/or backlog problems in the disposal system, as more fully described below. In some embodiments, a suitable second maximum length and/or diameter is ½ inch. Other lengths and/or diameters are also workable. The first and/or second screen may be curved and/or flat but are preferably curved.

It may be desirable to create a usable and/or appetizing byproduct from the organic waste that has been collected. The palm fronds that have been ground a second time to a second maximum length and/or diameter are mixed with other materials in a mixer 1116. These materials may include grains, nutritional supplements, roughening additives, fruits (e.g., dates), binding agents (e.g., canola), fill material, and/or other additives. The mixer 1116 may stir, shake, knead, compress, rotate, and/or blend the ingredients together to form a mixture. The mixture may be as described elsewhere herein. In some embodiments, the mixture comprises a base feed. Ingredients may be added according to prescribed ratios and/or percentages (e.g., by weight, by volume) described elsewhere herein. Additionally, the ingredients and their proportions may be selected in such a way as to achieve a target nutritional content. For example, the waste byproduct may be used as an animal feed for certain types of animals with particular nutritional needs. These nutritional needs may vary by animal.

With continued reference to FIG. 11, an extruder or pelletizer 1120 forms the mixture into a pellet. Pelletizing the waste byproduct can increase the ease of transportation, disposal, and/or storage. For byproducts that will be used for feeds, palletization can make the feed more accessible and/or appetizing to animals. The pelletizer 1120 may comprise a pellet mill and/or other machine. Generally, the pelletizer 1120 heats the mixture and forces it through a plate with holes having a certain hole diameter. The hole diameter determines the diameter of the pellets (e.g., FIGS. 10A through 10C). The hole diameter may be between about 0.1 inches and about 0.4 inches, depending on the use of the pellet. In some embodiments, the hole diameter may be less than 0.1 inches or greater than 0.4 inches. For example, in some embodiments, the hole diameter is about 0.8 inches. The length and/or diameter of a resulting pellet may have a length and/or diameter of any of the hole diameters described above.

The pelletizer (e.g., pellet mill) 1120 heats the mixture up to a minimum temperature in order to pass the mixture through the holes. The minimum temperature may depend on the formulation of the mixture that is used. In some embodiments, the pelletizer uses steam to achieve the minimum temperature and/or to serve as a binding agent for the mixture. The steam may also be used to lubricate the mixture as it passes through the holes. To prevent overheating of the pelletizer 1120 or pelletizer parts, some embodiments include a cooler that reduces the temperature of the plate. The cooler may also be used to cool down the mixture after it has exited the holes. In some embodiments, the plate comprises a thermally insulating material (e.g., wood, plastic) that does not require a cooler for its operation. The plate may also comprise a layer of metal having a thickness configured to dissipate heat rapidly enough to minimize or negate the need for a cooler. Optionally, the pelletizer cuts the mixture into particular lengths of pellets. However, in some embodiments, the mixture is allowed to freely exit the plate and break off due to its own weight, thus creating a range of pellet lengths.

Figure 12:
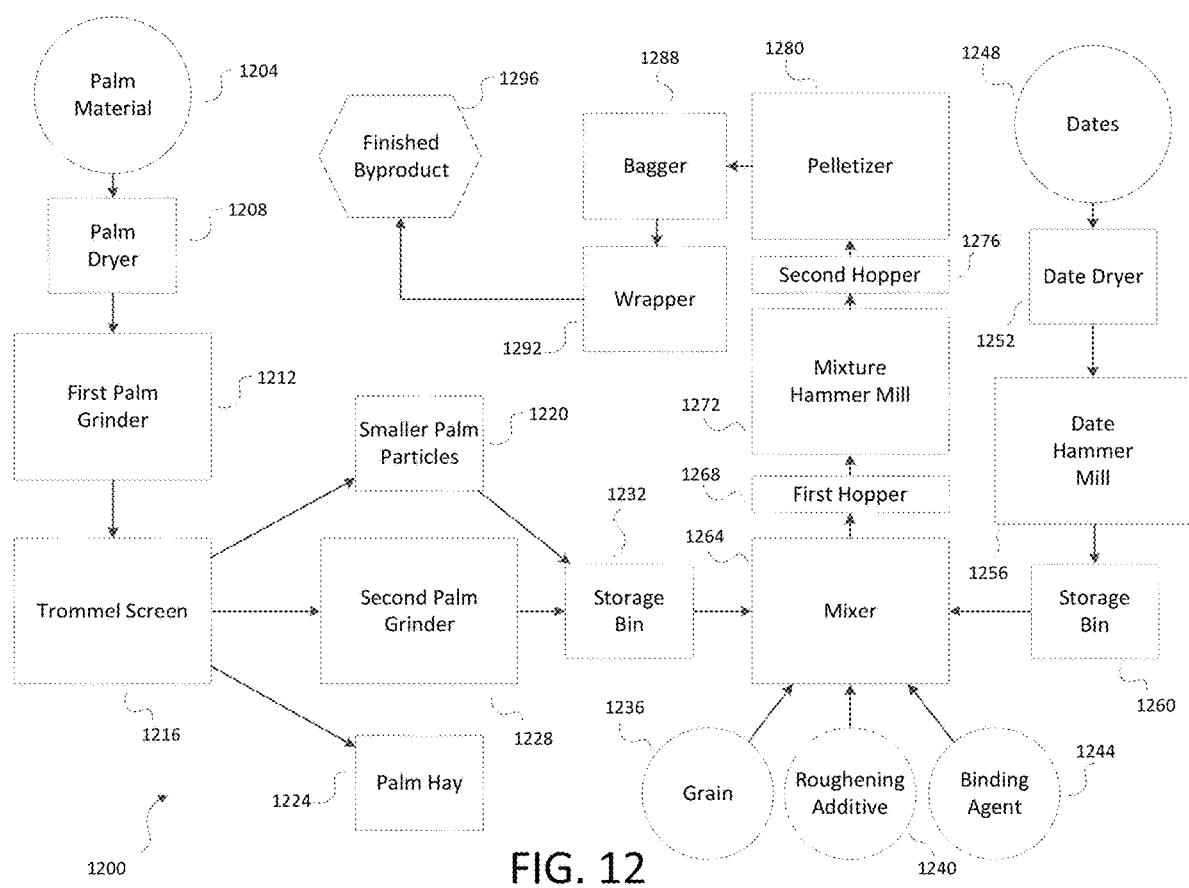
FIG. 12 illustrates an example embodiment of a palm waste processing system.

FIG. 12 illustrates an example embodiment of a palm waste disposal system 1200. Though the use of palm and dates are illustrated, other waste products may be used instead and/or in addition. Embodiments illustrated by FIG. 12 include preferred elements (in solid lines) and may include optional elements (in dotted lines). The system 1200 begins with the collection of initial waste ingredients, such as palm material 1204 and/or date 1248. Optionally, the palm material 1204 may be dried and/or allowed to dry at the palm dryer 1208. In some embodiments, a tumble dryer is used to dry the palm fronds to a first maximum moisture content. In some embodiments the first maximum moisture content is between about 3% and 23% by weight. In some embodiments the first maximum moisture content is between about 7% and 20% by weight. Preferably, the first maximum moisture content is between about 10% and 17% by weight, more preferably around 14%. A moisture content below the first maximum moisture content can prevent blockages of flow of palm through the system 1204 and/or prevent malfunction of the machinery in the system 1204. The palm dryer 1208 may use other methods of drying, as described herein.

The palm material 1204 is sent to a first palm grinder 1212. The palm may be allowed and/or forced to pass through one or more first screens having holes with a first length and/or diameter. Thus, the resulting first palm particles may have a first maximum length and/or diameter determined by the diameter of the holes in the first screens. The first maximum length and/or diameter of the first palm particles may be between 0.8 inches and 4.5 inches. The maximum length and/or diameter may be about 3 inches. In some embodiments, the first maximum length and/or diameter of the first palm particles is between 1.4 inches and 2.7 inches. In some embodiments, the first maximum length and/or diameter is about 2 inches. In some embodiments the first palm grinder is manufactured by Vermeer. The first screen may be outfitted with a baffle to help ensure that palm frond particles with a length and/or diameter greater than the first maximum length and/or diameter do not pass through the first screen. Such a screen with a baffle is described in more detail below.

The resulting first palm particles may be sorted by a trommel screen 1216. The trommel screen may include a rotor to move particles from one end of the trommel screen to another. As the particles move to the end of the trommel screen 1216, some of the smaller palm grinding's may be filtered out. The trommel screen 1216 may comprise a screen having openings with a maximum size smaller than the diameter of the holes in the first screens. This will permit relatively larger palm particles to pass through to a second grinding while the smaller palm particles can bypass the second grinding. This improves efficiency of the system 1200 because only the particles that need to be ground a second time will go through the second grinding, thus freeing up space, power, and other resources for use in the system 1200. In some embodiments, the maximum size of the openings in the trommel screen 1216 may be comparable to the size of the holes in the second palm grinder 1228. For example, the openings may be between 0.1 inches and about 0.9 inches in diameter. In certain embodiments, some of the resulting palm particles may later be used for palm hay 1224. The palm hay may undergo further processing and/or treatment in the system 1200. Alternatively, it may undergo different processing not shown here.

The trommel screen 1216 may be physically situated between the first palm grinder and the second palm grinder so that the first grinder 1212, first sorting 1216, and second grinding 1228 may automatically and smoothly move palm particles from one system element to the next without significant human intervention. For example, conveyor belts, rotors, and/or hoppers may be included to facilitate the movement of the palm particles.

Some of the resulting particles can be useful for various aspects. For example, some particles may be somewhat larger and may be useful in the creation of palm hay, as described in more detail herein. Relatively larger palm particles that do not exit the trommel screen 1216 as smaller palm grindings 1220 or palm hay 1224 may be referred to as the first sorted palm particles. The first sorted palm particles may enter a second grinder 1228. A second grinder different 1228 from the first palm grinder 1212 may be used. Alternatively, the second palm grinder 1228 may comprise the first palm grinder 1212 where the first screens have been switched out with different screens. The second screens (e.g., the screens of the second palm grinder), regardless if they are on the first grinder or on a separate second grinder, have holes having a second diameter. The holes in the second screen will help ensure that only palm frond particles having a second maximum length and/or diameter pass through the second palm grinder 1228. The second screens may be outfitted with baffles, as with the first screens, to help ensure that no particles having a length and/or diameter greater than the second maximum length and/or diameter pass through the second grinder. The diameter of the holes in the second screens may be between about $1/16$ inch and about $15/16$ inch and is preferably between about $1/4$ inch and about $3/4$ inch. In some embodiments, the diameter is about $1/2$ inch. Holes of $1/2$ inch can help prevent clogging and/or backlog problems in the disposal system 1200 while allowing proper mixing of the palm with other additives, as more fully described below.

The resulting second palm particles may optionally gather in a storage bin 1232. The storage bin may comprise a hopper. The storage bin may simply be an area on the floor. The storage bin 1232 also includes any particles 1220 that bypassed the second palm grinder 1232. The palm particles are sent into a mixer 1264. The mixer 1264 also receives other ingredients, such as a grain (or cereal) 1236, a roughening additive 1240, a binding agent 1244, and/or any other additive as described herein. Also added to the mixer are the ground dates.

As part of the example waste disposal system 1200, dates 1248 are dried in a date dryer 1252. The dryer 1252 may comprise sun-drying, wind drying, spin drying, tumble drying, heat drying, and/or air drying. In some cases, the dates are allowed to air dry and/or sun dry for at least a day, preferably at least a week. The dates are dried to a moisture content below a second maximum moisture content by weight. In some embodiments the second maximum moisture content is between about 0.5% and 35% by weight. In certain embodiments the second maximum moisture content is between about 3% and 20% by weight. Preferably, the second maximum moisture content is between about 5% and 16%. The second maximum moisture content may depend at least in part on a variety of factors, including, for example, the available power output of the system and system components, the ratio of waste material to the flesh of fruits, the desired consistency of the dates, the desired nutritional content of the finished byproduct 1296, the shape and/or size of the screen openings through which the date particles are moved during, for example, the milling process, and/or the volume of waste material and/or flesh of fruits to be processed.

Once the dates 1248 reach a moisture content of at most the second maximum moisture content, the dates are moved into a hammer mill 1256. The hammer mill 1256 grinds the dates into smaller particles. The hammer mill 1256 may alternately be referred to as a grinder. In some embodiments, the dates are pulverized by the hammer mill. The dates may include the skin, the flesh, and/or pits of the fruit. The hammer mill may be equipped with screens with optional baffles. The screens and/or baffles may be similar to those in the first palm grinder and/or second palm grinder. The screens may have holes with a maximum diameter. The maximum diameter may be between about 0.05 inch and about 1 inch and is preferably between about 0.2 inch and about 0.6 inch. The resulting date particles may be stored in a storage bin 1260 or other storage area until needed. The date particles may then be mixed with the palm material 1204 and, optionally, other ingredients described herein.

The mixer 1264 mixes the palm material 1204 (e.g., resulting second palm particles) and the dates 1248 (e.g., the resulting date particles) and, optionally, other ingredients (e.g., grain 1236, roughening additive 1240, binding agent 1244). This creates an edible foodstuff that may undergo further processing. The mixer may mix ratios among palm, dates, grain (e.g., wheat, corn), and/or nutritional additive as described herein. The mixture may contain between about 7% and 88% palm by weight. In some embodiments, the mixture contains between about 18% and 70% palm by weight. In some embodiments, the mixture contains between about 25% and 45% palm by weight. In some embodiments, the mixture contains between about 36% and 92% palm by weight. The amount of palm may be determined by the amount of nutritional content desired, the amount of palm available, and/or other factors.

The mixer 1264 may mix dates into the mixture at a by-weight percentage of between about 4% and 59% date. In some embodiments, the mixture contains between about 12% and 27% dates by weight. In some embodiments, the mixture contains between about 8% and 22% dates by weight. In some embodiments, the mixture contains between about 15% and 45% dates by weight. It may be desirable to include at least 30% dates by weight.

One or more binding agents 1244 may be added to the mixture. Binding agents may include dates or other fruits, canola oil, peanut oil, corn syrup, soybean oil, palm oil, coconut oil, sunflower oil, water, egg, alcohol, gelatin, agar, flax meal, butter, tapioca, vegetable puree, honey, agave, xanthan gum, and/or any other edible binder. For example, in some embodiments the binding agent comprises canola oil and is included at about 22% by weight of the total mixture. The mixture may contain between about between about 15% and 92% binding agent by weight. In some embodiments, the mixture contains between about 19% and 78% binding agent by weight. In some embodiments, the mixture contains between about 25% and 65% binding agent by weight. In some embodiments, the mixture contains between about 20% and 35% binding agent by weight. A binding agent may not only help keep the ingredients together, but it can add nutritional content to the final product. The binding agent may add a particular flavor and/or texture that animals prefer. The amount of binding agent included in the mixture may depend in part on the proportion of palm included in the mixture, the proportion of dates in the mixture, and/or proportion of other ingredients.

A roughening additive 1240 may be included in the mixture. A roughening additive may provide an animal with appropriate fiber and other nutrients. The roughening additive 1240 can comprise palm but may include one or more grains. For example the roughening additive may include wheat, buckwheat, milo, alfalfa, soy, corn, hay, oats, rice, barley, rye, millet, sorghum, *quinoa*, and/or grass. The mixture may contain between about between about 2% and 57% roughening additive by weight. In some embodiments, the mixture contains between about 4% and 25% roughening additive by weight. In some embodiments, the mixture contains between about 1% and 15% roughening additive by weight. In some embodiments, the mixture contains between about 8% and 20% roughening additive by weight. A common roughening additive is wheat, but other additives may be used. For example, in some embodiments, the roughening additive comprises about 12% of the mixture by weight. The mixture may include a greater proportion of roughening additive for poultry feeds.

A grain 1236 may be included in the mixture as well. The grain 1236 may be included as part of the roughening additive 1240 or it may not be. A common grain 1236 for animal feeds is rice, but wheat and corn are also used in many embodiments. For example, in some embodiments, the mixture includes about 5% rice by weight. Other grains include buckwheat, milo, alfalfa, soy, hay, oats, barley, rye, millet, sorghum, *quinoa*, and/or grass. The mixture may contain between about between about 1% and 24% grains by weight. In some embodiments, the mixture contains between about 3% and 16% grains by weight. In some embodiments, the mixture contains between about 8% and 20% grains by weight. In some embodiments, the mixture contains between about 10% and 85% grains by weight.

Other additives (not shown) may be added to the mixture as well. For example, calcium additives, "scratch", protein additives, fat additives, nutritional additives, mineral additives, vitamin additives, emulsifiers, sweetening additives, flavor additives, and/or preservatives can be added. For example, in some embodiments of chicken feed, scratch is added to the feed to improve feed effectiveness. Some embodiments of chicken feed, as another example, include calcium additives (e.g., oyster shell, a salt comprising calcium or a calcium derivative, calcium carbonate, limestone, calcium monophosphate, calcium diphosphate, and/or egg shells). The calcium additive may comprise calcium but may include other nutritional and or functional properties as well. This may apply to each of the ingredients above. In other words, a particular ingredient or additive may appropriately fall into more than one category.

The mixture may optionally pass from the mixer into a first hopper 1268. The hopper 1268 may be functionally designed to prevent logjams in the flow of the system 1200. For example, the first hopper 1268 may use curved chutes to prevent material from getting jammed in corners of the chutes.

In some embodiments, the first hopper feeds the mixture into a hammer mill 1272. The hammer mill 1272 grinds the mixture into smaller particles. The milled mixture may be referred to as crumbles, chunks, powder, fine particles, particulates, beads, cubes, and/or pellets (even before being "pelletized"). In some embodiments, the mixture is pulverized by the hammer mill 1272. Like the hammer mill 1256, the hammer mill 1272 may be equipped with screens with optional baffles. The screens and/or baffles may be similar to those in the hammer mill 1256. The screens may have holes with a maximum diameter. The maximum diameter may be between about 0.05 inch and about 1 inch and is preferably between about 0.2 inch and about 0.6 inch. The resulting mixture particles may be passed to a second hopper 1276. Like the first hopper 1268, the second hopper 1276 may be configured to facilitate the flow of material through it and to avoid a blockage.

Once the mixture particles exit the hopper, they enter the pelletizer 1280. The pelletizer can make the feed more accessible and/or appetizing to animals. The pelletizer may include a pellet mill and/or other machine. Generally, the mixture is heated and forced through a plate with holes Like the plate in FIG. 11, the plate may have holes with a diameter of between about 0.2 inches and about 0.5 inches, depending on the use of the pellet. In some embodiments, the plate hole diameter maybe less than 0.2 inches or greater than 0.5 inches.

The pelletizer 1280 heats the mixture up to a minimum temperature in order to pass the mixture through the holes. The minimum temperature may depend on the formulation of the mixture that is used. Like the pelletizer in FIG. 11, the pelletizer may use steam to achieve the minimum temperature and/or to serve as a binding agent for the mixture and may include a cooler. Moreover, the plate may comprise a thermally insulating material (e.g., wood, plastic). The plate may also comprise a layer of metal having a thickness configured to dissipate heat rapidly enough to minimize or negate the need for a cooler. The pelletizer may cut the mixture into particular lengths of pellets. In some embodiments, the mixture is allowed to freely exit the plate and break off based on gravity, thus creating a variety of pellet lengths.

The pelletizer 1280 may optionally send the finished pellets to a bagger 1288. The bagger 1288 fills one or more bags with the pellets and then sends the bagged pellets to a wrapper 1292, which separates the bagged pellets into separate packages of product. The finished byproduct 1296 can be used as animal feed, erosion protection, bait, fill material, and/or sandbagging.

Figure 13A:
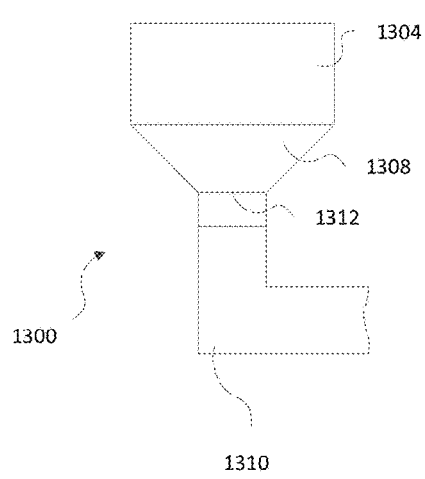
FIG. 13A shows one example hopper assembly.
Figure 13B:
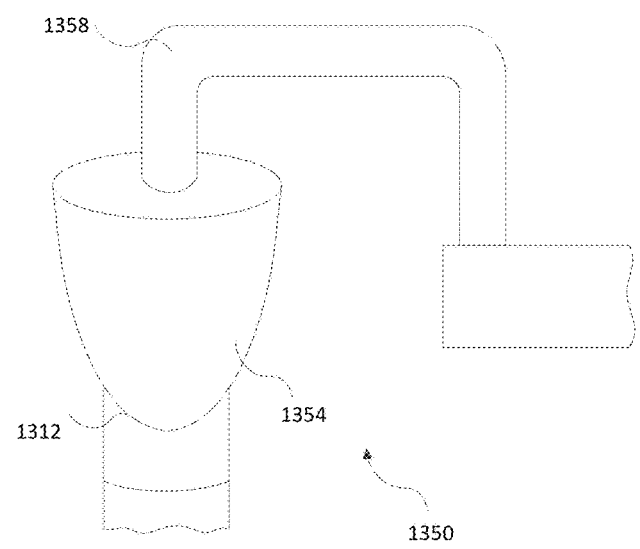
FIG. 13B shows one example hopper assembly.

With reference to FIGS. 13A and 13B, two hopper assemblies 1300, 1350 are shown. The hopper assembly 1300 includes a receiving bin 1304, a funnel 1308, a flu 1312, a chute 1316, and an auger (not shown). Material may be fed into the receiving bin 1304. The material is guided by the funnel 1208 and through the flu 1312. The flu may have a diameter of 12 inches, 24 inches, or 36 inches. Other diameters are also possible. The auger may be 9 inches, 12 inches, or some other dimension. The hopper assembly 1350 also includes a flu 1312, a hopper bowl 1354, and an input chute 1358. The chute 1358 has rounded corners whereas the hopper assembly 1300 has sharp corners. In some configurations, the rounded corners of the chute 1358 are preferred over the sharp corners of the chute 1316 because the rounded corners prevent backups and blockages in the flow of material through the system 1300. Either hopper assembly 1300, 1350 may be used as the first hopper 1268 and/or the second hopper 1276.

Figure 14:
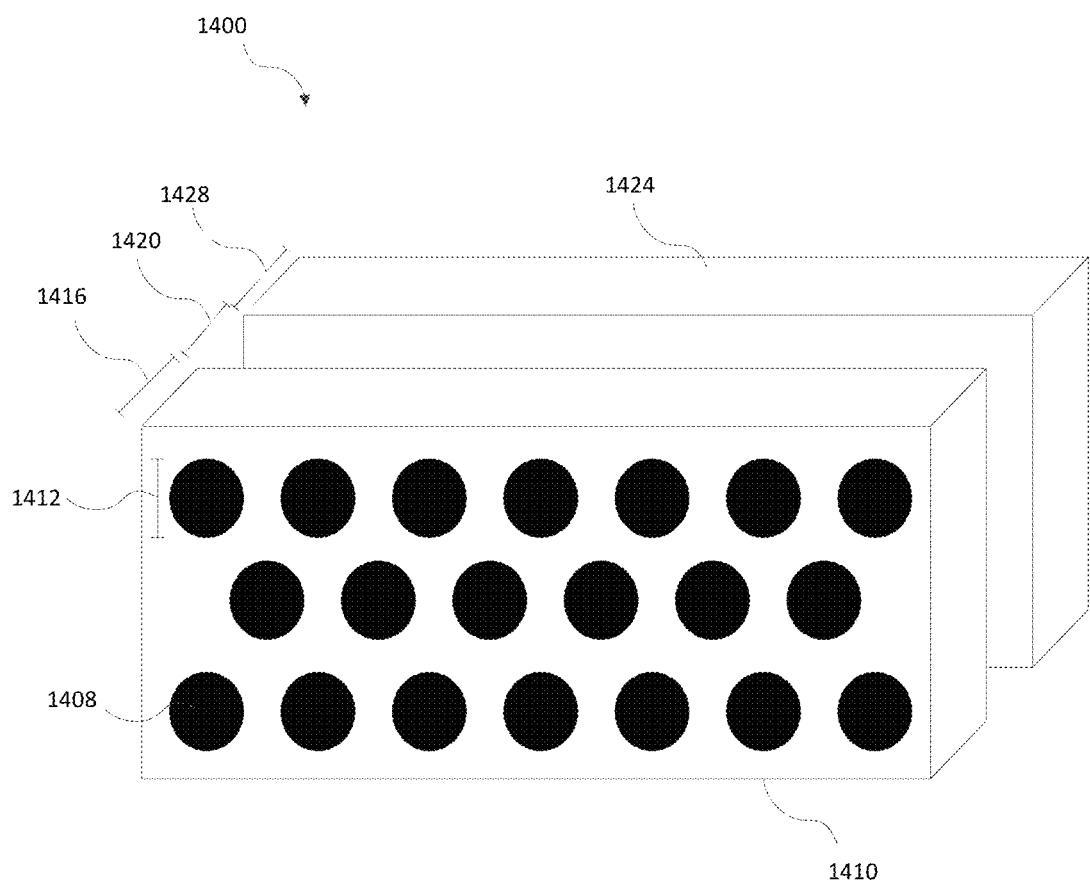
FIG. 14 schematically illustrates a screen assembly that includes a screen and a baffle.

FIG. 14 schematically illustrates a screen assembly 1400 that includes a screen 1404 and a baffle 1424. The screen 1404 includes a plurality of holes 1408 through which material generally having a length and/or diameter less than the hole diameter 1412 may pass. However, screens are generally imperfect since they sometimes allow particles having a larger length and/or diameter to pass through. To help with this, a baffle 1424 can be attached to the screen 1404. The baffle 1424 slows the movement of particles through the holes 1408 and thus allows the grinder and/or mill to further reduce the size of the particle while it is stuck on the baffle the screen 1404 as a screen depth 1416, and the baffle 1424 has a baffle depth 1428. In some embodiments, the screen depth 1416 and the baffle depth 1428 can be adjusted to achieve a target flow rate and/or particle size consistency. For example, the adjustment may be made using a screw mechanism. Alternatively, specific baffle elements (e.g., baffle strips) may be directly attached (e.g., welded) to the screen 1404. In other embodiments, the screen 1404 and baffle 1424 are separated by a separation distance 1420. The ratio of the hole diameter 1412 to the separation distance 1420 may range between about 1:4 to about 3:1. In some embodiments, the ratio is between about 1:2 to about 2:1, preferably about 1:1. In certain configurations, a ratio of 1:1 strikes a suitable balance between rate of flow of material and consistency of the particle size. For example, for a hole diameter 1412 of about 0.5 inches (e.g., second palm grinder 1228) and a separation distance 1420 from the baffle 1424, certain embodiments of the system 1200 have been found to work with particular efficiency and speed of grinding palm fronds.

As mentioned above, the baffle 1424 may include one or more baffle strips (not shown in FIG. 14). Each of the one or more baffle strips may be welded on the screen (e.g., the separation distance 1420 would be zero). The baffle strips can allow for using a larger hole size in the screen while maintaining a similar quality in the grinding of the palm. The baffle strips can be configured, for example, to slow the flow of palm particles therethrough. This slowing may be between about 1 ms and 500 ms, relative to a screen of the same hole size without the baffle strips. The slowing may be between 25 ms and 1200 ms in some embodiments where palm particles may need more time to be ground (e.g., when the palm has a higher moisture content). In some embodiments useful for relatively wet palm (e.g., palm fronds have a moisture content between about 40% and 75% moisture content by weight), the slowing may be between 45 ms and 2500 ms. Accordingly, the baffle elements may allow for grinding palm that has a higher moisture content. The higher moisture content palm may have greater than 15% moisture content by weight, greater than 30% moisture content by weight, greater than 50% moisture content by weight, and/or greater than 60% moisture content by weight.

In some embodiments, the baffle may include a piece (e.g., strip) of metal welded across the length of the back of the screen, so that the baffle covers a portion of one or more holes 1408. In some embodiments, the baffle does not cover a center of the hole 1408. The baffle strips may cover a certain percentage of the area of one or more of the plurality of holes 1408. For example, the baffle may cover between about 5% and 70% of each hole of at least one or more of the plurality of holes 1408. In some embodiments, the baffle may cover between about 10% and 55% of each hole of at least one or more of the plurality of holes 1408. Preferably, the baffle strips cover between about 15% and 45% of each hole of at least one or more of the plurality of holes 1408. The baffle strips may be welded parallel to an orientation of a row of adjacent holes such that the baffles trip may be able to cover approximately the same amount of each adjacent hole. The baffle strips may be disposed on an interior side (e.g., the grinding side) of the screens 1416. Additionally or alternatively, the baffle strips may be disposed on an exterior side (e.g., the exit side) of the screens 1416. In some embodiments, the baffles may be alternated on the interior side and the exterior side of the screens 1416. The baffles may be associated with screens on one or more of the first and second grinders disclosed herein (e.g., the first palm grinder 1212 and/or the second palm grinder 1228 of FIG. 12). In some embodiments, other grinders and/or mills (e.g., the hammer mill 1272) may employ the use of the screens 1416 and/or baffles 1424 (e.g., with the baffle strips) as disclosed herein. One or more of the baffle strips may be disposed parallel to one another. This may be true even in embodiments where not all of the baffle strips are disposed on the same side of the screen 1416. The baffles 1424 (e.g., the baffle pieces) may provide added strength and durability to the screens 1416. The baffles 1424 may comprise a metal (e.g., iron, aluminum, steel, etc.).

Figure 15A:
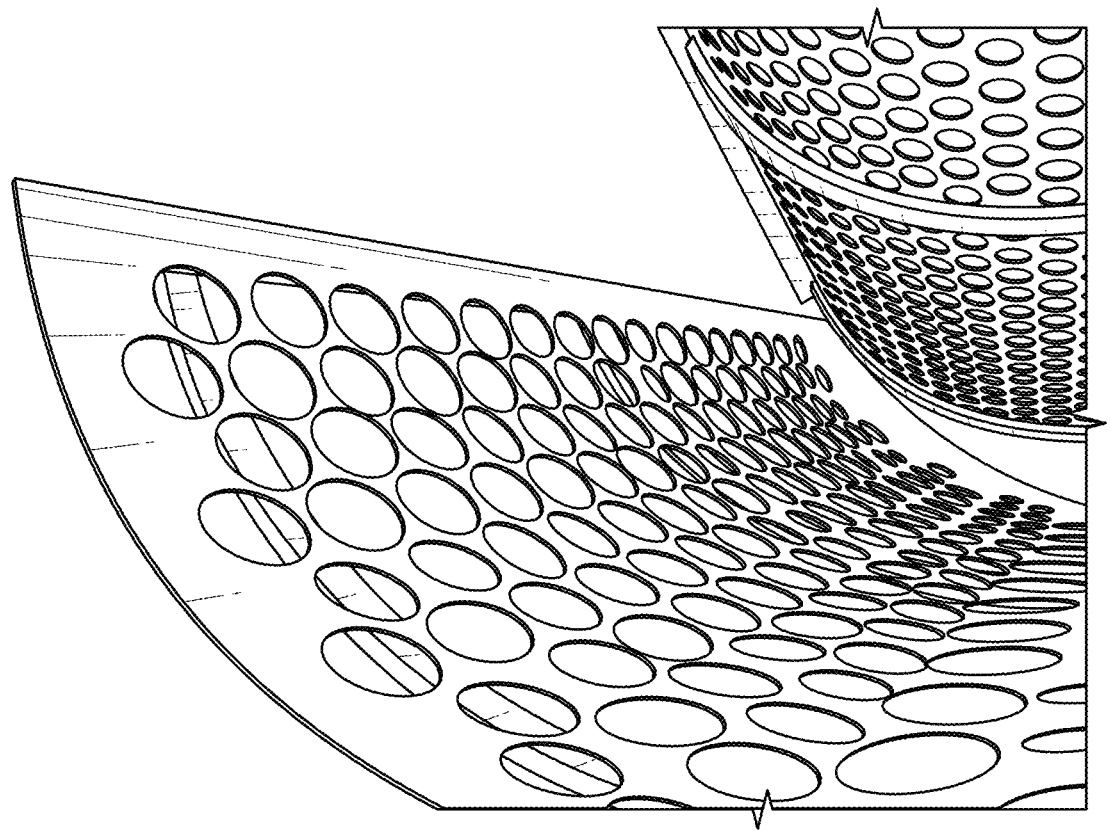
FIG. 15A shows a screen assembly that includes a screen.
Figure 15B:
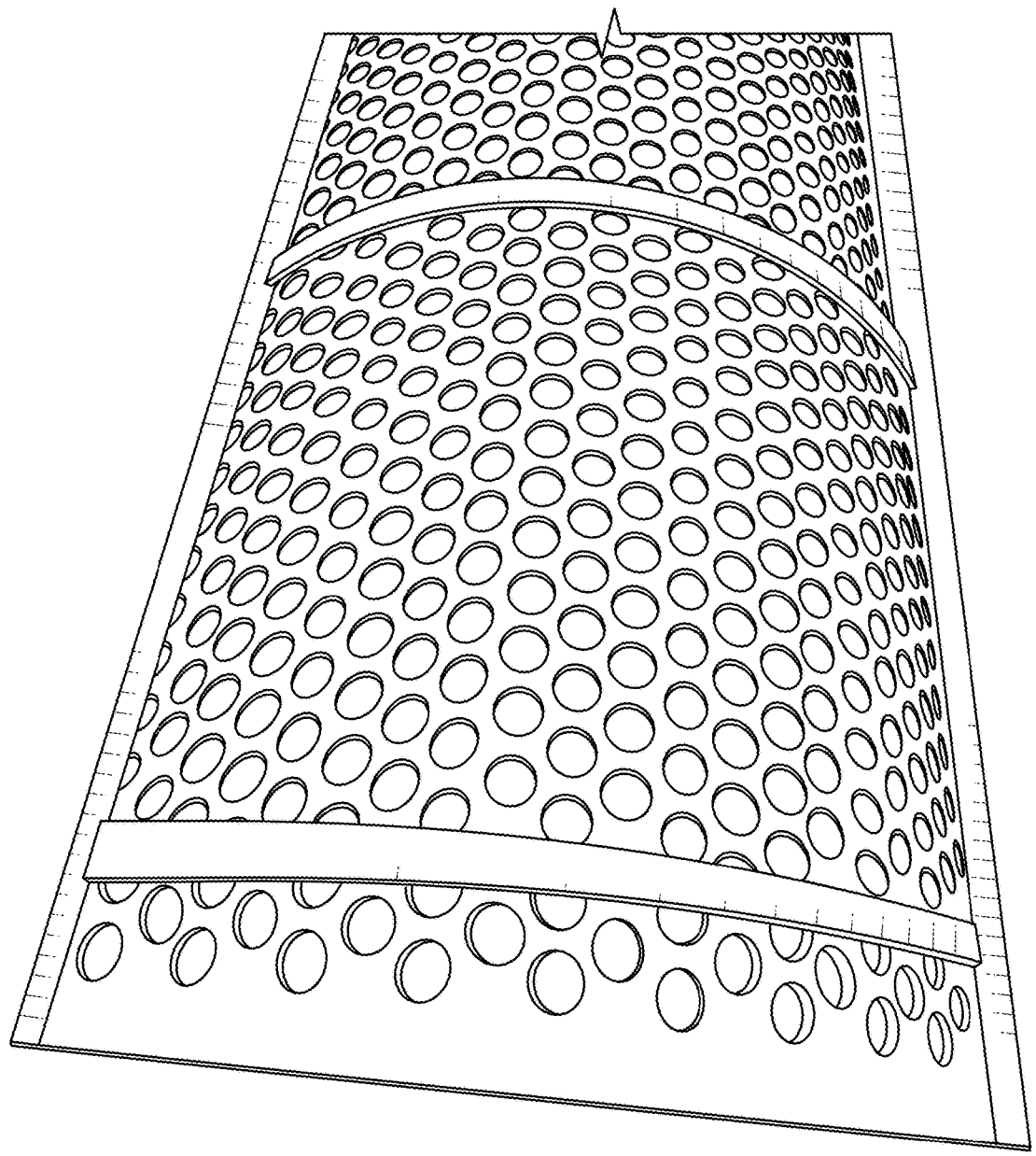
FIG. 15B shows a screen assembly that includes a screen.
Figure 15C:
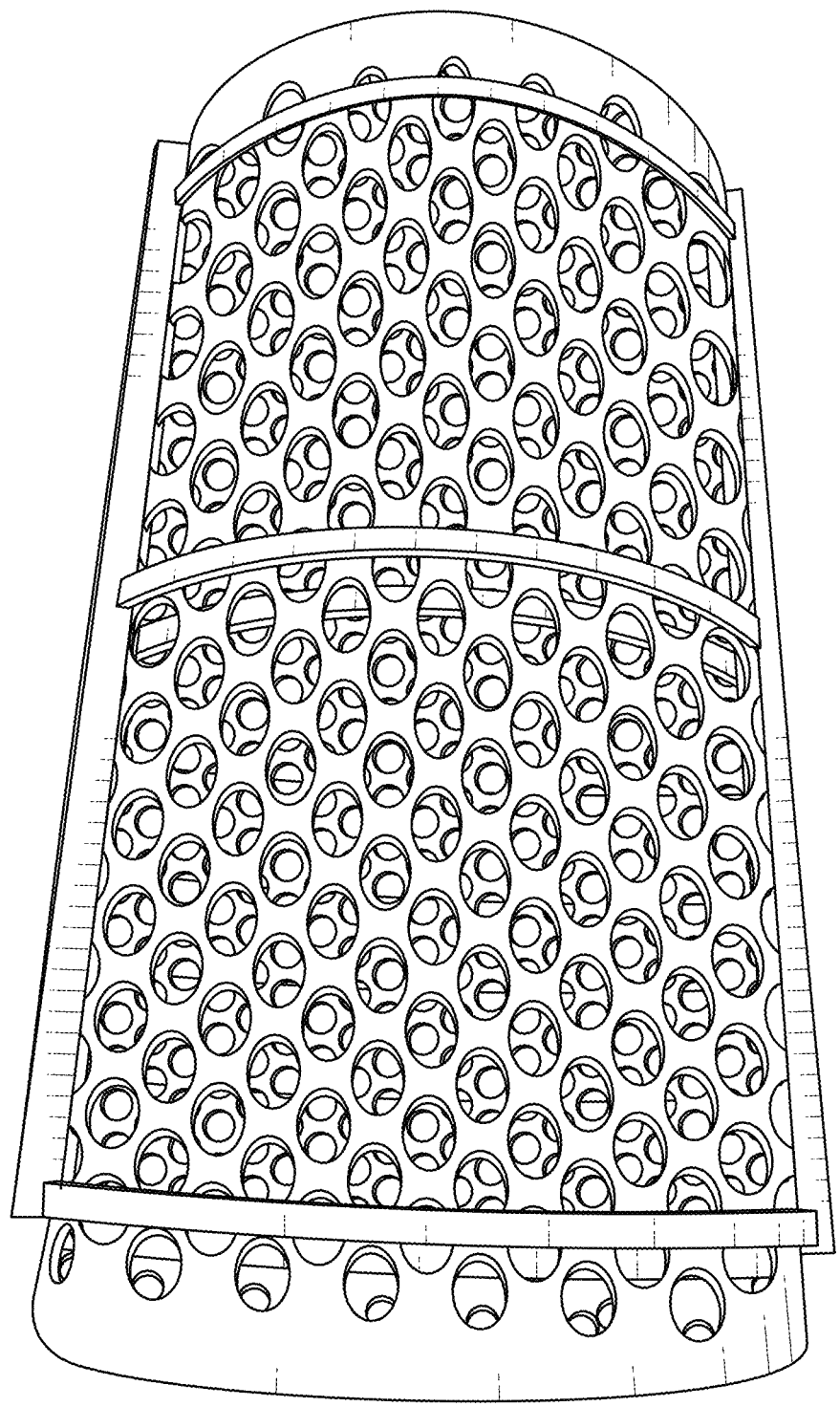
FIG. 15C shows a screen assembly that includes a screen.

FIGS. 15A-15C show examples of grinding screens from various angles and with various hole sizes. In some embodiments, a baffle may be a screen-like attachment to a screen configured to ensure that the palm fronds are ground to a proper length/diameter before being discharged from the grinder. For example, the baffle may have holes itself. The baffle holes may have a different size hole as the screen to which it is attached. For example, the holes may be larger or smaller than the holes of the screen. In some embodiments, the baffle is a second "screen" identical to the screen to which the baffle is attached. In this way the baffle can provide some of the benefits described herein with respect to the baffles.

Example Systems, Byproducts, and Methods

In a 1st example, a method of disposing of organic green waste comprising introducing a combination of waste material and flesh of fruits into a grinder, the waste material having a moisture content below a first maximum moisture content and the flesh of the fruits having a moisture content below a second maximum moisture content; using the grinder, grinding the combination of the waste material and the flesh of the fruits into first chunks having a first maximum diameter; and grinding the first chunks into second chunks having a second maximum diameter.

In a 2nd example, the method of example 1, wherein the waste material comprises palm fronds.

In a 3rd example, the method of any of examples 1-2, wherein the combination of the waste material and flesh of the fruits is introduced into the grinder at a ratio of the waste material to the flesh of the fruits of between about 6:1 and 14:1 by volume.

In a 4th example, the method of any of examples 1-3, further comprising, prior to introducing the combination of the waste material and the flesh of the fruits into the grinder, arranging for the waste material to dry until the waste material reaches a moisture content below the first maximum moisture content.

In a 5th example, the method of any of examples 1-4, further comprising, prior to introducing the combination of the waste material and the flesh of the fruits into the grinder, arranging for the flesh of the fruits to dry until flesh of the fruits reaches a moisture content below the second maximum moisture content.

In a 6th example, the method of any of examples 1-5, wherein the first maximum moisture content is between about 5% and 15% by weight.

In a 7th example, the method of any of examples 1-6, wherein the second maximum moisture content is between about 5% and 15% by weight.

In a 8th example, the method of any of examples 1-7, wherein prior to introducing the combination of the waste material and the flesh of the fruits into the grinder, while the waste material contains a moisture content below the first maximum moisture content, shredding the waste material to a length shorter than a maximum length.

In a 9th example, the method of any of examples 1-8, wherein the maximum length is about 8 inches.

In a 10th example, the method of any of examples 1-9, wherein introducing the combination of the waste material and the flesh of the fruits into the grinder occurs while the flesh of the fruits has a moisture content that is below the second maximum moisture content.

In a 11th example, the method of any of examples 1-10, wherein the first diameter is between about 1 inch and 5 inches.

In a 12th example, the method of any of examples 1-11, wherein the second diameter is between about 0.2 inches and 1 inch.

In a 13th example, the method of any of examples 1-12, further comprising the step of arranging for the second chunks to undergo processing to form a resulting byproduct.

In a 14th example, the method of example 13, wherein processing comprises combining the second chunks with a roughening additive.

In a 15th example, the method of any of examples 1-13, wherein the roughening additive is selected from the group consisting of wheat, buckwheat, milo, alfalfa, soy, corn, hay, oats, rice, barley, rye, millet, sorghum, *quinoa*, or grass.

In a 16th example, the method of any of examples 13-15, wherein processing comprises combining the second chunks with a calcium additive.

In a 17th example, the method of example 16, wherein the calcium additive is selected from the group consisting of oyster shell, a salt comprising calcium or a calcium derivative, calcium carbonate, limestone, calcium monophosphate, calcium diphosphate, and egg shells.

In a 18th example, the method of any of examples 13-17, wherein processing comprises forming the resulting byproduct into a pellet.

In a 19th example, the method of any of the above examples, wherein the flesh of the fruits comprises flesh of palm dates.

In a 20th example, a byproduct of disposal of organic green waste, the byproduct comprising a ground chunk having a diameter less than a maximum diameter, the ground chunk comprising: waste material having a moisture content below a first maximum moisture content; and flesh of fruit, the flesh having a moisture content below a second maximum moisture content; wherein the ground chunk comprises a greater proportion of waste material than flesh of fruit by weight.

In a 21st example, the byproduct of example 20, wherein the waste material comprises palm fronds.

In a 22nd example, the byproduct of any of the above examples, the byproduct of example 20, wherein the flesh of the fruits comprises flesh of palm dates.

In a 23rd example, the byproduct of any of the above examples, the byproduct of example 20, wherein the maximum diameter is between about 1 inch and 5 inches.

In a 24th example, the byproduct of any of the above examples, the byproduct of example 20, wherein the maximum diameter is between about 0.2 inches and 1 inch.

In a 25th example, the byproduct of any of the above examples, the byproduct of any of examples 20-24, wherein the first maximum moisture content is between about 5% and 15% by weight.

In a 26th example, the byproduct of any of the above examples, the byproduct of any of examples 20-25, wherein the second maximum moisture content is between about 5% and 15% by weight.

In a 27th example, the byproduct of any of the above examples, the byproduct of any of examples 20-26, wherein the ground chunk further comprises a roughening additive.

In a 28th example, the byproduct of any of the above examples, the byproduct of example 26, wherein the roughening additive is selected from the group consisting of wheat, buckwheat, milo, alfalfa, soy, corn, hay, oats, rice, barley, rye, millet, sorghum, *quinoa*, and grass.

In a 29th example, the byproduct of any of the above examples, the byproduct of any of examples 20-28, wherein the ground chunk further comprises a calcium additive.

In a 30th example, the byproduct of any of the above examples, the byproduct of example 28, wherein the calcium additive is selected from the group consisting of oyster shell, a salt comprising calcium or a calcium derivative, calcium carbonate, limestone, calcium monophosphate, calcium diphosphate, and egg shells.

In a 31st example, the byproduct of any of the above examples, the byproduct of any of examples 20-30, wherein the ground chunk comprises a pellet.

In a 32nd example, the byproduct of any of the above examples, the byproduct of any of examples 20-31, wherein the ground chunk comprises a ratio of the waste material to the flesh of the fruits of between about 6:1 and 14:1 by volume.

In a 33rd example, the byproduct of any of the above examples, the byproduct of any of examples 20-32, wherein the ground chunk further comprises a nutritional additive.

In a 34th example, the byproduct of any of the above examples, the byproduct of example 33, wherein the nutritional additive is selected from the group consisting of wheat, buckwheat, milo, alfalfa, soy, corn, hay, oats, rice, barley, rye, millet, sorghum, *quinoa*, and grass.

In a 35th example, the byproduct of any of the above examples, the byproduct of example 33, wherein the nutritional additive is selected from the group consisting of almond shells, walnut husks, peanut shells, fruit pits, cotton seed, corn, brewer's grain, distiller's grain, potatoes, lettuce, tomatoes, soy, turnips, fruit rind, and beet pulp.

In a 36th example, the byproduct of any of the above examples, the byproduct of example 33, wherein the nutritional additive is selected from the group consisting of sugar beets, sugar cane, peaches, apples, strawberries, citrus fruits, oranges, grapefruit, lemons, grapes, and raisins.

In a 37th example, a bio-friendly byproduct of organic green waste disposal comprising a nontoxic extrusion configured for availability in an arid region and configured to be consumable by domesticated animals, the extrusion comprising a first waste material comprising processed palm frond particles having a length of less than one inch and a moisture content below 20%, the extrusion comprising at least 36% of the first waste material by weight; and a second waste material comprising crumbles of palm date flesh having a moisture content below 20% by weight, the extrusion comprising at least 15% of the second waste material by weight.

In a 38th example, the byproduct of Example 37, wherein the nontoxic extrusion comprises at least 20% by weight of a binding agent comprising an oil configured to provide nutritive value.

In a 39th example, the byproduct of any of Examples 37-38, wherein the nontoxic extrusion comprises at least 10% by weight of a cereal additive configured to supply fiber content.

In a 40th example, the byproduct of any of Examples 37-39, wherein the nontoxic extrusion comprises at least 10% crude protein by weight.

In a 41st example, the byproduct of any of Examples 37-40, wherein the nontoxic extrusion has a crude protein content of between 5% and 30% by weight.

In a 42nd example, the byproduct of any of Examples 37-41, wherein the nontoxic extrusion has a crude fat content of between 2% and 8% by weight.

In a 43rd example, the byproduct of any of Examples 37-42, wherein the nontoxic extrusion has a crude fiber content of between 15% and 45% by weight.

In a 44th example, the byproduct of any of Examples 37-43, wherein the nontoxic extrusion further comprises a roughening additive.

In a 45th example, the byproduct of Example 44, wherein the roughening additive is selected from the group consisting of wheat, buckwheat, milo, alfalfa, soy, corn, hay, oats, rice, barley, rye, millet, sorghum, *quinoa*, and grass.

In a 46th example, the byproduct of any of Examples 44-45, wherein the nontoxic extrusion has an ash content of between 4% and 17% by weight.

In a 47th example, the byproduct of any of Examples 44-46, wherein the nontoxic extrusion has a total digestible nutrient (TDN) content of between about 50% and about 60%.

In a 48th example, the byproduct of any of Examples 44-47, wherein the nontoxic extrusion further comprises a nutritional additive selected from the group consisting of almond shells, walnut husks, peanut shells, fruit pits, cotton seed, corn, brewer's grain, distiller's grain, potatoes, lettuce, tomatoes, soy, turnips, fruit rind, and beet pulp.

In a 49th example, the byproduct of any of Examples 37-48, wherein the first waste material comprises palm selected from the group consisting of *Washingtonia Robusta* palms, *Washingtonia Filifera* palms, and *Phoenix Canariensis* palms.

In a 50th example, the byproduct of any of Examples 37-49, wherein the second waste material comprises dates from a Deglet Noor palm.

In a 51st example, the byproduct of any of Examples 37-50, wherein the nontoxic extrusion comprises a ratio of the first waste material and the second waste material at between 5:3 and 4:1.

In a 52nd example, the byproduct of any of Examples 37-51, wherein the nontoxic extrusion comprises a ratio of the first waste material and the second waste material at between 6:1 and 14:1.

In a 53rd example, a method of repurposing organic green waste into a bio-friendly byproduct, the method comprising introducing the first waste material comprising palm frond particles into a first grinder configured to expel particles having a diameter no greater than three inches, the first waste material having a moisture content below 20% by weight; using the first grinder, grinding the first waste material into first particles having a length less than three inches; and introducing the first particles of the first waste material into a second grinder configured to expel particles having a diameter no greater than one inch; using the second grinder, grinding the first particles into second particles having a length less than 1 inch; introducing the second waste material comprising palm dates into a third grinder configured to expel particles having a diameter no greater than one inch, the second waste material having a moisture content below 15% by weight; using the third grinder, grinding the second waste material into crumbles having a diameter less than one inch; introducing the first waste material and the second waste material into a mixer at a ratio of between 5:3 and 4:1; using the mixer, mixing the first waste material and the second waste material into a mixture.

In a 54th example, the method of Example 53, further comprising the step of arranging for a first waste material comprising palm fronds to dry until the first waste material reaches a moisture content below 20% by weight.

In a 55th example, the method of Example 53, wherein arranging for the first waste material comprising palm fronds to dry comprises using a tumble dryer.

In a 56th example, the method of any of Examples 53-55, further comprising the step of arranging for a second waste material comprising palm dates to dry until the second waste material reaches a moisture content below 15% by weight.

In a 57th example, the method of Example 56, wherein arranging for the second waste material comprising palm dates to dry comprises using a tumble dryer.

In a 58th example, the method of any of Examples 53-57, further comprising the step of mixing a binding agent comprising oil configured for consumption into the mixture, wherein the mixture comprises between 25% and 65% binding agent by weight.

In a 59th example, the method of any of Examples 53-58, wherein the binding agent comprises canola oil.

In a 60th example, the method of any of Examples 53-59, further comprising the step of mixing a cereal additive into the mixture, wherein the mixture comprises between 3% and 16% cereal additive by weight.

In a 61st example, the method of any of Examples 53-60, further comprising the step of using an extruding machine, extruding the mixture into pellets having a diameter less than 0.8 inches.

In a 62nd example, the method of any of Examples 53-61, wherein the first waste material has a moisture content of between 5% and 15% by weight.

In a 63rd example, the method of any of Examples 53-62, wherein arranging for a first waste material to dry comprises arranging the first waste material to dry until the first waste material reaches a moisture content of between 5% and 15% by weight.

In a 64th example, the method of any of Examples 53-63, further comprising the step of introducing the mixture into a fourth grinder.

In a 65th example, the method of any of Examples 53-64, further comprising mixing a roughening additive into the mixture.

In a 66th example, the method of Example 65, wherein the roughening additive is selected from the group consisting of wheat, buckwheat, milo, alfalfa, soy, corn, hay, oats, rice, barley, rye, millet, sorghum, quinoa, or grass.

In a 67th example, the method of any of Examples 65-66, further comprising mixing a calcium additive into the mixture.

In a 68th example, the method of any of Examples 65-67, wherein the calcium additive is selected from the group consisting of oyster shell, a salt comprising calcium or a calcium derivative, calcium carbonate, limestone, calcium monophosphate, calcium diphosphate, and egg shells.

In a 69th example, a palm frond and date based animal feed comprising an approximately 50:50 by weight mixture of palm fronds and dates, wherein the palm frond and date based animal feed comprises larger palm frond-date particles and smaller palm frond-date particles, wherein the larger palm frond-date particles and smaller palm frond-date particles are prepared by the process of obtaining raw palm fronds with a moisture content of between about 1-15% obtaining raw dates with a moisture content of less than about 10% combining about four parts by volume raw palm fronds with one part by volume raw dates; grinding the palm frond-date mixture in a grinder equipped with openings from about ¼ inch to about 2 inches in diameter; sorting the palm frond-date mixture in a trommel equipped with openings from about ¼ inch to about ½ inch in diameter; collecting the larger palm-day hay particles; collecting the smaller palm frond-date fine particles which passes through the screen of the trommel; mixing the palm frond-date hay particles and the palm frond-date fine particles in a ratio of between 2:1 and 1.5:1 by volume; to obtain palm frond and date based animal feed.

In a 70th example, the palm frond and date based animal feed of Example 69, wherein the raw dates contain the skin, the flesh, and/or pits of the fruit.

In a 71st example, the palm frond and date based animal feed of any of Examples 69-70, wherein the palm frond and date based animal feed has a total digestible nutrient (TDN) of greater than 50%, 55%, 60%, 65%, 70% or 75% of the dry matter basis.

In a 72nd example, the palm frond and date based animal feed of any of Examples 69-71, wherein palm frond and date based animal feed has a relative feed value (RFV) of greater than 170, 185, 200, 215, 230, 245 or 260.

In a 73rd example, the palm frond and date based animal feed of any of Examples 69-72, wherein the larger palm frond-date particles are approximately equal to or less than 2 inches in length.

In a 74th example, the palm frond and date based animal feed of any of Examples 69-73, wherein the smaller palm frond-date particles comprise palm frond dust.

In a 75th example, a method of producing sweet palm hay, the method comprising obtaining raw palm fronds; drying the raw palm fronds to a moisture content of between approximately 1% and approximately 15%; obtaining raw dates; drying the raw dates to a moisture content of approximately 10% or less; combining in a 4:1 by volume ratio, dry palm fronds with dry dates into a palm frond-date mixture; introducing the palm frond-date mixture into a grinder having openings between about 0.2 to about 2 inches; using the grinder, grinding the palm frond-date mixture into first particles; sorting the first particles into a trommel equipped with a screen having openings between about 0.1 inch and 0.5 inch in diameter; collecting larger palm frond-date hay; collecting smaller palm frond-date grindings; and introducing the palm frond-date hay and the frond-date fines into a mixer at a ratio of between 1:1 and 2.5:1 by volume; using the mixer, mixing the palm frond-date hay and the frond-date fines into a mixture of sweet palm hay.

In a 76th example, the method of Example 75, wherein the trommel sorts the first particles at a rate of between about one ton an hour and twelve tons an hour.

In a 77th example, the method of any of Examples 75-76, wherein the raw dates contain the skin, the flesh, and/or pits of the fruit.

In a 78th example, the method of any of Examples 75-77, wherein the sweet palm hay has a total digestible nutrient (TDN) of greater than 50%, 55%, 60%, 65%, 70% or 75% of the dry matter basis.

In a 79th example, the method of any of Examples 75-78, wherein the sweet palm hay has a relative feed value (RFV) of greater than 170, 185, 200, 215, 230, 245 or 260.

In a 80th example, the method of any of Examples 75-79, wherein the raw palm fronds comprises palm fronds selected from the group consisting of *Washingtonia Robusta* palms, *Washingtonia Filifera* palms, and *Phoenix Canariensis* palms.

In an 81st example, the method of any of Examples 75-80, wherein the raw dates comprises dates from a Deglet Noor palm or a Canary Palm.

In an 82nd example, the method of any of Examples 75-81, further comprising the step of introducing the packaging the sweet palm hay into a bag.

In an 83rd example, the method of any of Examples 75-82, further comprising the step of storing the sweet palm hay.

In an 84th example, a palm frond and date based animal feed comprising a mixture of palm frond component and a date component, wherein the palm frond component has a moisture content of between approximately 1% and approximately 15%; wherein the palm frond component comprises (i) palm fronds of approximately less than or equal to 2 inches in length and (ii) palm frond powder; wherein the date component has a moisture content of approximately 10% or less; and wherein the palm frond and date based animal feed comprising between 40-60% by weight palm frond component and 40-60% by weight date component.

In an 85th example, the palm frond and date based animal feed of Example 84, wherein the raw dates contain the skin, the flesh, and/or pits of the fruit.

In an 86th example, the palm frond and date based animal feed of any of Examples 84-85, wherein the sweet palm hay has a total digestible nutrient (TDN) of greater than 50%, 55%, 60%, 65%, 70% or 75% of the dry matter basis.

In an 87th example, the palm frond and date based animal feed of any of Examples 84-86, wherein the sweet palm hay has a relative feed value (RFV) of greater than 170, 185, 200, 215, 230, 245 or 260.

In an 88th example, the palm frond and date based animal feed of any of Examples 84-87, wherein the raw palm fronds comprises palm fronds selected from the group consisting of *Washingtonia Robusta* palms, *Washingtonia Filifera* palms, and *Phoenix Canariensis* palms.

In an 89th example, the palm frond and date based animal feed of any of Examples 84-88, wherein the raw dates comprises dates from a Deglet Noor palm or a Canary Palm.

In an 90th example, a method of disposing of organic green waste, the method comprising arranging for waste material comprising palm fronds to dry until the palm fronds reach a moisture content below a first maximum moisture content, wherein the first maximum moisture content is 15% by weight; arranging for fruit comprising dates to dry until a flesh of the dates reaches a moisture content below a second maximum moisture content, wherein the second maximum moisture content is 10% by weight; while the palm fronds contain a moisture content below the first maximum moisture content, shredding the palm fronds to a length less than a maximum length, wherein the maximum length is 8 inches; while the flesh of the dates have a moisture content below the second maximum moisture content, introducing a combination of the palm fronds and the dates at a ratio of palm fronds to flesh of dates of between about 6:1 and 14:1 by volume into a grinder; using the grinder, grinding the combination into first chunks having a diameter between about 1 inch and 5 inches; grinding the first chunks into second chunks having a diameter between about 0.2 inches and 1 inch; collecting the second chunks; and arranging for the second chunks to undergo processing to form a resulting byproduct, wherein undergoing processing comprises: combining the second chunks with a roughening additive, the roughening additive selected from the group consisting of wheat, buckwheat, milo, alfalfa, soy, corn, hay, oats, rice, barley, rye, millet, sorghum, quinoa, or grass; combining the second chunks with a calcium additive, the calcium additive selected from the group consisting of oyster shell, a salt comprising calcium or a calcium derivative, calcium carbonate, limestone, calcium monophosphate, calcium diphosphate, and egg shells; and forming the resulting byproduct into a pellet.

In a 91st example, a bio-friendly byproduct of organic green waste disposal comprising a nontoxic extrusion configured for availability in an arid region and configured to be consumable by domesticated animals, the extrusion comprising a first waste material comprising palm frond particles having a length of less than one inch and a moisture content below 20%, the extrusion comprising at least 36% of the first waste material by weight; a second waste material comprising crumbles of palm date flesh having a moisture content below 20% by weight, the extrusion comprising at least 15% of the second waste material by weight; a binding agent comprising an oil configured to provide nutritive value to domesticated animals; and a cereal additive comprising at least 5% fiber content by weight; wherein the byproduct comprises at least 5% crude protein by weight; at least 2% crude fat by weight; and at least 10% crude fiber by weight.

In a 92nd example, the byproduct of example 91, wherein the first waste material comprises palm comprising *Phoenix Canariensis* palms.

In a 93rd example, the byproduct of any of examples 91-92, wherein the second waste material comprises dates from a Deglet Noor palm.

In a 94th example, the byproduct of any of examples 91-93, wherein the nontoxic extrusion comprises at least 20% by weight of a binding agent comprising an oil configured to provide nutritive value.

In a 95th example, the byproduct of any of examples 91-94, wherein the nontoxic extrusion comprises at least 10% by weight of a cereal additive configured to supply fiber content.

In a 96th example, the byproduct of any of examples 91-95, wherein the nontoxic extrusion has a crude protein content of between 5% and 30% by weight.

In a 97th example, the byproduct of any of examples 91-96, wherein the nontoxic extrusion has a crude fat content of between 2% and 8% by weight.

In a 98th example, the byproduct of any of examples 91-97, wherein the nontoxic extrusion has a crude fiber content of between 15% and 45% by weight.

In a 99th example, the byproduct of any of examples 91-98, wherein the nontoxic extrusion further comprises a roughening additive.

In a 100th example, the byproduct of example 99, wherein the roughening additive is selected from the group consisting of wheat, buckwheat, milo, alfalfa, soy, corn, hay, oats, rice, barley, rye, millet, sorghum, quinoa, and grass.

In a 101st example, the byproduct of any of any of examples 99-100, wherein the nontoxic extrusion has an ash content of between 4% and 17% by weight.

In a 102nd example, the byproduct of any of examples 99-101, wherein the nontoxic extrusion has a total digestible nutrient (TDN) content of between about 50% and about 60%.

In a 103rd example, the byproduct of any of examples 99-102, wherein the nontoxic extrusion further comprises a nutritional additive selected from the group consisting of almond shells, walnut husks, peanut shells, fruit pits, cotton seed, corn, brewer's grain, distiller's grain, potatoes, lettuce, tomatoes, soy, turnips, fruit rind, and beet pulp.

In a 104th example, the byproduct of any of Examples 91-103, wherein the first waste material comprises palm selected from the group consisting of *Washingtonia Robusta* palms, *Washingtonia Filifera* palms, and *Phoenix Canariensis* palms.

In a 105th example, the byproduct of any of examples 91-104, wherein the second waste material comprises dates from a Deglet Noor palm.

In a 106th example, the byproduct of any of examples 91-105, wherein the nontoxic extrusion comprises a ratio of the first waste material and the second waste material at between 5:3 and 4:1.

In an 107th example, a method of repurposing organic green waste into a bio-friendly byproduct, the method comprising introducing the first waste material comprising palm frond particles into a first grinder configured to expel particles having a diameter no greater than three inches; using the first grinder, grinding the first waste material into first particles having a length less than three inches; and introducing the first particles of the first waste material into a second grinder configured to expel particles having a diameter no greater than one inch; using the second grinder, grinding the first particles into second particles having a length less than 1 inch; introducing the second waste material comprising palm dates into a third grinder configured to expel particles having a diameter no greater than one inch; using the third grinder, grinding the second waste material into crumbles having a diameter less than one inch; introducing the first waste material and the second waste material into a mixer at a ratio of between 5:3 and 4:1; using the mixer, mixing the first waste material and the second waste material into a mixture.

In a 108th example, the method of any of Examples 107 or 53-68, wherein at least one of the first grinder or the second grinder comprises a screen and a plurality of baffle strips, the screen comprising a plurality of holes, each of the plurality of holes having a hole area and a hole diameter.

In a 109th example, the method of Example 108, wherein the screen is separated from one or more of the baffle strips by a separation distance, wherein a ratio of the hole diameter to the separation distance is between about 1:4 and 3:1.

In a 110th example, the method of any of Examples 108-109, wherein one or more of the baffle strips covers between about 5% and 70% of each hole of at least one or more of the plurality of holes.

In a 111th example, the method of any of Examples 108-110, wherein at least two of the baffle strips are disposed parallel to each other.

In a 112th example, the method of any of Examples 108-111, wherein at least one of the baffle strips is disposed on a side of the screen opposite at least one other baffle strip.

In a 113th example, the method of any of Examples 108-112, wherein each of the first and second grinders comprises a screen and a plurality of baffle strips.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A method of repurposing organic green waste into a bio-friendly byproduct, the method comprising:
   introducing a first waste material comprising palm frond particles into a first grinder configured to expel particles having a diameter no greater than three inches, the first waste material when introduced having a moisture content below 20% by weight;
   using the first grinder, grinding the first waste material into first particles having a length less than three inches; and
   introducing the first particles of the first waste material into a second grinder configured to expel particles having a diameter no greater than one inch;
   using the second grinder, grinding the first particles into second particles having a length less than one inch, wherein at least one of the first grinder or the second grinder comprises a screen and one or more baffles, the screen comprising a plurality of holes, each of the plurality of holes having a hole area and a hole diameter, wherein the screen is separated from the one or more baffles by a separation distance, wherein a ratio of the hole diameter to the separation distance is between about 1:4 and 3:1, wherein the one or more baffles are configured and adapted to slow the movement of particles through the plurality of holes in the screen so as to minimize the number of particles with a size greater than the hole area or greater than the hole diameter from passing through the screen;
   introducing a second waste material comprising palm dates into a third grinder configured to expel particles having a diameter no greater than one inch, the second waste material when introduced having a moisture content below 15% by weight;
   using the third grinder, grinding the second waste material into crumbles having a diameter less than one inch;
   introducing the first waste material and the second waste material into a mixer at a ratio of between 5:3 and 4:1 by weight when introduced into the mixer;
   using the mixer, mixing the first waste material and the second waste material into a mixture;
   mixing a binding agent comprising oil configured for consumption into the mixture, wherein the mixture comprises between 25% and 65% binding agent by weight, wherein the binding agent comprises canola oil;

mixing a cereal additive into the mixture, wherein the mixture comprises between 3% and 16% cereal additive by weight;

introducing the mixture into a fourth grinder to form a ground mixture, wherein the fourth grinder is not configured to extrude the ground mixture; and introducing the ground mixture into an extruding machine, and using the extruding machine for extruding the ground mixture into pellets.

2. The method of claim 1, further comprising the step of arranging for a first waste material comprising palm fronds to dry until the first waste material reaches a moisture content below 20% by weight.

3. The method of claim 1, wherein arranging for the first waste material comprising palm fronds to dry comprises using a tumble dryer.

4. The method of claim 1, further comprising the step of arranging for a second waste material comprising palm dates to dry until the second waste material reaches a moisture content below 15% by weight.

5. The method of claim 4, wherein arranging for the second waste material comprising palm dates to dry comprises using a tumble dryer.

6. The method of claim 1, wherein the one or more baffles covers between about 5% and 70% of each hole of at least one or more of the plurality of holes.

7. The method of claim 1, wherein the one or more baffles comprise one or more baffle strips.

8. The method of claim 7, wherein at least one of the baffle strips is disposed on a side of the screen opposite at least one other baffle strip.

9. The method of claim 7, wherein each of the first and second grinders comprises a screen and a plurality of baffle strips.

10. The method of claim 7, wherein at least two of the baffle strips are disposed parallel to each other.

11. The method of claim 7, wherein the one or more baffle strips are directly attached to the screen.

12. The method of claim 1, wherein each of the first grinder and the second grinder comprises a screen and one or more baffles.

13. The method of claim 1, wherein the third grinder comprises a screen and one or more baffles.

14. The method of claim 1, wherein the fourth grinder comprises a screen and one or more baffles.

15. The method of claim 1, wherein the one or more baffles covers between about 5% and 70% of each hole of the plurality of holes.

16. The method of claim 1, wherein the one or more baffles comprise a plurality of holes.

17. The method of claim 1, wherein the one or more baffles comprise a plurality of holes configured and adapted to be offset from the plurality of holes of the screen.

18. The method of claim 1, wherein the one or more baffles comprise a plurality of holes configured and adapted to be offset from the plurality of holes of the screen so as to cover between about 5% and 70% of each hole of the plurality of screen holes during use.

19. The method of claim 1, wherein the plurality of holes of the screen have a first screen hole size, and wherein the one or more baffles comprise a plurality of holes have a second baffle hole size that is different from the first screen hole size.

20. A method of repurposing organic green waste into a bio-friendly byproduct, the method comprising:

introducing a first waste material comprising palm frond particles into a first grinder configured to expel particles having a size no greater than one inch, the first waste material when introduced having a moisture content below 20% by weight;

using the first grinder, grinding the first waste material into first particles having a size less than one inch, wherein the first grinder comprises a screen and one or more baffles, the screen comprising a plurality of holes, each of the plurality of holes having a hole area and a hole diameter, wherein the screen is separated from the one or more baffles by a separation distance, wherein a ratio of the hole diameter to the separation distance is between about 1:4 and 3:1, wherein the one or more baffles are configured and adapted to slow the movement of particles through the plurality of holes in the screen, wherein the plurality of holes of the screen have a first screen hole size, and wherein the one or more baffles comprise a plurality of holes have a second baffle hole size that is different from the first screen hole size, wherein the one or more baffles comprise a plurality of holes configured and adapted to be offset from the plurality of holes of the screen, wherein the one or more baffles covers between about 5% and 70% of each hole of at least one or more of the plurality of holes of the screen;

introducing a second waste material comprising palm dates into a second grinder configured to expel particles having a size no greater than one inch, the second waste material when introduced having a moisture content below 15% by weight;

using the second grinder, grinding the second waste material into particles having a size less than one inch;

introducing the first waste material and the second waste material into a mixer at a ratio of between 5:3 and 4:1 by weight when introduced into the mixer;

using the mixer, mixing the first waste material and the second waste material into a mixture;

mixing a binding agent comprising oil configured for consumption into the mixture, wherein the mixture comprises between 25% and 65% binding agent by weight, wherein the binding agent comprises canola oil;

mixing a cereal additive into the mixture, wherein the mixture comprises between 3% and 16% cereal additive by weight;

introducing the mixture into a third grinder to form a ground mixture; and introducing the ground mixture into a hopper; and introducing the ground mixture from the hopper into an extruding machine, and using the extruding machine for extruding the ground mixture into pellets.

21. The method of claim 20, further comprising the step of arranging for a first waste material comprising palm fronds to dry until the first waste material reaches a moisture content below 20% by weight, wherein arranging for the first waste material comprising palm fronds to dry comprises using a tumble dryer, and further comprising the step of arranging for a second waste material comprising palm dates to dry until the second waste material reaches a moisture content below 15% by weight, wherein arranging for the second waste material comprising palm dates to dry comprises using a tumble dryer, and wherein the one or more baffles comprise one or more baffle strips, wherein at least two of the baffle strips are disposed parallel to each other, wherein at least one of the baffle strips is disposed on a side of the screen opposite at least one other baffle strip, wherein the one or more baffle strips are directly attached to the screen.

* * * * *